US009889770B2

(12) United States Patent
Hotary et al.

(10) Patent No.: US 9,889,770 B2
(45) Date of Patent: Feb. 13, 2018

(54) SYSTEM, METHODOLOGIES, AND COMPONENTS ACQUIRING, ANALYZING, AND USING OCCUPANT BODY SPECIFICATIONS FOR IMPROVED SEATING STRUCTURES AND ENVIRONMENT CONFIGURATION

(71) Applicant: Faurecia Automotive Seating, LLC, Auburn Hills, MI (US)

(72) Inventors: James T. Hotary, Holland, MI (US); Samuel Baudu, Boulogne Billancourt (FR); Robert C. Fitzpatrick, Holland, MI (US); Dana R. Lowell, Holland, MI (US); Gregory Brncick, Holland, MI (US)

(73) Assignee: Faurecia Automotive Seating, LLC, Auburn Hills, MI (US)

( * ) Notice: Subject to any disclaimer, the term of this patent is extended or adjusted under 35 U.S.C. 154(b) by 0 days.

(21) Appl. No.: 15/627,590

(22) Filed: Jun. 20, 2017

(65) Prior Publication Data

US 2017/0282770 A1    Oct. 5, 2017

Related U.S. Application Data

(63) Continuation of application No. 15/227,103, filed on Aug. 3, 2016, now Pat. No. 9,688,163, which is a (Continued)

(51) Int. Cl.
*B60R 22/00* (2006.01)
*E05F 15/00* (2015.01)
(Continued)

(52) U.S. Cl.
CPC ........... *B60N 2/0244* (2013.01); *B60N 2/002* (2013.01); *B60N 2/0228* (2013.01); (Continued)

(58) Field of Classification Search
CPC .. B60N 2/0244; B60N 2/0252; B60N 2/4838; B60N 2/22; B60N 2/0228; B60N 2/0276; (Continued)

(56) References Cited

U.S. PATENT DOCUMENTS 5,642,302 A    6/1997    Dumont
5,653,462 A    8/1997    Breed
(Continued)

FOREIGN PATENT DOCUMENTS

CN    1871152    11/2006
DE    19929418    1/2001
(Continued)

OTHER PUBLICATIONS

International Search Report from related PCT/US2011/055084 dated May 21, 2012, 18 pages.
(Continued)

*Primary Examiner* — Jaime Figueroa
(74) *Attorney, Agent, or Firm* — Barnes & Thornburg LLP

(57) ABSTRACT

Equipment and processes generate a seating solution by obtaining occupant data, calculating body dimensions from the occupant data, and calculating a best-fit body arrangement for an occupant. Occupant data may be obtained in various ways using available computational devices and software or by manually measuring the relevant dimensions on the occupant. A user interface for inputting occupant metrics and/or occupant measurements may be provided in a mobile terminal included in the vehicle or separate from the vehicle, thus giving users increased flexibility while maximizing simplicity and usability for the user or other personnel obtaining the data. Once an occupant's best-fit body arrangement is determined, it may be altered by changing the predetermined criteria to achieve optimum
(Continued)

comfort, safety, and therapeutic benefit as well as used for providing improved comfort on a continuous basis and/or in response to detected or predicted vehicle, road, or atmospheric conditions.

21 Claims, 56 Drawing Sheets

Related U.S. Application Data continuation of application No. 14/591,822, filed on Jan. 7, 2015, now Pat. No. 9,428,082, which is a continuation of application No. 13/267,463, filed on Oct. 6, 2011, now Pat. No. 8,958,955.

(60) Provisional application No. 61/390,863, filed on Oct. 7, 2010, provisional application No. 61/506,508, filed on Jul. 11, 2011, provisional application No. 61/533,408, filed on Sep. 12, 2011.

(51) Int. Cl.
| | |
|---|---|
| *G05D 1/00* | (2006.01) |
| *G05D 3/00* | (2006.01) |
| *G06F 7/00* | (2006.01) |
| *G06F 17/00* | (2006.01) |
| *B60N 2/02* | (2006.01) |
| *B60N 2/66* | (2006.01) |
| *B60N 2/48* | (2006.01) |
| *B60N 2/44* | (2006.01) |
| *B60N 2/22* | (2006.01) |
| *B60N 2/20* | (2006.01) |
| *B60N 2/16* | (2006.01) |
| *B60N 2/06* | (2006.01) |
| *B60N 2/00* | (2006.01) |

(52) U.S. Cl.
CPC ......... *B60N 2/0248* (2013.01); *B60N 2/0252* (2013.01); *B60N 2/0276* (2013.01); *B60N 2/06* (2013.01); *B60N 2/16* (2013.01); *B60N 2/20* (2013.01); *B60N 2/22* (2013.01); *B60N 2/448* (2013.01); *B60N 2/449* (2013.01); *B60N 2/4415* (2013.01); *B60N 2/4808* (2013.01); *B60N 2/4838* (2013.01); *B60N 2/66* (2013.01); *B60N 2/665* (2015.04); *B60N 2002/026* (2013.01); *B60N 2002/0268* (2013.01)

(58) Field of Classification Search
CPC ...... B60N 2/449; B60N 2/002; B60N 2/0248; B60N 2/66; B60N 2/06; B60N 2/448; B60N 2/4808; B60N 2/4415; B60N 2/20; B60N 2/16; B60N 2/665; B60N 2002/0268; B60N 2002/026
USPC .................. 297/284.3; 280/735; 382/104
See application file for complete search history.

(56) References Cited

U.S. PATENT DOCUMENTS

| | | | |
|---|---|---|---|
| 5,822,707 A | | 10/1998 | Breed |
| 5,930,152 A | | 7/1999 | Dumont |
| 5,983,147 A | | 11/1999 | Krumm |
| 6,055,473 A | * | 4/2000 | Zwolinski .............. B60N 2/002 296/65.18 |
| 6,078,854 A | | 6/2000 | Breed |
| 6,081,757 A | | 6/2000 | Breed |
| 6,253,134 B1 | | 6/2001 | Breed |
| 6,450,530 B1 | | 9/2002 | Frasher |
| 6,584,389 B1 | | 6/2003 | Reimann |
| 6,735,508 B2 | | 5/2004 | Winkler |
| 6,775,603 B2 | | 8/2004 | Yester |
| 6,785,595 B2 | | 8/2004 | Kominami |
| 6,792,342 B2 | | 9/2004 | Breed |
| 6,817,979 B2 | | 11/2004 | Nihtila |
| 6,840,125 B1 | * | 1/2005 | Reynolds ............. A47C 31/126 73/866.4 |
| 6,840,637 B2 | | 1/2005 | Wang |
| 6,992,562 B2 | | 1/2006 | Fuks |
| 7,110,570 B1 | | 9/2006 | Berenz |
| 7,152,920 B2 | * | 12/2006 | Sugiyama ............. B60N 2/002 297/284.1 |
| 7,369,928 B2 | | 5/2008 | Wang |
| 7,422,285 B2 | | 9/2008 | Phipps |
| 7,430,467 B2 | | 9/2008 | Borke |
| 7,453,226 B2 | | 11/2008 | Wang |
| 7,469,924 B2 | | 12/2008 | Theisen |
| 7,485,095 B2 | | 2/2009 | Shusterman |
| 7,511,833 B2 | | 3/2009 | Breed |
| 7,650,212 B2 | | 1/2010 | Breed |
| 7,731,656 B2 | | 6/2010 | Miyajima |
| 7,762,582 B2 | | 7/2010 | Breed |
| 7,766,383 B2 | | 8/2010 | Breed |
| 7,797,138 B2 | * | 9/2010 | Reynolds ............. A47C 31/126 703/1 |
| 8,033,600 B2 | * | 10/2011 | Reynolds ............. B60N 2/4415 297/216.1 |
| 8,275,514 B2 | | 9/2012 | Hwang |
| 2002/0014356 A1 | * | 2/2002 | Cech ..................... B60N 2/002 177/144 |
| 2005/0271280 A1 | | 12/2005 | Farmer |
| 2006/0155175 A1 | | 7/2006 | Ogino |
| 2006/0206251 A1 | | 9/2006 | Barker |
| 2006/0273880 A1 | | 12/2006 | Yuhara |
| 2007/0096445 A1 | | 5/2007 | Breed |
| 2007/0116327 A1 | | 5/2007 | Breed |
| 2007/0262574 A1 | | 11/2007 | Breed |
| 2007/0265754 A1 | | 11/2007 | Curtis |
| 2008/0088441 A1 | | 4/2008 | Breed |
| 2008/0088462 A1 | | 4/2008 | Breed |
| 2008/0108372 A1 | | 5/2008 | Breed |
| 2008/0143085 A1 | | 6/2008 | Breed |
| 2008/0228358 A1 | | 9/2008 | Wang |
| 2008/0272906 A1 | | 11/2008 | Breed |
| 2009/0088929 A1 | | 4/2009 | Launay |
| 2010/0075655 A1 | | 3/2010 | Howarter |
| 2010/0141435 A1 | | 6/2010 | Breed |
| 2010/0178906 A1 | | 7/2010 | Kennedy |
| 2010/0179438 A1 | | 7/2010 | Heneghan |

FOREIGN PATENT DOCUMENTS

| | | |
|---|---|---|
| DE | 19806535 | 9/2002 |
| DE | 19929418 | 10/2005 |
| JP | H06286508 A | 10/1994 |
| JP | 2004182150 | 7/2004 |
| JP | 2004182150 A | 7/2004 |
| JP | 2006341637 | 12/2006 |
| JP | 2006341637 A | 12/2006 |
| JP | 2006341735 A | 12/2006 |
| JP | 2010006163 A | 1/2010 |
| JP | 2010195169 | 9/2010 |
| JP | 2010195169 A | 9/2010 |
| JP | 5996542 | 9/2016 |
| KR | 19980078639 A | 11/1998 |
| KR | 1999020865 A | 3/1999 |

OTHER PUBLICATIONS

Certified translation of Japanese Patent Application Serial No. 2009-41607, 25 pages.
Extended European Search Report for European App. No. 11831588.6 dated Jan. 10, 2017, 3004 1.EP ||, 15 pages.
Chinese Rejection Decision for Chinese App. No. 201180056698.3 dated Dec. 27, 2016, 3004 CN ||, 7 pages.

(56) References Cited

OTHER PUBLICATIONS

Chinese Rejection Decision for Chinese App. No. 201180056698.3 dated May 18, 2017, 3004 CN II, 6 pages.

Third Office Action for Chinese Patent Application 201180056698.3, dated Jun. 20, 2016 including English language summary, 9 pages.

English summary of Japanese Office Action for Japanese Application No. 2013-532941 dated Apr. 7, 2016.

English summary of Chinese Office Action for Chinese Application Serial No. 201180056698.3 dated Dec. 28, 2015, 10 pages.

English summary of Japanese Office Action for Japanese Application Serial No. 2013-532941 dated Dec. 28, 2015, 10 pages.

English summary of Chinese Office Action for Chinese Application Serial No. 201180056698.3 dated Mar. 31, 2015, 7 pages, dated Apr. 23, 2015.

Chinese Office Action for Chinese Application Serial No. 201180056698.3, dated Mar. 31, 2015, 18 pages.

Japanese Office Action for Japanese App, No. 2016-163527 dated Aug. 22, 2017, 3004 JP-DIV1 II, 4 pages.

\* cited by examiner

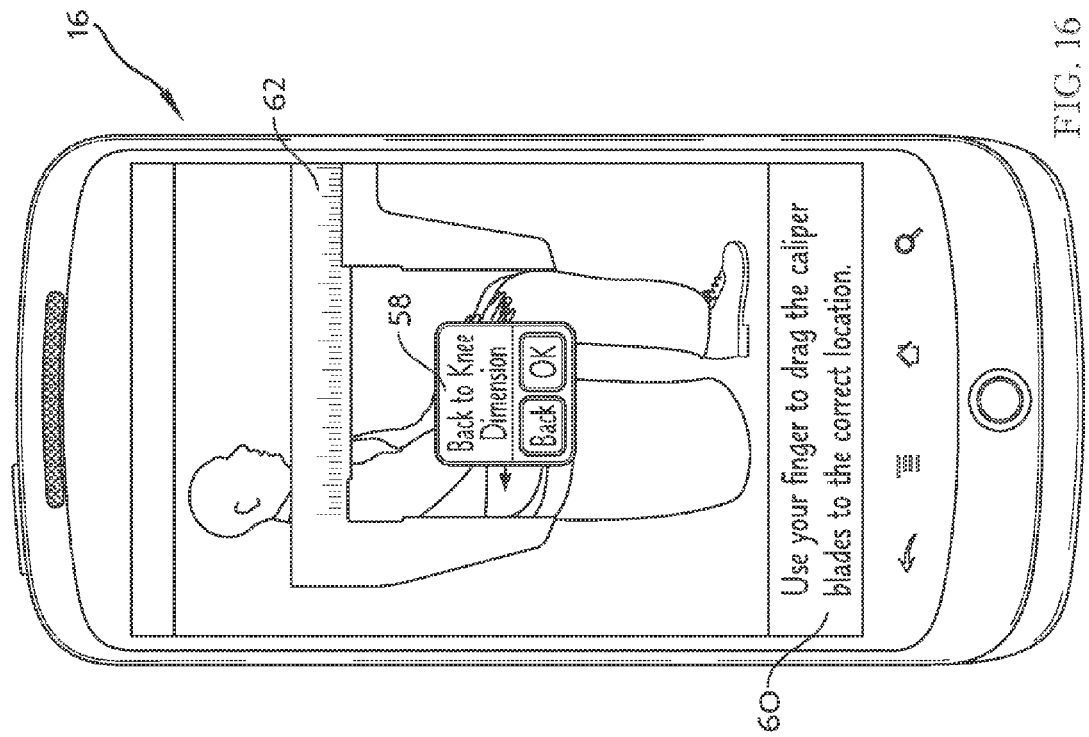
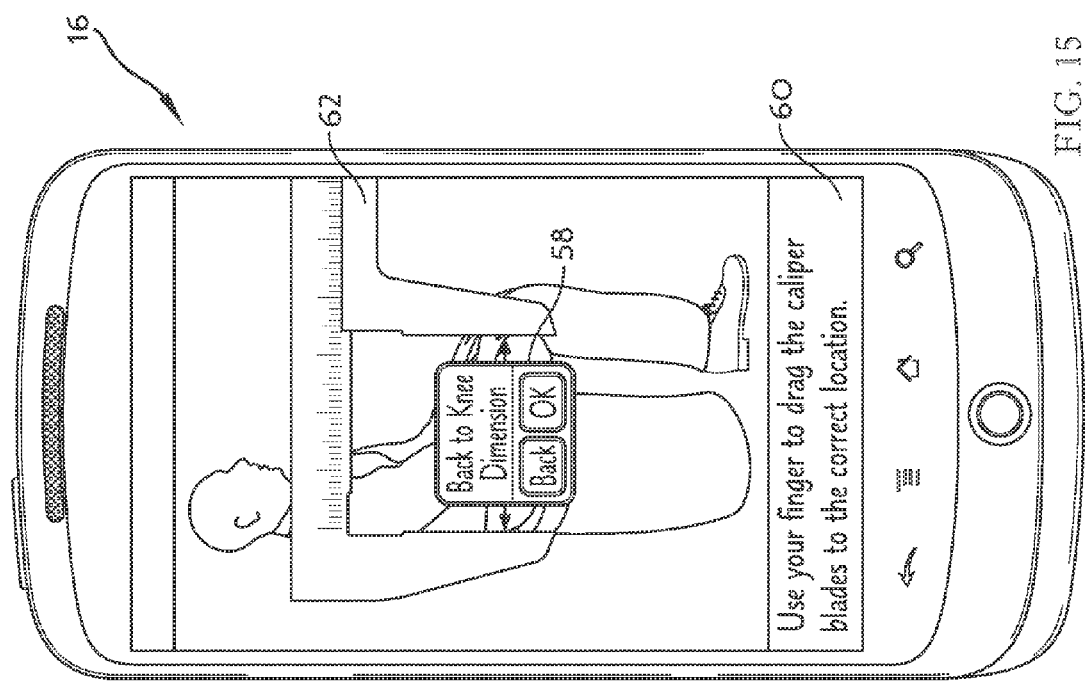

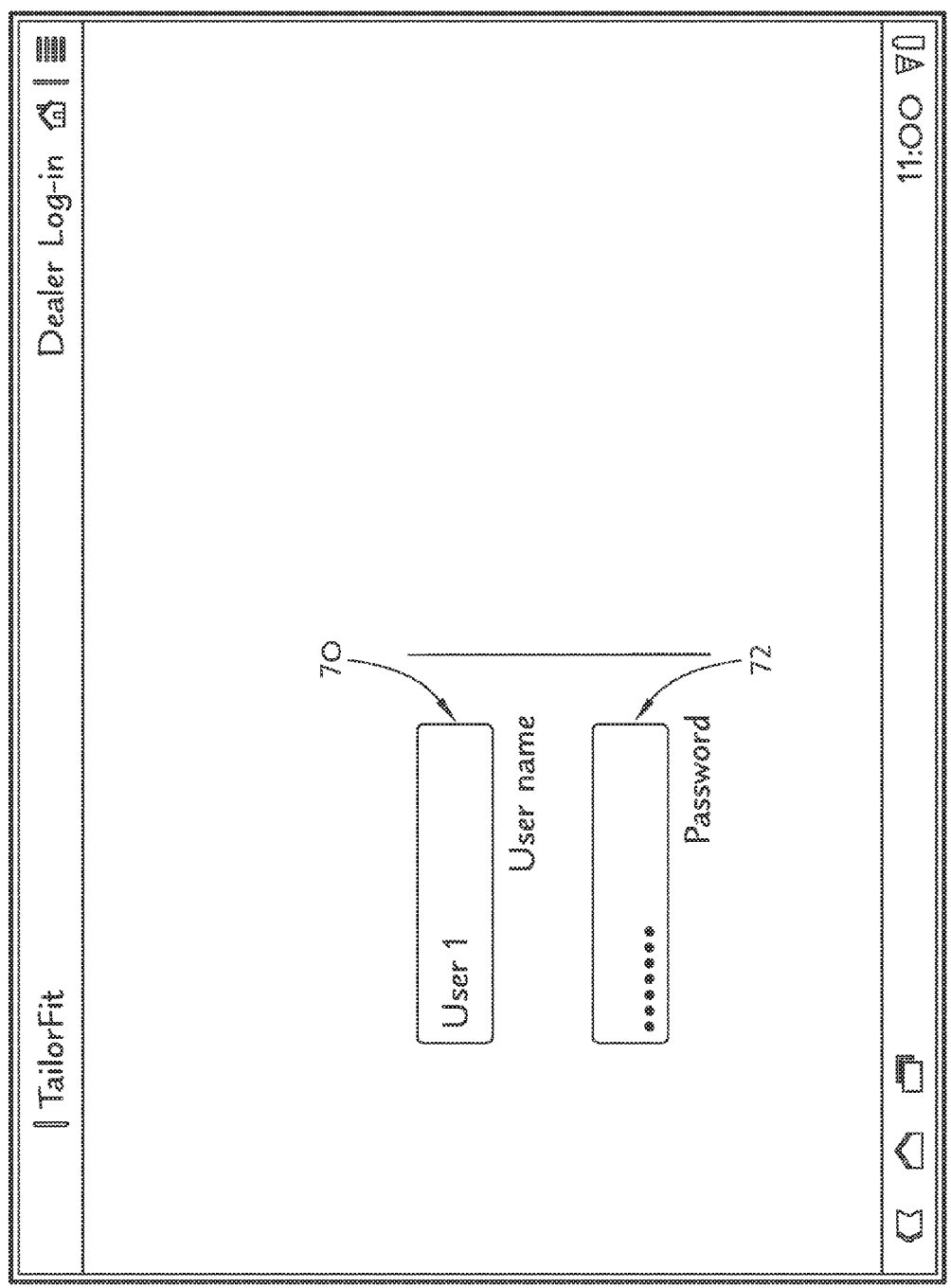

FIG. 22

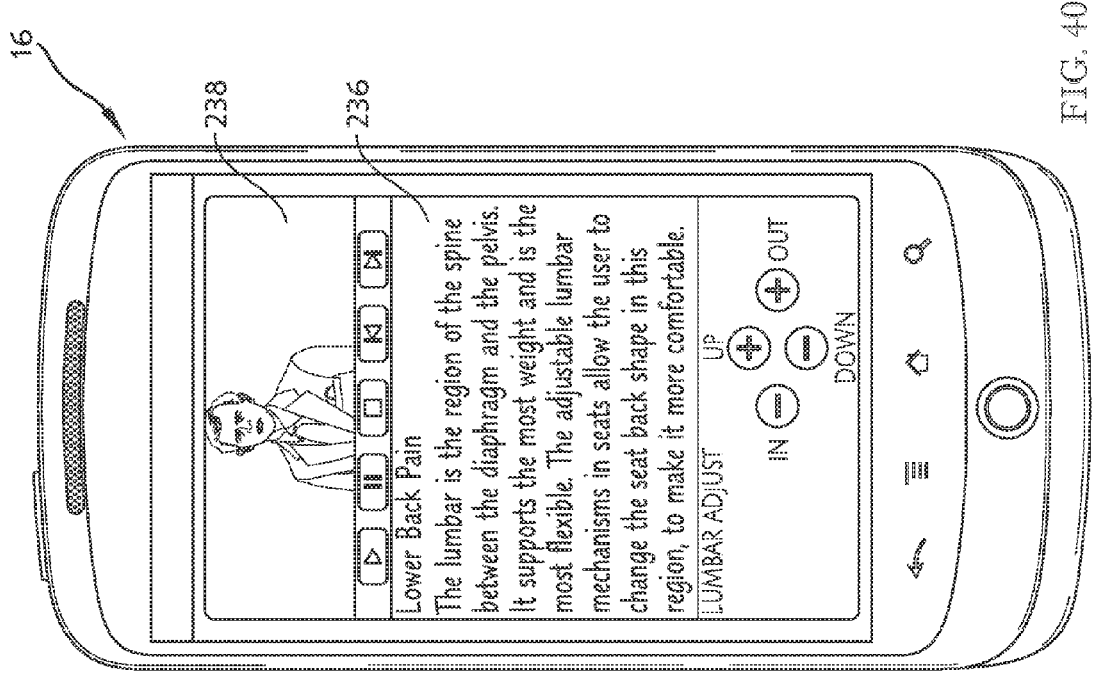
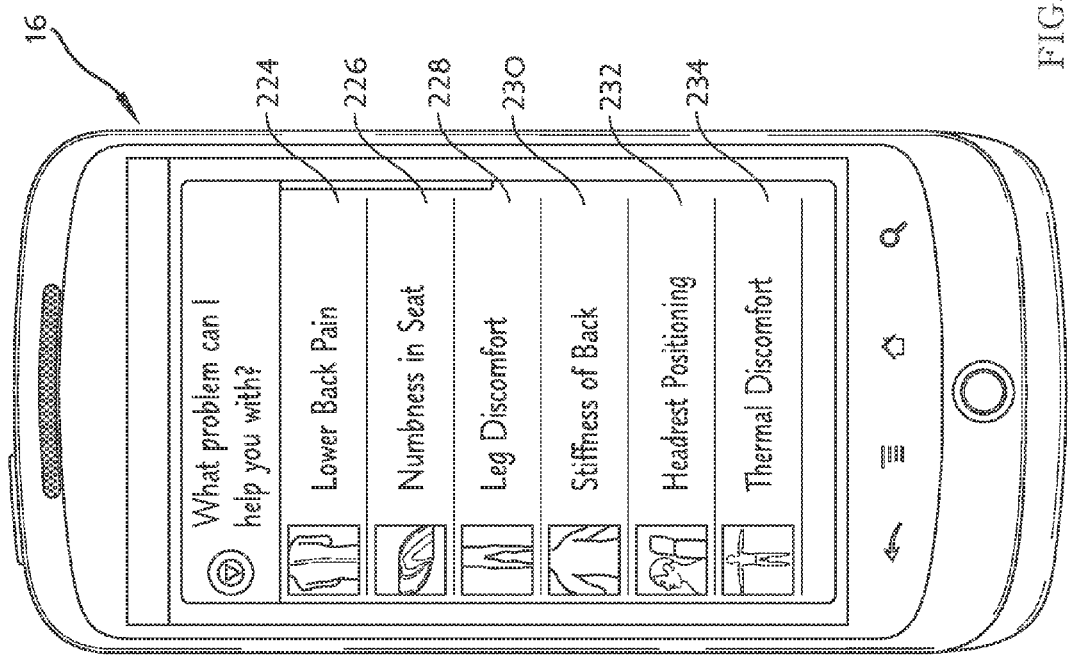
FIG. 39
FIG. 40

TailorFit

Available Options — 568, 569

- Wellness Therapies
- Pro Postures

☑ Shiatsu Massage
☑ Workout Relief
☑ Lower Back Therapy
☑ Heat & Pressure
☑ Stay Alert
☑ MicroFit
☑ IsoHeat Treatment

Option Selection

Shiatsu Massage

Shiatsu is a traditional therapy originating in Japan. Shiatsu massage treats common psychological and physical complaints by pressing pressure points. Proponents believe it alleviates disorders such as depression, anxiety, nausea, stiffness, headaches, arthritis, cramps, or pulled muscles. This Japanese equivalent of the Chinese method of acupressure comes from the Japanese words "Shi" and "atsu," meaning "finger pressure." Our Shiatsu therapy applies a rolling motion to the back, soothing sore muscles and reenergizing spirit.

[Install Selections]

FIG. 48

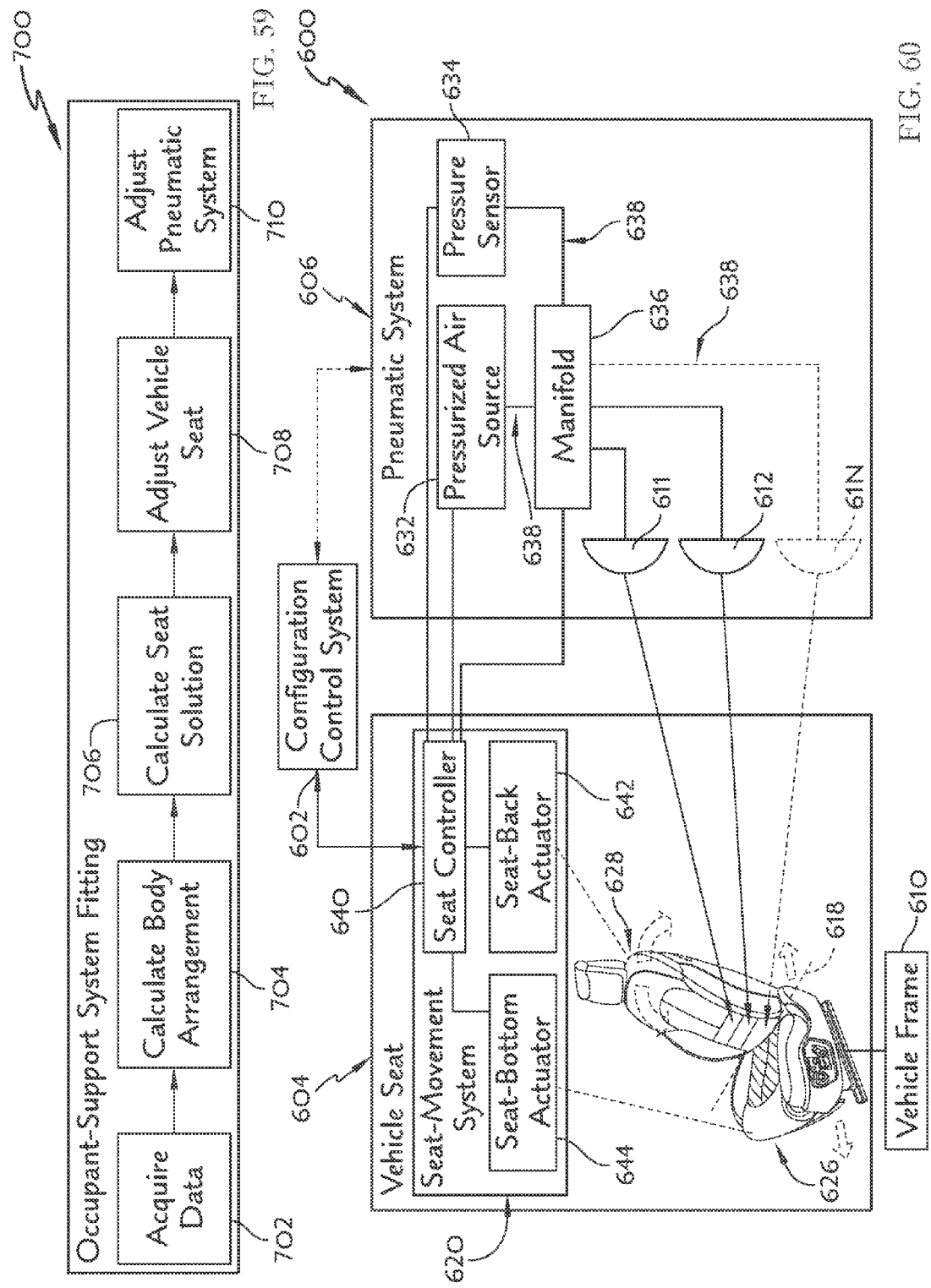

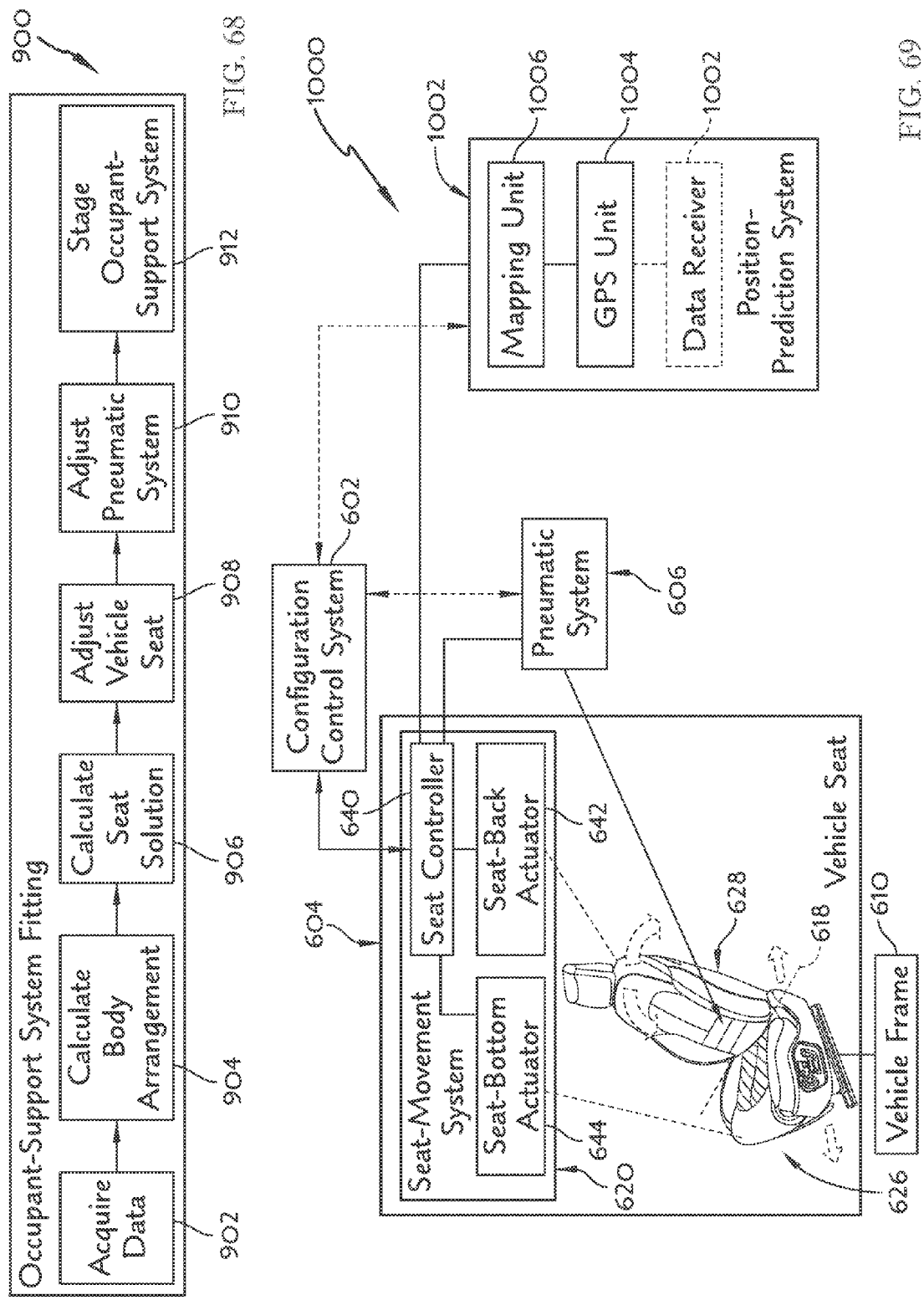

SYSTEM, METHODOLOGIES, AND COMPONENTS ACQUIRING, ANALYZING, AND USING OCCUPANT BODY SPECIFICATIONS FOR IMPROVED SEATING STRUCTURES AND ENVIRONMENT CONFIGURATION

PRIORITY CLAIM

This application is a continuation of U.S. application Ser. No. 15/227,103, filed Aug. 3, 2016, which is a continuation of U.S. application Ser. No. 14/591,822, filed Jan. 7, 2015, which is a continuation of U.S. application Ser. No. 13/267,463, filed Oct. 6, 2011, which claims priority under 35 U.S.C. §119(e) to U.S. Provisional Application No. 61/390,863, filed Oct. 7, 2010, U.S. Provisional Application No. 61/506,508, filed Jul. 11, 2011, and U.S. Provisional Application No. 61/533,408, filed Sep. 12, 2011, each of which is expressly incorporated by reference herein.

BACKGROUND

The present disclosure relates to seating, and particularly to seating used in conjunction with vehicles or other seating in which comfort and/or fit is valued. More particularly, the present disclosure relates to a system, methodologies, and components for improving fit of seating so as to be customized to an occupant.

SUMMARY

In accordance with illustrated embodiments, equipment and processes provide the ability to adjust manually and/or automatically various dimensions of a vehicle seat so that the vehicle is customized to an occupant's preferences. Such adjustment mechanisms enable the occupant to conform the seat dimensions and position to the occupant's comfort preferences and to customize the seat dimensions and positions for the occupant's height, weight, and gender. This type of customization is not limited to height adjustment or seat positioning but may also include control of the cushion tilt, fore/aft slide, upper back angle adjustment, cushion length adjustment, headrest adjustment, lumbar support, etc.

In illustrative embodiments, equipment and processes may generate a best-fit body arrangement for each occupant according to the occupant's anthropometric data rather than from generalizations. The anthropometric data may be obtained in various ways using computational devices and software or by manually measuring the relevant dimensions on the occupant's body. As a result, flexibility in obtaining the occupant data is provided.

In illustrative embodiments, a computational device may be a mobile terminal that includes a user interface. The user interface may be used for inputting occupant data. The mobile terminal may be included in the vehicle or separate from the vehicle, thus giving users increased flexibility while maximizing simplicity and usability for the user or other personnel obtaining the occupant data. Once an occupant's best-fit body arrangement is determined, it may be altered by changing predetermined criteria to achieve optimum, comfort, safety, and/or therapeutic benefit. The best-fit body arrangement may also be used to provide improved comfort on a continuous basis and/or in response to detected or predicted vehicle, road, or atmospheric conditions.

In illustrative embodiments, equipment and processes may generate a best-fit seating solution that provides an arrangement of a vehicle seat that causes an occupant's body to assume the best-fit body position when the occupant rests on the vehicle seat. The best-fit seating solution may be determined for each occupant according to the occupant's anthropometric data rather than from generalizations. As a result, a personalized or customized arrangement of the vehicle seat for the occupant may be achieved.

In illustrative embodiments, equipment and processes may be provided for generating a best-fit seating solution by obtaining occupant data, calculating body dimensions from the occupant data, and calculating a best-fit body arrangement for the occupant using the body dimensions and predetermined criteria. Occupant data may be obtained by receiving sensor data, receiving data directly input from a user interface, or a combination of the two. Obtaining occupant data may include inputting general occupant metrics (e.g., height, weight, and gender) and collecting sensor data. Collected sensor data may include a digital photograph showing overall dimensions of the occupant and/or accelerometer data obtained during predetermined movements of the accelerometer by the occupant. Sensor data and occupant data may be obtained on a mobile terminal that may be separate from the vehicle or included in or coupled to the vehicle.

In illustrative embodiments, occupant data may be used to calculate a set of body dimensions which model the occupant's body. Body dimensions may be calculated using occupant anthropometric data and sensor data. First, the sensor data and occupant data are converted into body ratios. The body ratios and occupant metrics are then used to calculate external-body dimensions. Thickness of the occupant's flesh may then be estimated and used to calculate internal-body dimensions that are representative of the occupant's skeleton.

In illustrative embodiments, the internal-body dimensions may then be used to calculate a best-fit body arrangement for the occupant by using predetermined criteria. A plurality of possible orientations of the occupant's internal body dimensions may then be calculated using a set of predetermined criteria, such as the angle of the occupant's femur relative to the floor of the vehicle. These various orientations may correspond to various postures the occupant may assume while sitting in the vehicle seat and satisfying a set of predetermined criteria. Finally, an average posture may be selected, and the corresponding arrangement of the occupant's body may be selected as the best-fit body arrangement.

In illustrative embodiments, equipment and processes may be provided for adjusting user-adjustable equipment in a vehicle by generating a best-fit seating solution, and generating equipment-adjustment instructions for automatic, powered, and/or manual vehicle seats. The best-fit seating solution may be generated using occupant data supplied to a computer. The computer may then determine the best-fit body arrangement for the occupant according to predetermined criteria. The computer may then generate equipment-adjustment instructions using known information about equipment in the vehicle. Relevant information may include the movement capability of the equipment, whether the equipment is moved manually or by powered actuators, and the position of the equipment in the vehicle.

In illustrative embodiments, the best-fit seating solution and the equipment-adjustment instructions may be generated on a remote computer that may be located away from the vehicle. The equipment-adjustment instructions may be communicated automatically or in a semi-autonomous manner to the equipment in the vehicle and adjusted using powered actuators included in the equipment, or may be communicated to a user in the field to adjust manually the equipment.

In illustrative embodiments, an occupant-support system may include a communication unit, at least one intelligent vehicle seat, and a source of data to be used by the intelligent vehicle seat. The occupant-support system may be configured to obtain data and optimize the occupant's seating experience using that data. The sources of data include a sensor integrated into the vehicle seat and configured to sense an occupant's anthropometric data and an occupant's comfort data, a sensor integrated into a vehicle cabin, input received from a mobile terminal, input received from a user interface, and input received from a remote server.

In illustrative embodiments, an occupant-support system illustratively includes a communication unit, at least one intelligent vehicle seat, and a source of data to be used by the intelligent vehicle seat. The communication unit included in the vehicle may be configured to provide means for communicating data to the intelligent vehicle seat from the data source. As a result, the data source may be a mobile terminal and a remote server working together to obtain occupant data and calculate seat-adjustment instructions, which are communicated back to the intelligent vehicle seat and carried out by the intelligent vehicle seat. In illustrative embodiments, the data source may be a user interface included in the vehicle that receives data from a user and displays data to the user.

In illustrative embodiments, the data source may be a sensor package included in a vehicle cabin or in the intelligent vehicle seat or a combination of the previously discussed data sources. The sensor package may be one or more sensors included in the vehicle seat and configured to obtain occupant data, e.g., weight, height, body dimensions, topography, and data relating to the occupant's perceived comfort. The occupant and comfort data may be sent across the communication network to a remote server and used to continually update and modify the best-fit seating solution applied to the intelligent vehicle seat.

In illustrative embodiments, an occupant-support system may include the communication unit, a front intelligent vehicle seat, and a rear intelligent vehicle seat. The front and rear intelligent vehicle seats may be coupled to the communication unit and may be configured to exchange data about the position and state of each seat with the other seat either directly or through the communication unit. As a result, the intelligent seats may act as sources of data that are then used to calculate a best-fit cabin solution. The best-fit cabin solution may be the arrangement of intelligent vehicle seats relative to one another that maximizes comfort and safety of each occupant sitting in his or her seat.

In illustrative embodiments, an occupant-support system may include a communication unit, at least one intelligent vehicle seat, and a source of data to be used by the at least one intelligent vehicle seat. The occupant-support system may be further configured to use data regarding an occupant's size and seating preferences to optimize the occupant's seating experience and to provide additional customization of an occupant's seating configuration performed on an initial or continuous basis.

In illustrative embodiments, an occupant support system may include a vehicle seat and a pneumatic system coupled to the vehicle seat. The pneumatic system may includes a pneumatic bladder coupled to the vehicle to inflate and change a seat surface included in the vehicle seat, a pressurized air source coupled to the bladder to change the air pressure in the bladder, and a pressure sensor coupled to the pneumatic bladder to sense the air pressure in the bladder. The pressure sensor may be further coupled to a control unit included in the vehicle seat to cause the control unit to command the pressurized air source to alter the air pressure in the bladder when the air pressure is sensed to be outside an acceptable range.

In illustrative embodiments, an occupant-support system may be configured to alter the occupant's seating configuration parameters to adjust for vehicle handling and/or speed variations resulting from predicted driving conditions resulting from detection of the occupant's vehicle based on Global Positioning System (GPS) detection. The occupant-support system may be further configured to adjust for detected weather and/or traffic conditions.

In illustrative embodiments, an occupant's vehicle seat arrangement may be adjusted based on data generated by a sensor package that may include one or more sensors coupled to the occupant's vehicle seat. These vehicle-seat sensors may be configured to obtain occupant data (e.g., weight, height, body dimensions, topography) and data relating to the occupant's perceived comfort. The occupant and comfort data may be sent across the communication unit to a remote computer and used to continually update and modify the best-fit seating solution applied to the intelligent vehicle seat.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIGS. 1-22 are a series of views showing various embodiments and configurations of a configuration control system and their illustrative use, wherein:

FIG. 1 is an illustrative diagram of the configuration control system components acquiring, analyzing and using occupant body specifications to determine a best-fit body arrangement for an occupant;

FIG. 2 is a diagrammatic view of a configuration control system in accordance with the present disclosure showing that the configuration control system includes a mobile terminal, a remote computer, and a communication unit configured to facilitate communication between the mobile terminal and the remote computer;

FIG. 3 is a diagrammatic view of a vehicle-seat fitting process performed by the configuration control system of FIG. 2 showing that the vehicle-seat fitting process includes acquiring data and calculating body arrangements;

FIG. 4 is a diagrammatic view showing that acquiring data includes acquiring occupant data through a series of illustrative steps including initiating data acquisition, accessing a user interface, inputting anthropometric data associated with an occupant, and storing the occupant data for use during calculation of body arrangements as suggested in FIG. 5;

FIG. 5 is a diagrammatic view showing that calculating body arrangement includes sending data by encrypting the occupant data, sending the occupant data, authenticating the occupant data, and decrypting the occupant data and analyzing data by calculating body ratios, calculating external-body dimensions, calculating internal-body dimensions, calculating best-fit comfort zones, selecting best-fit postures, and calculating a best-fit body arrangement for the occupant;

FIG. 6 is an enlarged view of a mobile terminal running at least one software application configured to perform acquisition and analysis of occupant body specifications for modifying seating structure and environment configuration;

FIG. 7 is an enlarged view of the mobile terminal of FIG. 2 displaying, on the user interface, a main menu of functions for acquiring, analyzing and using occupant body specifications for improved seating structure, and environment configuration;

FIG. 8 is an illustrative diagram of the components of the mobile terminal illustrated in FIG. 6 and configured to cooperate to support and implement the menu of functions for acquiring, analyzing, and using occupant body specifications as shown in FIG. 7 for improved seating structure and environment configuration;

FIGS. 9-20 provide a series of screen shots illustrating the user interface functionality provided by at least one software application and used to perform optimization and/or customization of an occupant's vehicle seat based on physical dimensions of the occupant, wherein:

FIG. 21 is a view of another mobile terminal running at least one software application configured to receive input of occupant data as suggested in FIG. 22 after a service provider logs in via a login screen;

FIG. 22 is a view of the mobile terminal of FIG. 21 showing an interface that allows the user to provide a gender of the occupant and input anthropometric data measured manually from the occupant;

FIGS. 23-57 are a series of views showing various embodiments and configurations of an occupant-support system including the configuration control system of FIGS. 1-22 and an adjustable vehicle seat, wherein:

FIG. 23 is a diagrammatic view of an illustrative vehicle-seat fitting process performed on an occupant-support system showing that the vehicle-seat fitting process includes acquiring data, calculating a body arrangement, calculating a seat solution, and adjusting the vehicle seat;

FIG. 24 is a diagrammatic view of an occupant-support system in accordance with the present disclosure showing that the occupant-support system includes a configuration control system and an adjustable vehicle seat;

FIG. 25 is a diagrammatic view showing that acquiring data includes acquiring occupant data and acquiring vehicle data, acquiring occupant data includes initiating data acquisition, accessing a user interface, inputting anthropometric data associated with an occupant, and storing the occupant data for use during calculation of body arrangements, as suggested in FIG. 26, and acquiring vehicle data includes obtaining vehicle-seat data, obtaining other vehicle-equipment data, and storing the vehicle data for use during calculating of the seat solution as suggested in FIG. 27;

FIG. 26 is a diagrammatic view showing that calculating body arrangement includes (i) sending data by encrypting the occupant data, sending the occupant data, authenticating the occupant data, and decrypting the occupant data and (ii) analyzing data by calculating body ratios, calculating external-body dimensions, calculating internal-body dimensions, calculating best-fit comfort zones, selecting best-fit postures, and calculating a best-fit body arrangement for the occupant for use during calculating of the seat solution as suggested in FIG. 27;

FIG. 27 is a diagrammatic view showing that calculating the seat solution includes (i) calculating a best-fit seating solution, (ii) creating seat-adjustment instructions, and (iii) sending adjustment instructions by encrypting the adjustment instructions, sending the seat-adjustment instructions, and decrypting the seat-adjustment instructions, and showing that adjusting the vehicle seat includes (i) adjusting a position of the seat bottom per the seat-adjustment instructions, (ii) adjusting a position of the seat back per the seat-adjustment instructions, and (iii) adjusting a position of the other vehicle seat options;

FIG. 28 is a diagrammatic view of the system components acquiring, analyzing, and using occupant body specifications for improving seating structure and environment configuration;

FIG. 29 is a screen shot of a mobile terminal running at least one software application that is configured obtain vehicle data by scanning by scanning a QR Code so that the mobile terminal is able to lookup relevant vehicle data including vehicle seat type and other vehicle equipment capabilities or by manually inputting a vehicle VIN;

FIG. 30 is a view similar to FIG. 29 showing that the QR Code has been accepted and that the associated vehicle VIN has been input;

FIG. 31 is a screen shot of the mobile terminal showing stored data associated with the vehicle VIN including at least one occupant profile that may contain occupant data, vehicle data, buttons that allow adding a new occupant profile, inputting occupant data, and managing other options including adding other functional programs;

FIGS. 32-34 provide a series of screen shots illustrating the user interface functionality provided by at least one software application and used to deliver optimized and/or customized vehicle seat parameters from a user's mobile terminal to the occupant's vehicle seat, wherein FIG. 35 is another screen shot of a mobile terminal showing that after occupant data has been obtained, a best-fit arrangement of the vehicle seat is calculated and then instructions are communicated to a seat-movement system included in the vehicle seat that causes the vehicle seat to move to the best-fit arrangement;

FIG. 36 is a view showing that adjustment of the vehicle seat has been completed;

FIGS. 37 and 38 provide perspective illustrations of examples of control panels coupled to a vehicle seat;

FIG. 39 provides a screen shot illustrating the user interface provided functionality by at least one software application for enabling a user to select from one or more physical ailments or treatment conditions for which he is seeking assistance;

FIG. 40 provides a screen shot illustrating the user interface functionality provided by at least one software application for disseminating treatment information and/or recommendations for positioning of a vehicle seat;

FIGS. 41-43 provide screen shots illustrating the user interface functionality provided by at least one software application for enabling a user to select from one or more upgrade options for upgrading functionality provided by the occupant's vehicle seat via wireless Over The Air (OTA) configuration;

FIGS. 44 and 45 provide a series of screen shots illustrating the user interface functionality provided by at least one software application and used to deliver data and/or software programming associated with the upgraded functionality to the user's mobile terminal;

FIGS. 46 and 47 provide a series of screen shots illustrating the user interface functionality provided by at least one software application and utilized to deliver the data and/or software programming associated with the upgraded functionality from a user's mobile terminal to the occupant's vehicle seat;

FIG. 48 is a screen shot of the mobile terminal showing that the user can select from one of a Wellness Therapies button and a Pro Postures button and suggesting that the user has selected the Wellness Therapies button;

FIG. 49 is a view similar to FIG. 48 showing that the user has selected a Shiatsu Massage application, a Workout Relief application, and the MicroFit application among various other Wellness Therapies;

FIG. 50 is a screen shot of the mobile terminal showing that the user has selected a Performance Drive application and a GPSFit application and that the user has pressed the Install Selections button causing the selected applications to be installed into the seat-movement system;

FIG. 51 is a view showing that the user selected applications are being sent to the vehicle seat for installation in the seat-movement system;

FIG. 52 is a view similar to FIG. 51 showing that the installation of the selected applications are complete;

FIG. 53 is a diagrammatic view used to explain functionality that may be provided to a user via the system, methodologies and components for acquiring, analyzing and using occupant body specifications to provide for improved seating structure and environment configuration;

FIG. 54 is a diagrammatic view of another embodiment of an occupant-support system showing that the occupant-support system includes a front vehicle seat and a rear vehicle seat communicating between on another to achieve a best-fit arrangement of both the front and the rear vehicle seat;

FIGS. 55-57 provide various illustrative diagrams describing various configurations for providing certain communication functionality used by the system;

FIGS. 59-67 are a series of views showing various embodiments and configurations of an occupant-support system including the configuration control system of FIGS. 1-22, an adjustable vehicle seat, and a pneumatic system, wherein:

FIG. 59 is a diagrammatic view of an illustrative occupant-support fitting process performed on the occupant-support system showing that the occupant-support fitting process includes acquiring data, calculating a body arrangement, calculating a seat solution, adjusting the vehicle seat, and adjusting the pneumatic system to achieve an optimum-fit arrangement of the occupant-support system;

FIG. 60 is a diagrammatic view of a second embodiment of an occupant-support system in accordance with the present disclosure showing that the occupant-support system includes the configuration control system, an adjustable vehicle seat in communication with the configuration control system, and a pneumatic system including a pair of pneumatic bladders and a single pressure sensor coupled to both pneumatic bladders to sense the air pressure in each pneumatic bladder in series one at a time;

FIG. 61 is a diagrammatic view of the pneumatic adjustment portion of the occupant-support fitting process showing that pneumatic adjustment is accomplished by inflating an air bladder included in the pneumatic system, sensing air pressure in the pneumatic bladder, determining if the air pressure is out of an acceptable range, maintaining the air pressure in the bladder if the air pressure is in the acceptable range, and correcting the air pressure in the bladder if the air pressure is out of the acceptable range;

FIG. 62 is an illustrative screen shot of a mobile terminal in which a user activates an application on the mobile terminal called MicroFit which, as an example, causes the seat-movement system to perform the pneumatic adjustment portion of the occupant-support fitting process that receives an air-pressure reading from the pneumatic bladder and commands a pressurized air source to adjust the air pressure in the pneumatic bladder to achieve the acceptable pressure range so that an interface pressure between the occupant and the pneumatic bladder is minimized;

FIG. 63 is a screen shot of the mobile terminal showing the MicroFit application beginning to start and showing that a plurality of pneumatic bladders coupled to the vehicle seat may be adjusted in (i) a momentary mode in which one or more pressure sensors included in the pneumatic system send air-pressure readings to the seat-movement system to cause the air pressures in the bladders to be adjusted to be in the acceptable pressure range once as shown in FIG. 61 or (ii) a continuous mode in which the pressure sensors continuously send air-pressure readings to the seat-movement system and the system continuously maintains the pressure in the bladders in the acceptable pressure range as suggested in FIG. 61 (in phantom);

FIG. 64 is a screen shot of the mobile terminal showing initial readings of the various pneumatic bladders and showing that both seat-back wing bladders and a middle lumbar bladder have very high pressure that should be reduced, that both seat-bottom wing bladders and a lower lumbar bladder have low pressure that should be increased, and that the upper lumbar bladder is in the acceptable pressure range;

FIG. 65 is a screen shot of the mobile terminal showing that the user has selected the continuous mode and that the seat-movement controller will cause the pneumatic system to continuously sense and adjust the pressure in the pneumatic bladders to maintain the pressure in the acceptable range as suggested in phantom in FIG. 61;

FIG. 66 is another screen shot of the mobile terminal showing that the seat-movement system may be reset to its initial configuration when a user presses and holds a master-reset button and that pressure in each of the pneumatic bladders may be adjusted manually by the user;

FIG. 67 is a diagrammatic view of a third embodiment of an illustrative occupant-support system showing that the occupant-support system includes the configuration control system, the adjustable vehicle seat in communication with the configuration control system, and a pneumatic system that includes two pneumatic bladders that are coupled to two separate pressure sensors that are configured to sense air pressure in each pneumatic bladder in parallel;

FIGS. 68-76 are a series of views showing various embodiments and configurations of an occupant-support system including the configuration control system of FIGS. 1-22, an adjustable vehicle seat, a pneumatic system, and a prediction system that predicts a future position and speed of the vehicle and provides the future position and speed of the vehicle to the vehicle seat to cause the configuration control system and vehicle seat to calculate a predicted optimum-fit of the occupant-support system to support the occupant in the vehicle appropriately as the vehicle seat passes through the future position, wherein FIG. 68 is a diagrammatic view of an illustrative occupant-support staging process performed on the occupant-support system showing that the occupant-support predicted fitting process includes acquiring data, calculating a body arrangement, calculating a seat solution, adjusting the vehicle seat, adjusting the pneumatic system, and staging the occupant-support system to achieve a predicted optimum-fit arrangement of the occupant-support system;

FIG. 69 is a diagrammatic view of a second embodiment of an occupant-support system in accordance with the present disclosure showing that the occupant-support system includes the configuration control system, an adjustable vehicle seat in communication with the configuration control system, the pneumatic system, and a prediction system that includes a Global Positioning System (GPS) unit and mapping unit that cooperate to predict the future position and speed of the vehicle as suggested in FIG. 70;

FIG. 70 is a diagrammatic view of the staging the occupant-support system portion of the occupant-support predicted fitting process showing that staging the occupant-support system portion is determining an actual position of the vehicle, determining an actual speed of the vehicle, calculating a predicted future position of the vehicle, calculating a predicted future speed of the vehicle, calculating a predicted seat solution of the vehicle seat, adjusting the vehicle seat to achieve the predicted seat solution, adjusting the pneumatic system to establish a predicted optimum-fit arrangement of the occupant-support system;

FIG. 71 is a screen shot of a mobile terminal showing an initial arrangement of the vehicle seat and the pneumatic system that is associated with normal-driving conditions and showing that the vehicle seat and pneumatic system have not been adjusted because the vehicle is moving along a straight section of road;

FIG. 72 is a view similar to FIG. 71 showing that the vehicle is about to enter a wavy portion and that the prediction system has provided a predicted future position and speed to the seat-movement system included in the vehicle seat that causes the vehicle seat to move its track position from 100 mm to 95 mm, a seat bottom included in the vehicle seat to decrease cushion tilt from −3.0 degrees to −1.0 degrees, and a seat back included in the vehicle seat to decrease the recline angle from 29 degrees to 27 degrees and simultaneously increasing lateral support from 20% to 40%;

FIG. 73 is a view similar to FIG. 72 showing that the vehicle has exited the wavy portion and is about to enter a large right-hand curve and that the prediction system has provided another predicted future position and speed to the seat-movement system causing the vehicle seat to move its track position from 95 mm to 90 mm, the seat bottom to increase cushion tilt from −1.0 degrees to +1.0 degrees, and the seat back to increase the recline angle from 27 degrees to 29 degrees and simultaneously increasing lateral support from 40% to 45%;

FIG. 74 is a view similar to FIG. 73 showing that the vehicle has exited the right-hand curve and is about to enter a left-hand turn and that the prediction system has provided another predicted future position and speed to the seat-movement system causing the vehicle seat to maintain the track position at 90 mm, the seat bottom to increase cushion tilt from +1.0 degrees to +3.0 degrees, and the seat back to maintain the recline angle at 29 degrees and simultaneously increasing lateral support from 45% to 100%; and FIG. 75 is a view similar to FIG. 74 showing that the vehicle has exited the left-hand curve and is about to enter a second straight portion and that the prediction system has provided another predicted future position and speed to the seat-movement system causing the vehicle seat to move its track position from 90 mm to 100 mm, the seat bottom to decrease cushion tilt from +3.0 degrees to −3.0 degrees, and the seat back to decrease the recline angle from 29 degrees to 25 degrees and simultaneously decreasing lateral support from 100% to 20%.

DETAILED DESCRIPTION

Figure 1:
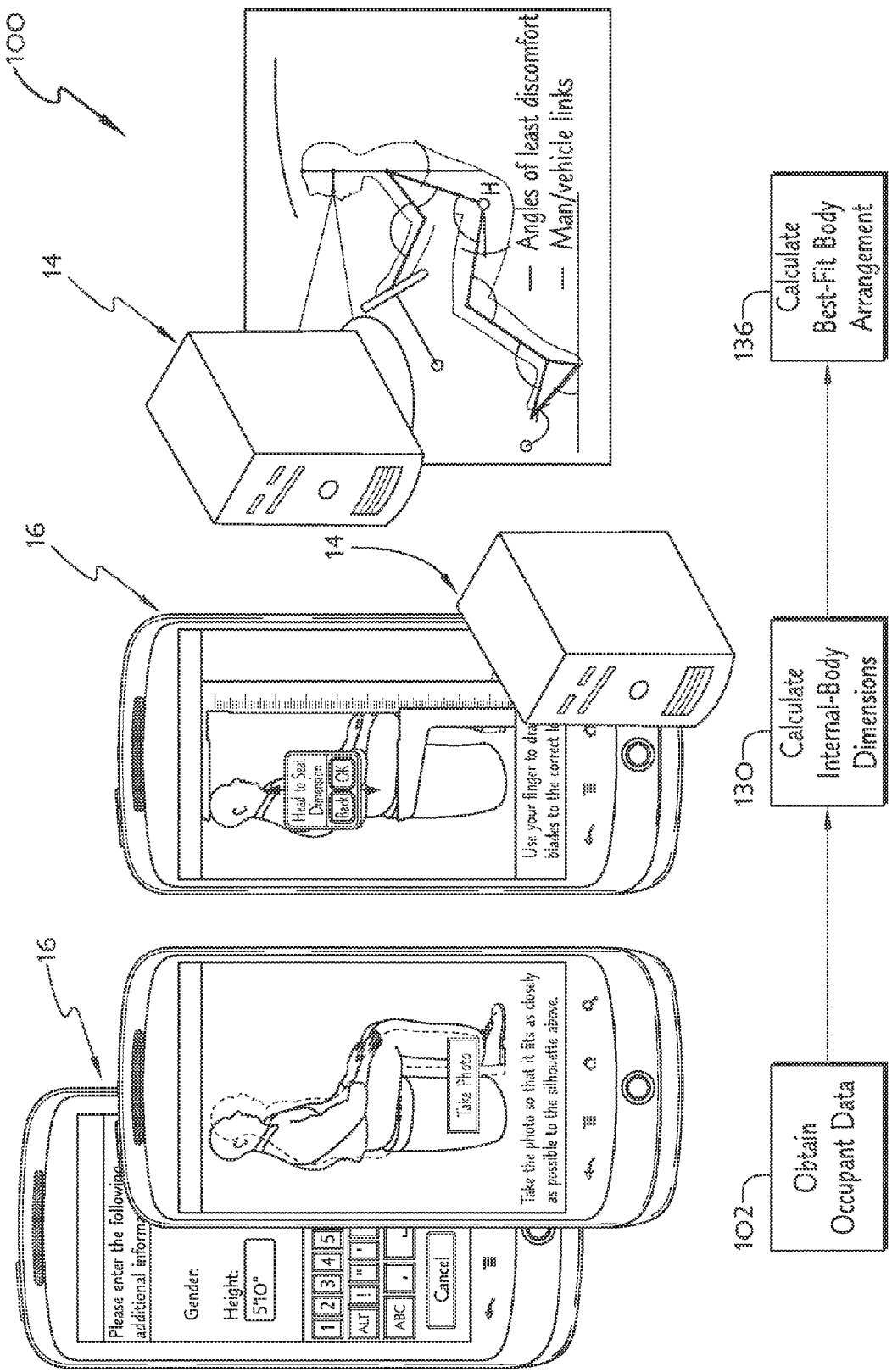
Figure 2:
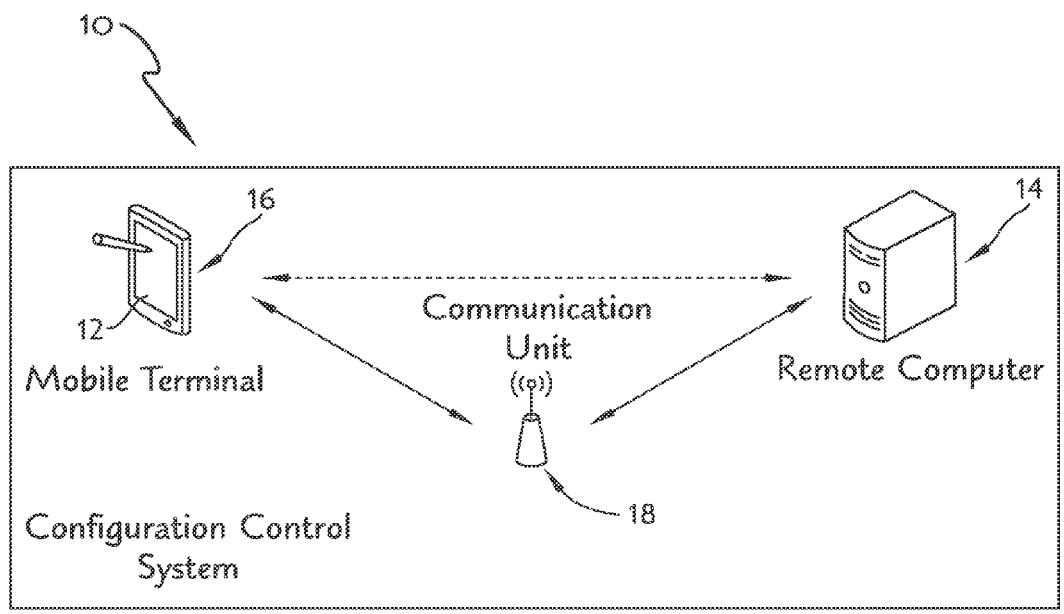

A configuration control system 10 is shown in FIG. 2 and may be configured to perform an occupant-body fitting process 100 that is shown in FIG. 1. Configuration control system 10 may perform occupant-body fitting process 100 to determine a best-fit body arrangement for an occupant that maximizes occupant comfort and safety.

Figure 23:
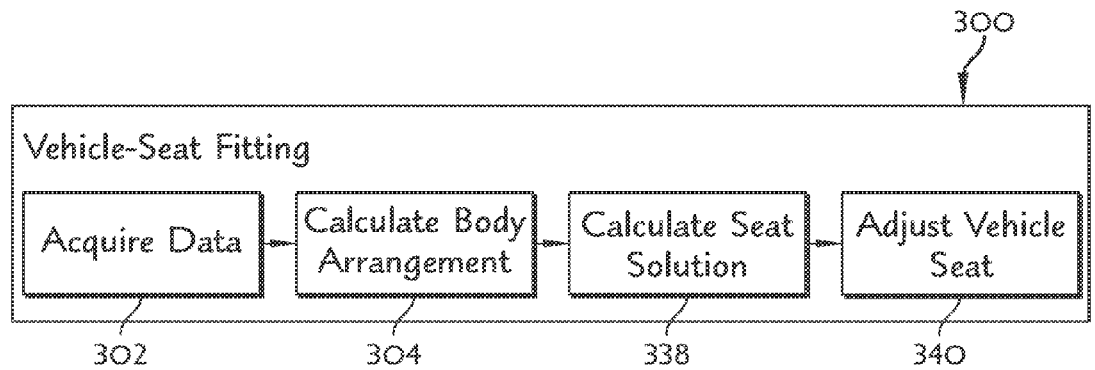
Figure 24:
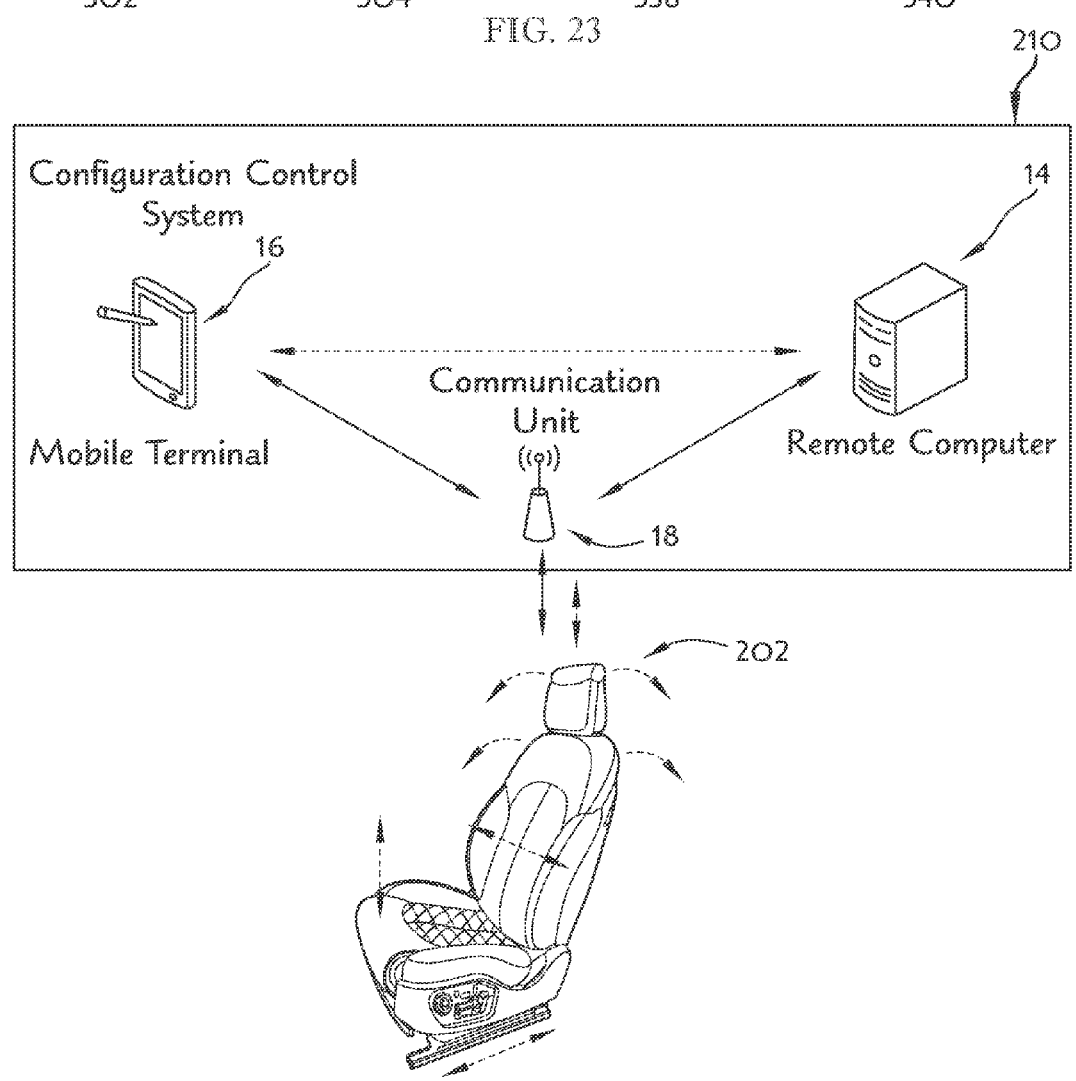

A first embodiment of an occupant-support system 200 is shown in FIG. 24 and may be configured to perform a vehicle-seat fitting process 300 that is shown in FIG. 23. Occupant-support system 200 may perform vehicle-seat fitting process 300 to generate a best-fit seating solution so that a vehicle seat 202 included occupant-support system 200 may be arranged to cause an occupant sitting on vehicle seat 202 to be in the best-fit body arrangement.

Figure 54:
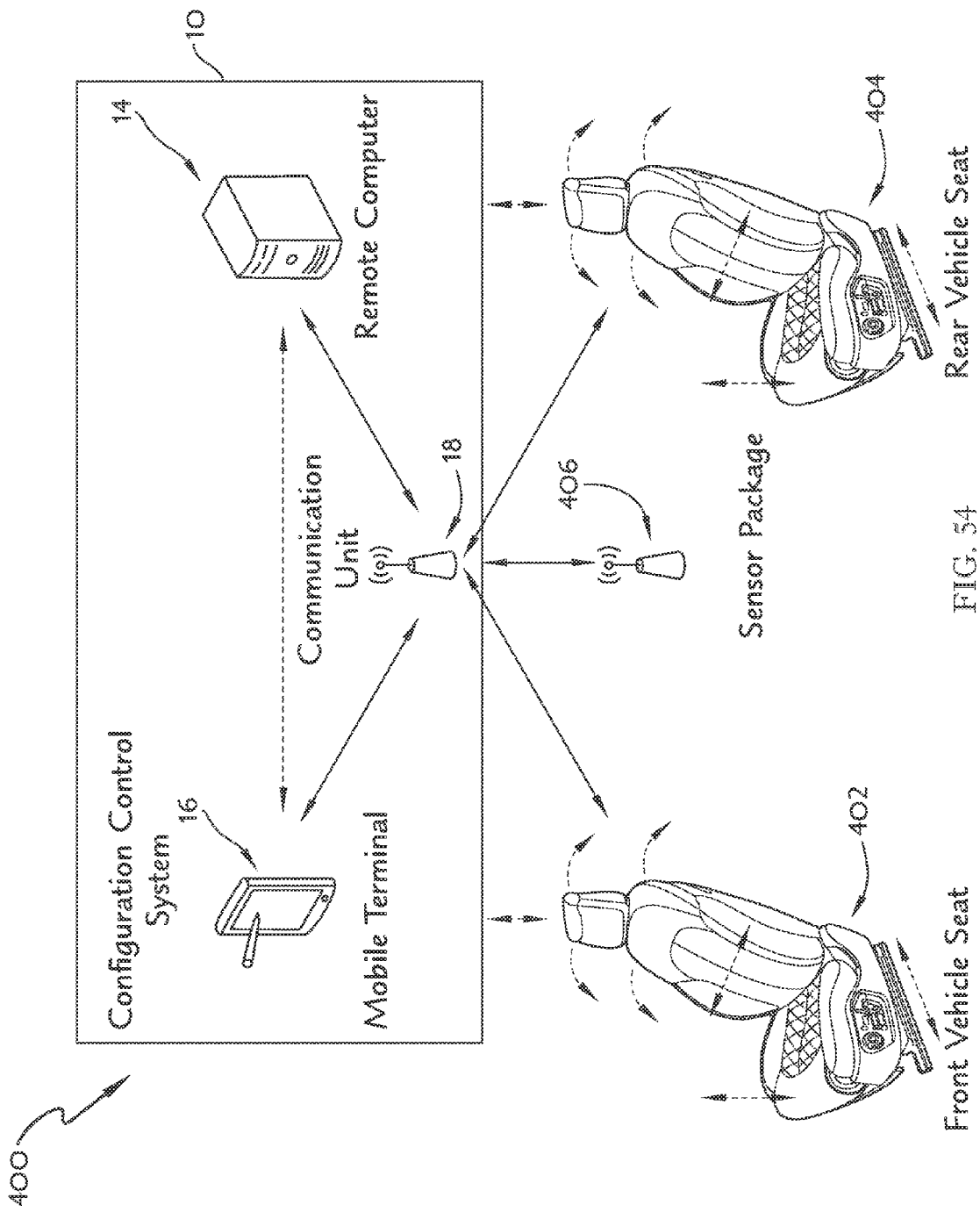

A second embodiment of an occupant-support system 400 is shown in FIG. 54. Occupant-support system 400 may include front and rear vehicle seats 402, 404 and a sensor package 406 that cooperate together with configuration control system 10 to determine a best-fit seating solution for both vehicle seats 402, 404.

A third embodiment of an occupant-support system 600 is shown in FIG. 60 and may be configured to perform an occupant-support system fitting process 700 that is shown in FIG. 59. Occupant-support system 600 may further include a pneumatic system 606 that cooperates with a vehicle seat 604 and configuration control system 602 to perform occupant-support system fitting process 700 to cause vehicle seat 604 and pneumatic system 606 to be arranged in an optimum-fit arrangement that further maximizes comfort and safety of the occupant sitting on vehicle seat 604. Pneumatic system 606 may be configured to control air pressure in multiple air bladders in series.

Figure 67:
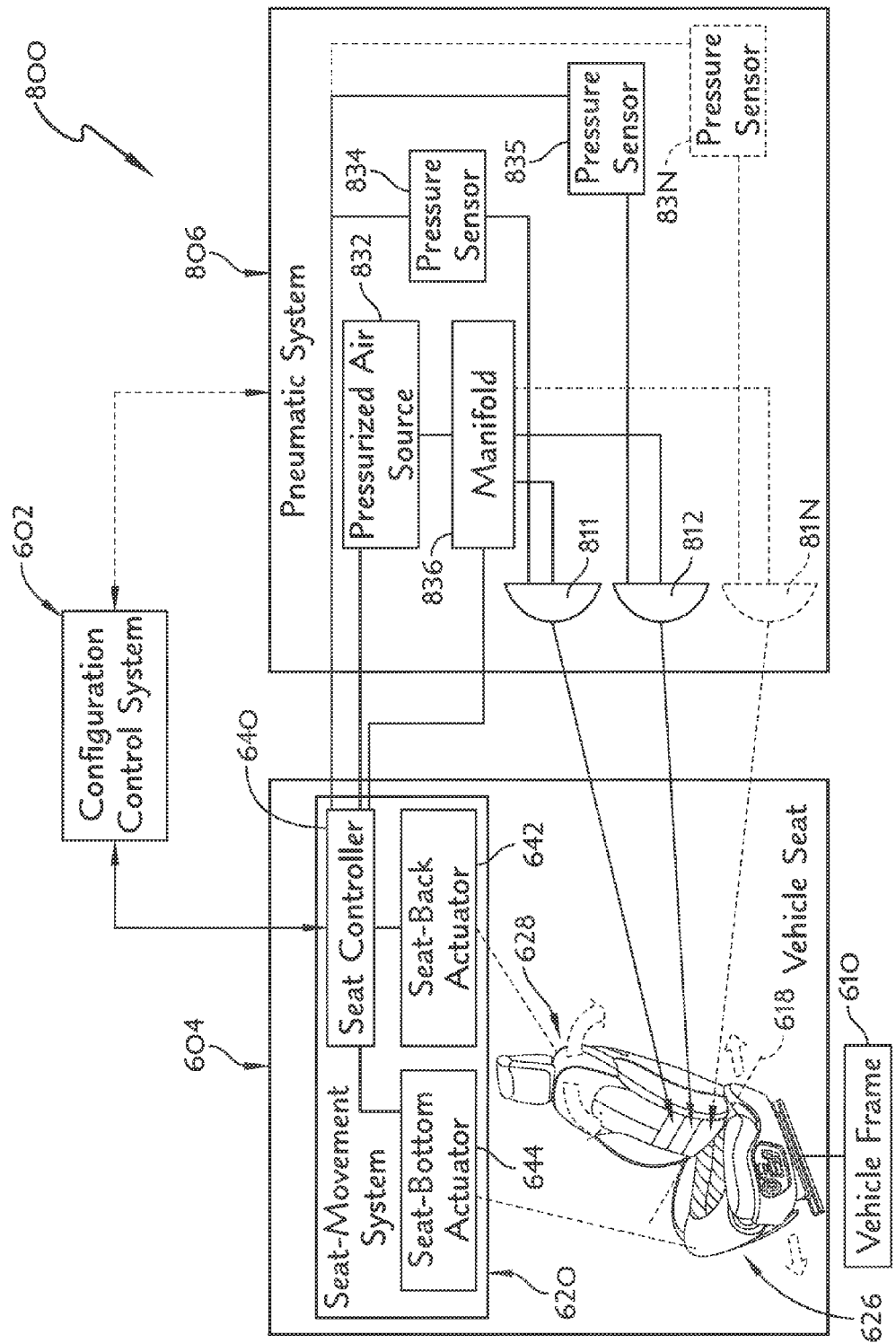
Figure 70:
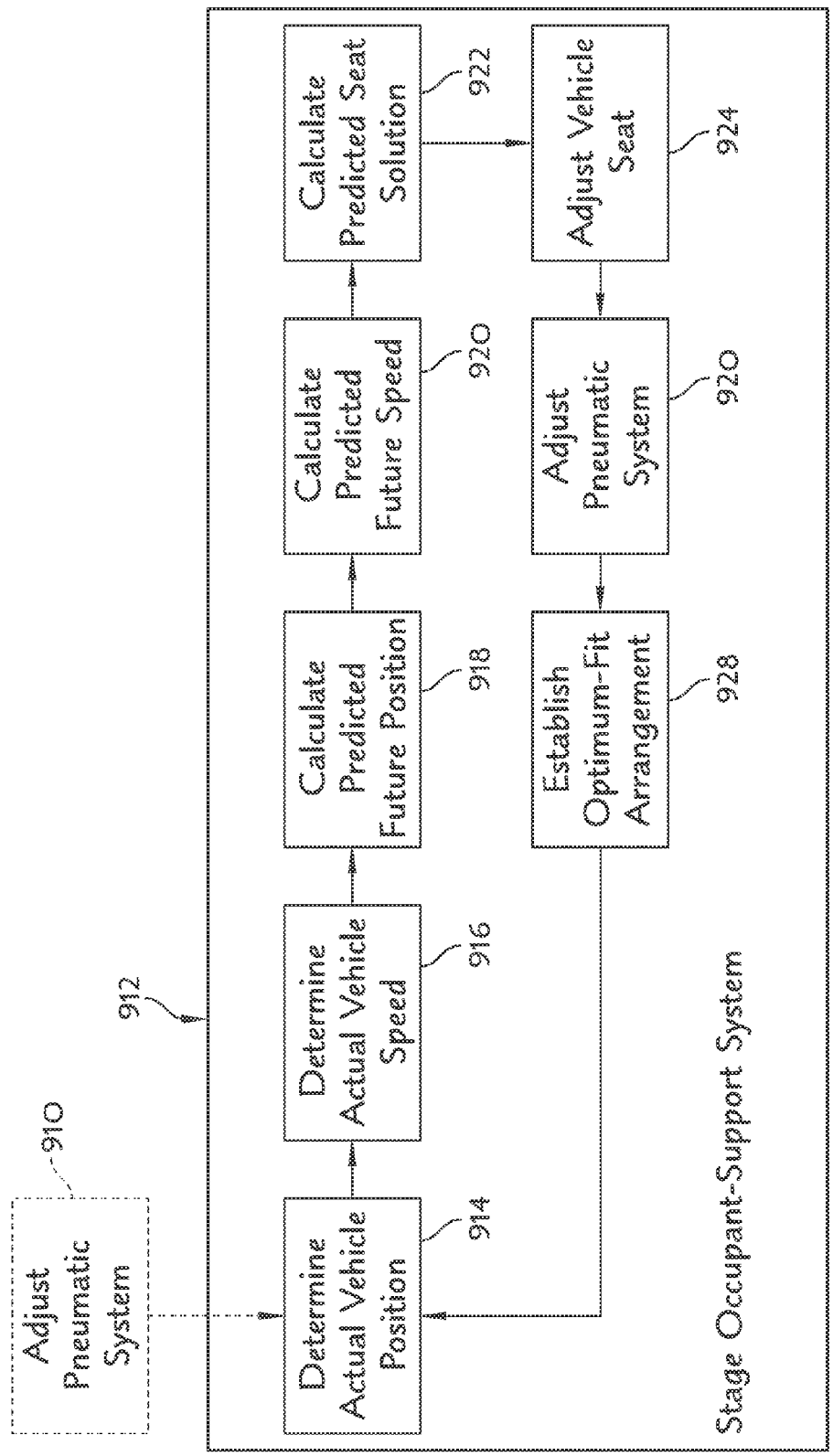

A fourth embodiment of an occupant-support system 800 is shown in FIG. 67 in which occupant-support system 800 may include a different embodiment of a pneumatic system 806. Pneumatic system 806 may be configured to control air pressure in multiple air bladders in parallel.

A fifth embodiment of an occupant-support system 1000 is shown in FIG. 69 and may be configured to perform an occupant-support system predicted fitting process 900 as shown in FIG. 68. Occupant-support system 1000 may further include a prediction system 1002 that uses sensor information to determine a predicted future position of the vehicle to cause a predicted optimum-fit arrangement of vehicle seat 604 and pneumatic system 606 to be established before the vehicle arrives at the predicted future position.

Returning to FIG. 2, a configuration control system 10 may obtain anthropometric data about an occupant and calculates a best-fit arrangement of the occupant's body that maximizes comfort and safety for the occupant as suggested in that Fig. Configuration control system 10 may be configured to perform an occupant-body fitting process 100 as shown in FIG. 1. An occupant-support system 200 may include configuration control system 10 and a vehicle seat 202. Occupant-support system 200 may be configured to perform a vehicle-seat fitting process 300 that may adjust and move vehicle seat 202 to a best-fit arrangement that causes the occupant's body to assume the best-fit body arrangement.

In accordance with the first embodiment, the equipment and processes for generating a best-fit seating solution may provide several advantages. First, a best-fit body arrangement may be determined for each occupant according to the occupant's anthropometric data, thus giving a best-fit arrangement for the occupant. Second, the data input to the body dimension calculation algorithm may be obtained using available mobile terminals and software or by manually measuring the relevant dimensions on the occupant, thus giving increased flexibility. Third, the user interface for inputting occupant metrics and/or occupant measurements may be provided in a mobile terminal included in the vehicle or separate from the vehicle, thus giving users increased flexibility. Fourth, body dimensions may be calculated using a minimized set of occupant data and sensor data, maximizing simplicity and usability of the process. Fifth, the determination of the best-fit body arrangement may be altered by changing the predetermined criteria to achieve optimum comfort, safety, and therapeutic benefit without requiring any other adjustments to hardware or software used to calculate the best-fit seating solution.

Figure 3:
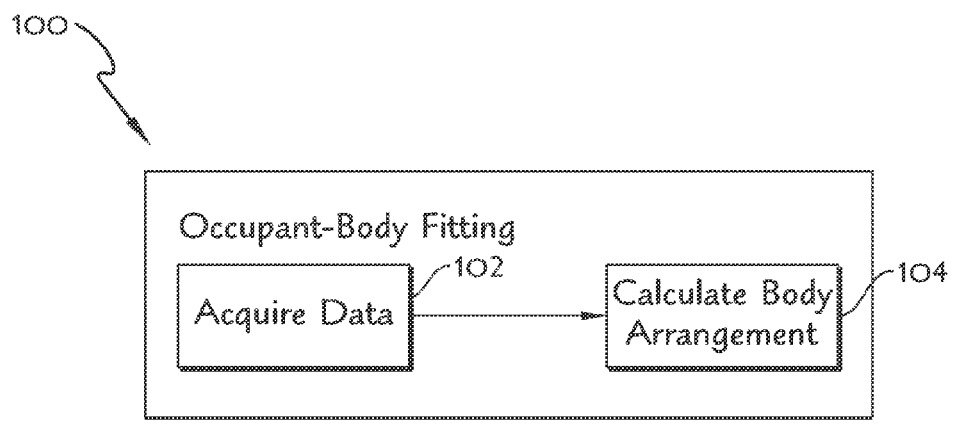

A configuration control system 10 may perform an occupant-body fitting operation 100 as shown in FIGS. 1-3. Configuration control system 10 may include a user interface 12 included in a terminal 16, a computer 14, and a communication unit 18 as shown in FIG. 2. User interface 12 may obtain occupant data that is associated with the occupant. Occupant data may include the occupant's weight, gender, and anthropometric measurements taken from the occupant's body. Occupant data may then be communicated to computer 14 by communication unit 18. Computer 14 may be configured to provide means for receiving occupant data, calculating internal body dimensions of the occupant using the occupant data, and calculating a best-fit body arrangement of the occupant using the internal body dimensions along with other predetermined criteria. Occupant comfort and safety may be maximized when the occupant's body is arranged in the best-fit body arrangement.

Figure 4:
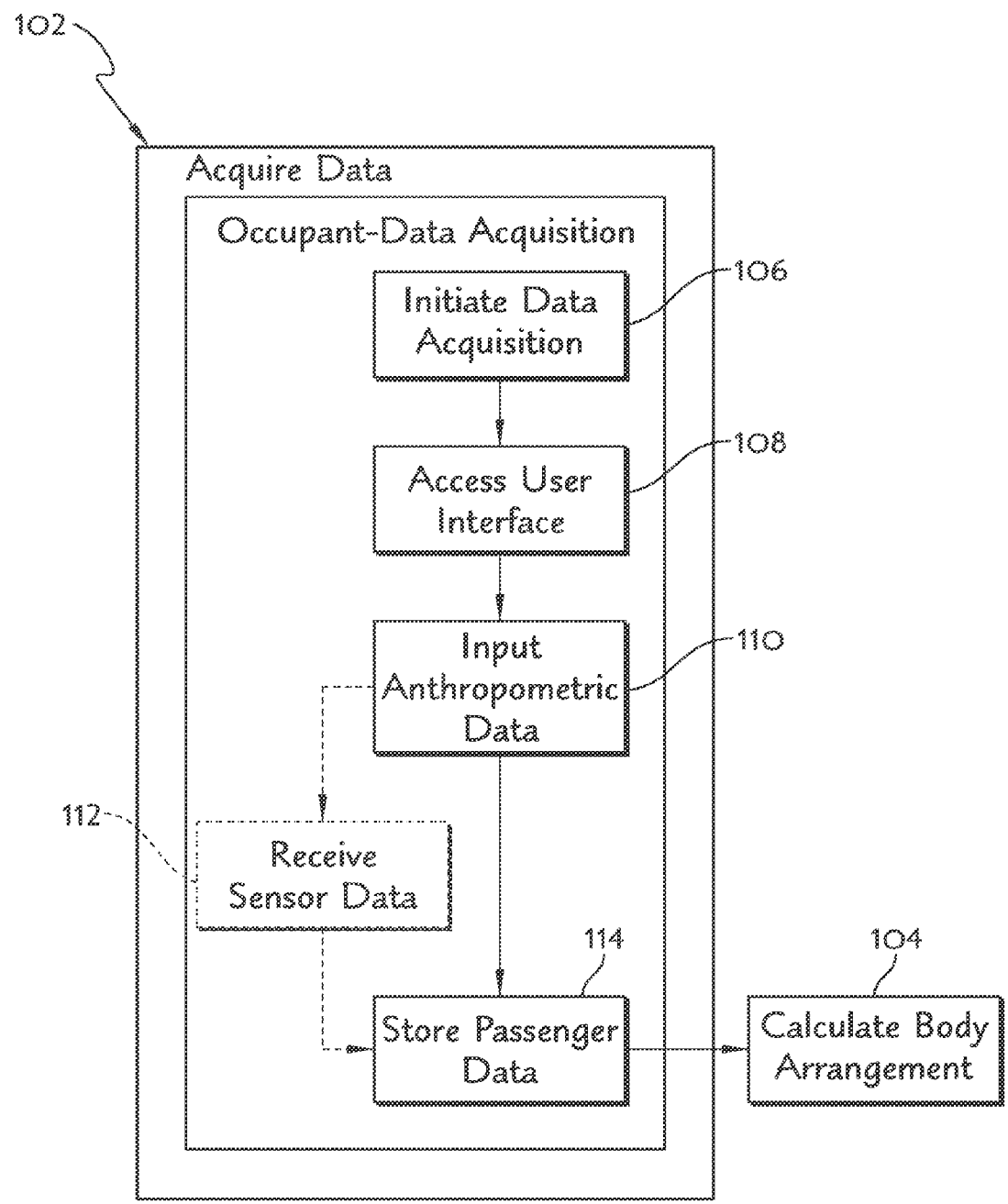

Occupant-body fitting operation 100, which may be performed by configuration control system 10, may include the operations of acquiring data 102 and calculating a body arrangement 104 as shown in FIG. 3. Acquiring data 102 may be accomplished illustratively by initiating data acquisition 106, accessing user interface 108, inputting anthropometric data 110 associated with the occupant, optionally receiving sensor data 112, and storing occupant data 114 for use in calculating body arrangement 104 as shown in FIG. 4.

Figure 5:
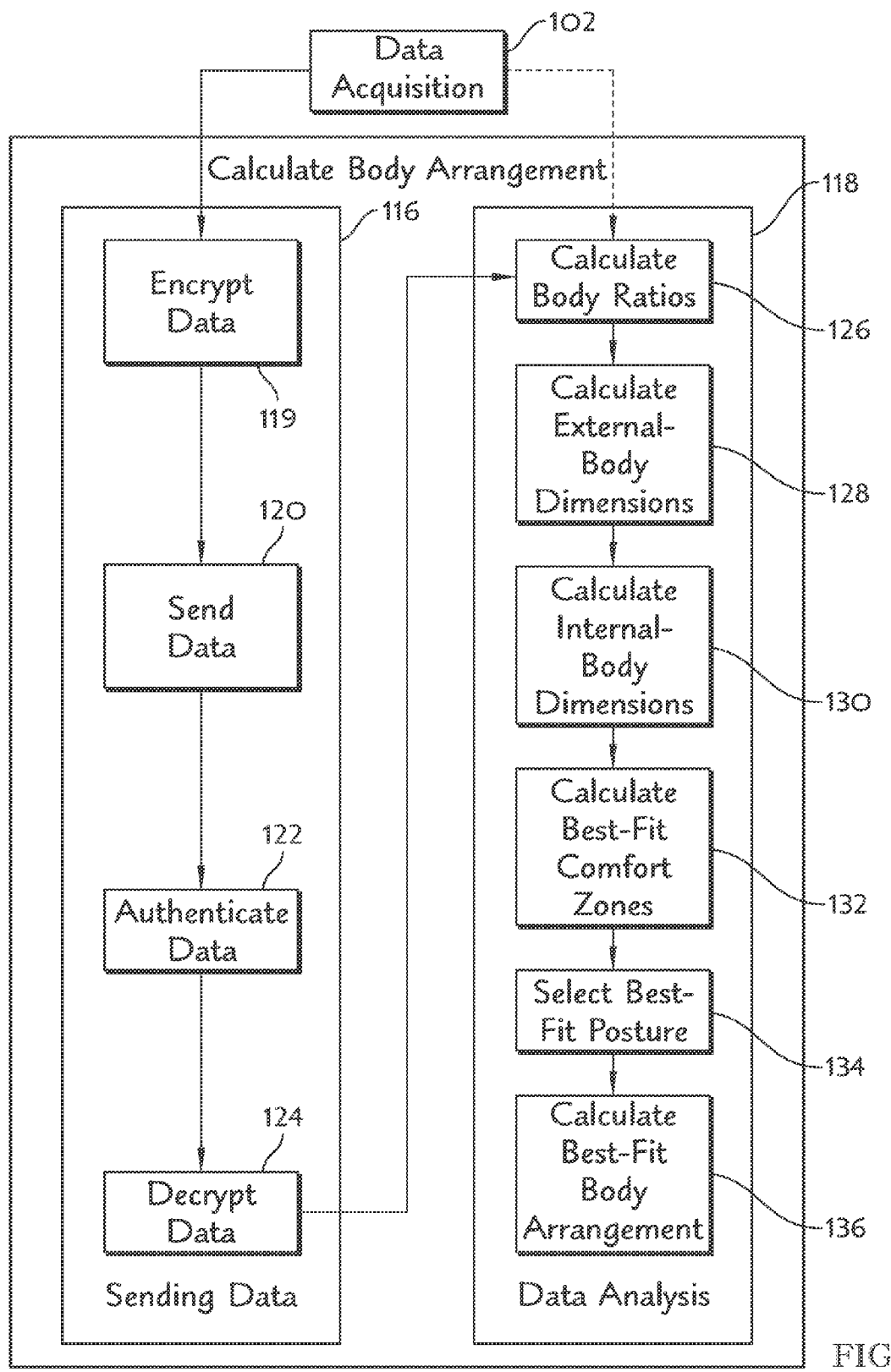

Calculating a body arrangement 104 may be accomplished by sending data 116 and data analysis 118 as shown in FIG. 5. Sending data 116 in the illustrative embodiment may include the operations of encrypting data 119, sending encrypted data 120, authenticating data 122, and decrypting data 124. As an example, encrypting data 119 and sending encrypted data 120 may be performed on a terminal 16 (mobile or incorporated into a vehicle as explained herein) including user interface 12. Authenticating data 122 and decrypting data 124 may be performed on computer 14 which is in communication with terminal 16.

Data analysis 118 may include, for example, calculating body ratios 126, calculating external-body dimensions 128, calculating internal-body dimensions 130, calculating best-fit comfort zones 132, selecting a best-fit posture 134, and calculating best-fit body arrangement 136 as shown in FIG. 5. Calculating body ratios 126 may be performed on computer 14 and may use, for example, the occupant data. Calculating external-body dimensions 128 may be performed on computer 14 and may use body ratios obtain during calculating body ratios 126. Calculating internal-body dimensions 130 may be performed on computer 14 and may use external-body dimensions and the occupant data. Calculating best-fit comfort zones 132 may be performed on computer 14 and may use internal-body dimensions to calculate several body arrangements for various occupant postures. Selecting best-fit posture 134 may be performed on computer 14 and may use best-fit comfort zones, occupant data, and other predetermined criteria. Calculating best-fit body arrangement 136 may be performed on computer 14 and may use selected best-fit posture and other predetermined criteria to determine a best-fit body arrangement for the occupant.

Configuration control system 10 may include various components for acquiring, analyzing, and using occupant data for improved seating structure and environment configuration in accordance with the present disclosure. As shown in FIG. 1, terminal 16 may be used to communicate with, among other components, computer 14 by way of communication unit 18. Communication unit 18 may be one or more public and/or private communication networks that may include any type of communications network including but not limited to a second Generation (2G) network, a 2.5 Generation network, a third Generation (3G) network using Global System for Mobile Communications (GSM), Wideband Code Division Multiplex Access (WCDMA), Code Division Multiplex Access (CDMA), or Time Division Multiplex Access (TDMA), General Packet Radio Services (GPRS), Universal Mobile Telephone System (UMTS). Further, the one or more communication networks may also include local area networks, such as Wireless Local Area Networks (WLAN), BLUETOOTH® (BT) and optionally use one or more other technologies, such as WiMax (Worldwide Interoperability for Microwave Access).

Communication unit 18 may also include any other type of network of interconnected devices or device networks, e.g., interconnected computers or computer networks. Communication unit 18 may also be a combination of a plurality of different types of networks forming one or more hybrid networks.

Terminal 16 may include user interface 12. As shown for example in FIG. 1, terminal 16 may be a mobile terminal 16. Mobile terminal 16 may communicate via communication unit 18 using a communication link 20. Access to computer 14 may be also provided by communication unit 18 using another communication link 22. Communication links 20, 22 need not be dedicated connections and may be conventionally understood transitory communication links that provide wireless transmission and reception of data for a communication session during the length of that session. Thus, in illustrative embodiments, one or more software applications which may be running on the mobile terminal 16 and other information to computer 14. As an example, computer 14 may be at least one remote computer or server that may be spaced apart from mobile terminal 16. Computer 14 may be configured to process data received via communication unit 18 from the mobile terminal 16 to provide various types of functionality. For example, as suggested in FIG. 28, computer 14 may be running a seat analytic, optimization and upgrade software suite 135 that includes various different types of software algorithms for performing analysis of received data and providing configuration data, upgrades and/or guidance to a user via the mobile terminal 16.

Figure 6:
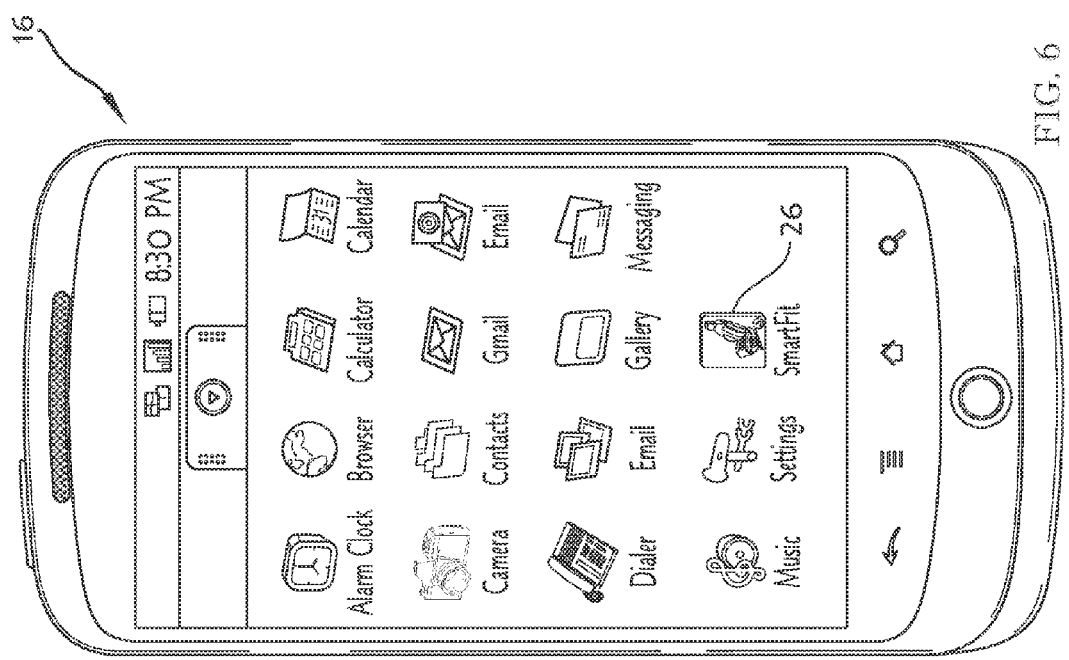

FIG. 6 is an enlarged perspective view of a mobile terminal 16 running at least one software application configured to perform acquisition and analysis of occupant data for determining a best-fit body arrangement of the occupant in accordance with the present disclosure. As shown in FIG. 6, mobile terminal 16 may display user interface 12 that may be configured to display a short cut 26 associated with a main menu of services and functionality provided in accordance with the present disclosure. Thus, user interface 12 may be further configured to receive input from a user such activating shortcut 26, e.g., by tapping on the graphic associated with shortcut 26. As a result, activating shortcut 26 may trigger display of a main menu associated with the services and functionality provided in accordance with the present disclosure.

Figure 7:
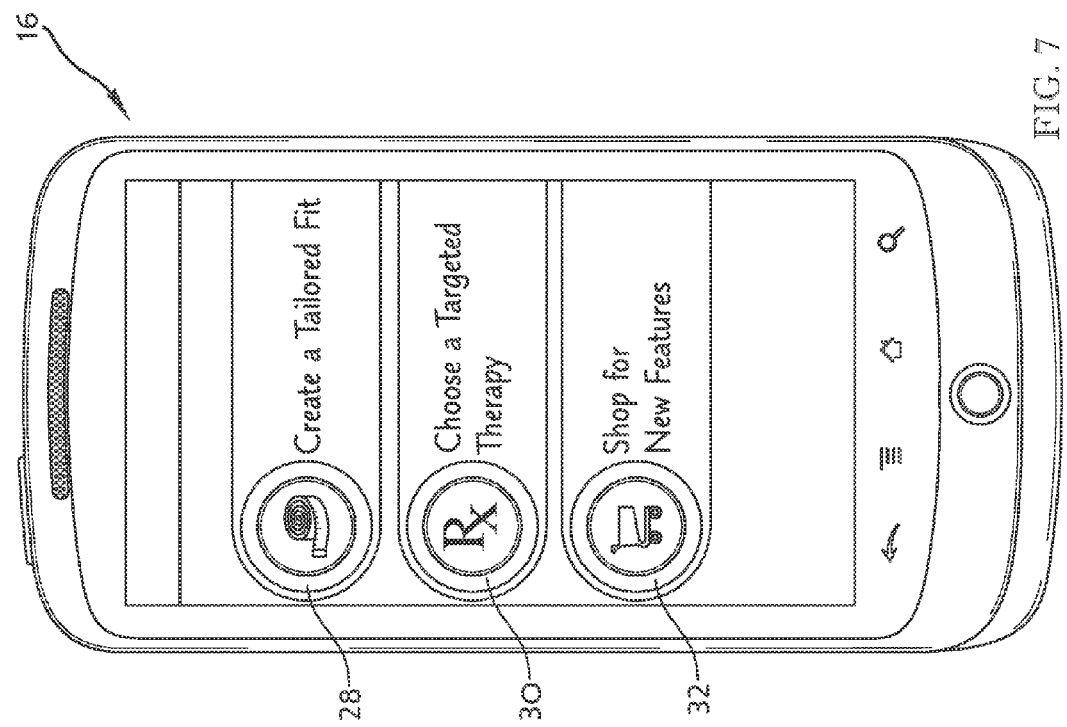

For example, FIG. 7 provides an enlarged perspective view of mobile terminal 16 of FIG. 6 displaying, on user interface 12, a main menu of functions for acquiring, analyzing, and using occupant data for determining a best-fit body arrangement. Thus, a user may select the "Create a Tailored Fit" application 28 that is configured to acquire and analyze occupant data to provide a best-fit body arrangement for the occupant. The best-fit body arrangement may be used to adjust a vehicle seat in a vehicle so that the best-fit body arrangement is achieved or to adjust a position of other equipment in a seating environment.

A user may also select the "Choose a Targeted Therapy" application 30 to obtain guidance and expert advice regarding a particular physical condition or ailment that may be improved by positioning or repositioning of an occupant's vehicle seat or components of that vehicle seat. Further, the user may select a "Shop for New Features" application 32, which may be configured to provide the option of purchasing one or more additional software implemented treatment applications or customized seating configurations associated with an occupant's physical condition(s) or interests.

Figure 8:
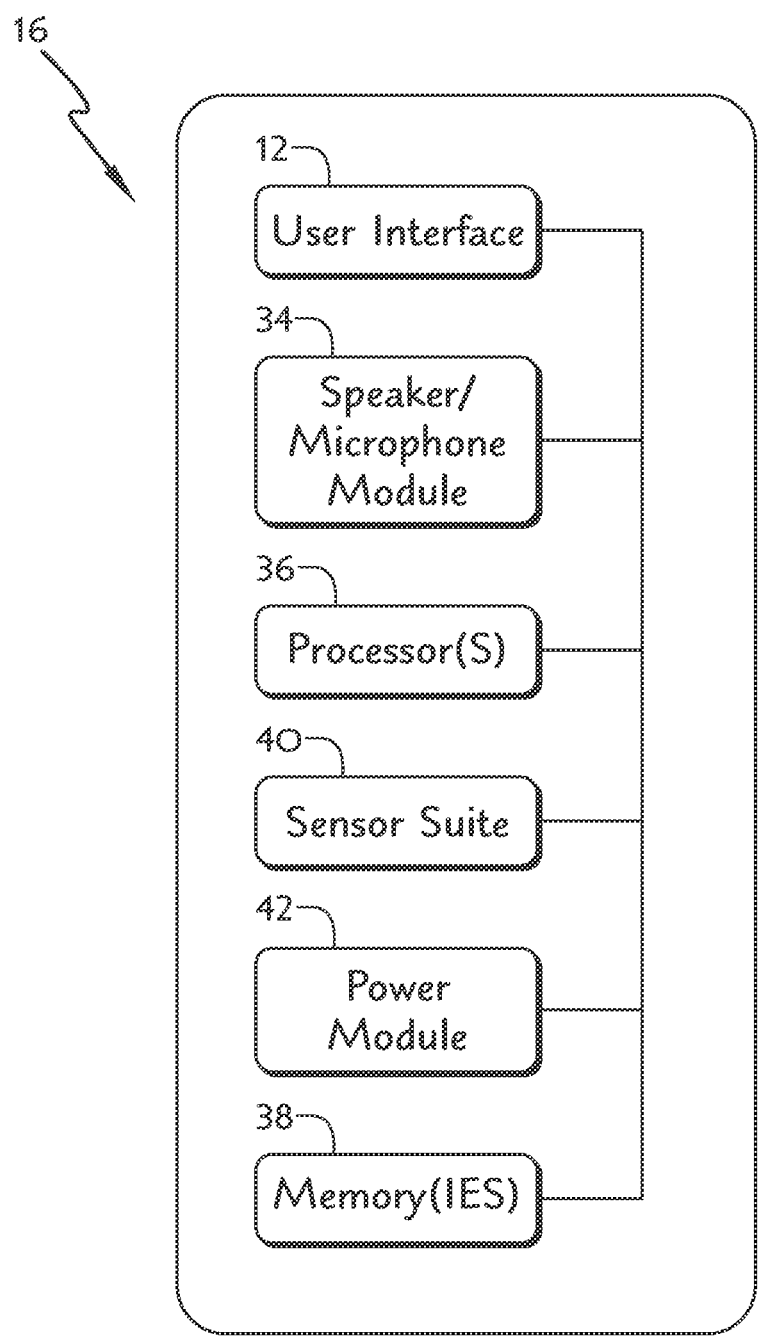

As shown in FIG. 8, the mobile terminal illustrated in FIG. 6 may include various hardware and software components configured to cooperate to support and implement the menu of functions for acquiring, analyzing, and using occupant data. Thus, mobile terminal 16 may include user interface 12 that is configured to provide the ability to input data and review outputted data from terminal 16. Thus, user interface 12 may include a display screen such as a touch screen for review and manipulation of data by the user. Mobile terminal 16 may also include input/output capabilities by including a speaker/microphone control module 34 configured to enable input and output of audio data in communication with mobile terminal 16. Mobile terminal 16 may also include one or more processors 36 configured to perform software instructions included in one or more software applications included in one or more memory units 38. These software instructions may be application specific or may be associated with functionality of the mobile terminal 16 embodied, for example, as a mobile telephone, wireless Internet browser, etc.

Mobile terminal may also include a suite of sensors 40 used to obtain occupant data. Such sensors 40 may include a digital camera configured and operational to acquire image data under the direction of the user, one or more accelerometers configured to sense and quantify data regarding the acceleration experienced by the sensor when manipulated by the occupant (such accelerometers are conventionally included in mobile terminals that provide the ability to participate in video games provided by software applications running on an occupant's mobile terminal 16). Further, mobile terminal 16 may include a power module 42, configured to govern the power requirements of mobile terminal 16 and provide power to the various components of mobile terminal 16, as conventionally understood.

Mobile terminal 16 may be implemented as a Smartphone, feature rich mobile phone, lap top, PDA, multimedia computer, etc. Accordingly, mobile terminal 16 may include a processor connected to a user interface, computer readable memory and/or other data storage and a display and/or other output device. The mobile device may also include a battery, speaker and at least one antenna. The user interface may further include a keypad, a touch screen, a voice interface, one or more arrow keys, a joy-stick, a data glove, a mouse, a roller ball, a touch screen, or the like.

Accordingly, computer executable instructions and data used by a processor 36 and other components in mobile terminal 16 may be stored in the computer readable memory (ies) 38 included in mobile terminal 16. Further, memory 38 may be implemented with any combination of read only memory modules or random access memory modules, optionally including both volatile and nonvolatile memory. Thus, software may be stored in the memory and/or storage to provide instructions to the mobile device's processor for enabling the mobile device to perform various functions. Alternatively, some or all of the mobile device computer executable instructions may be embodied in hardware or firmware (not illustrated).

Figure 10:
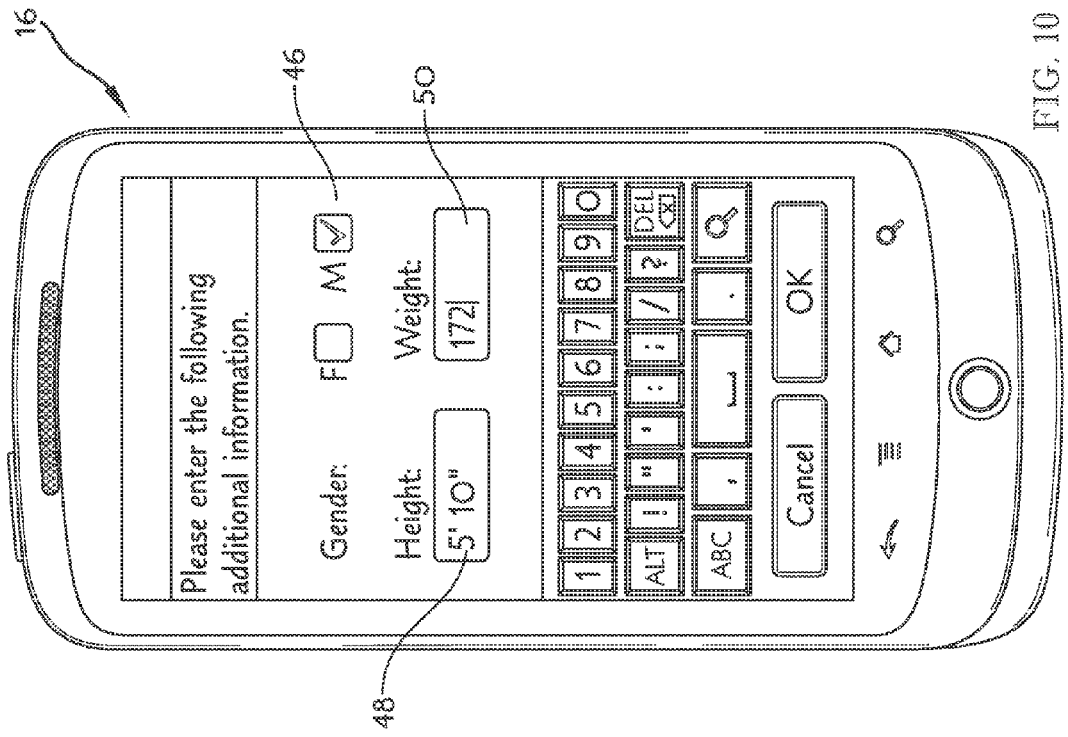
Figure 9:
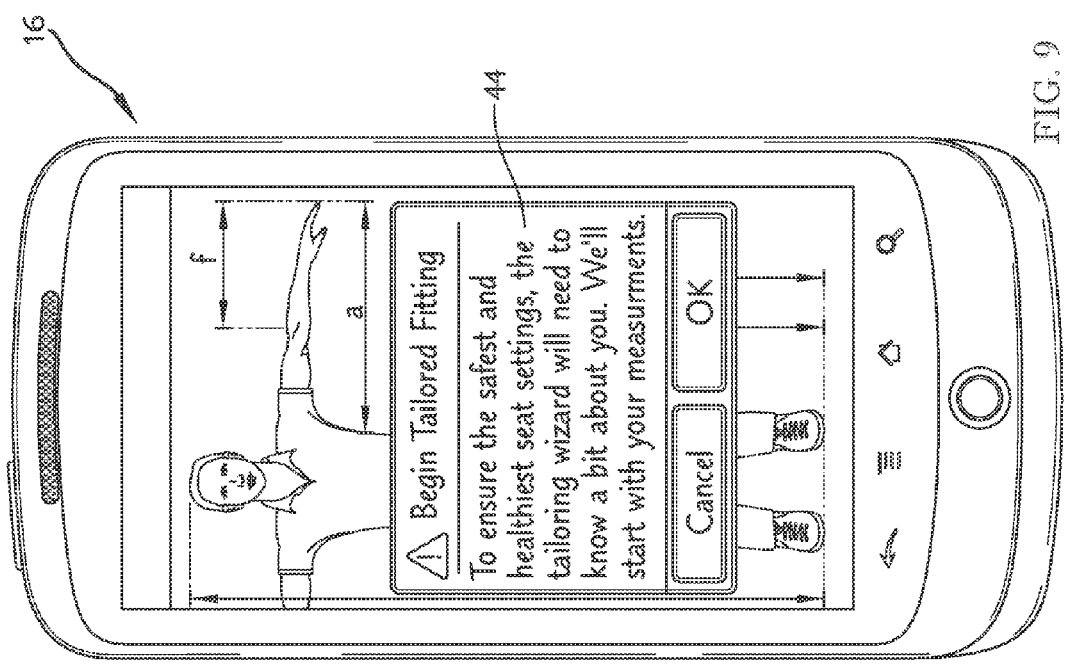
Figure 12:
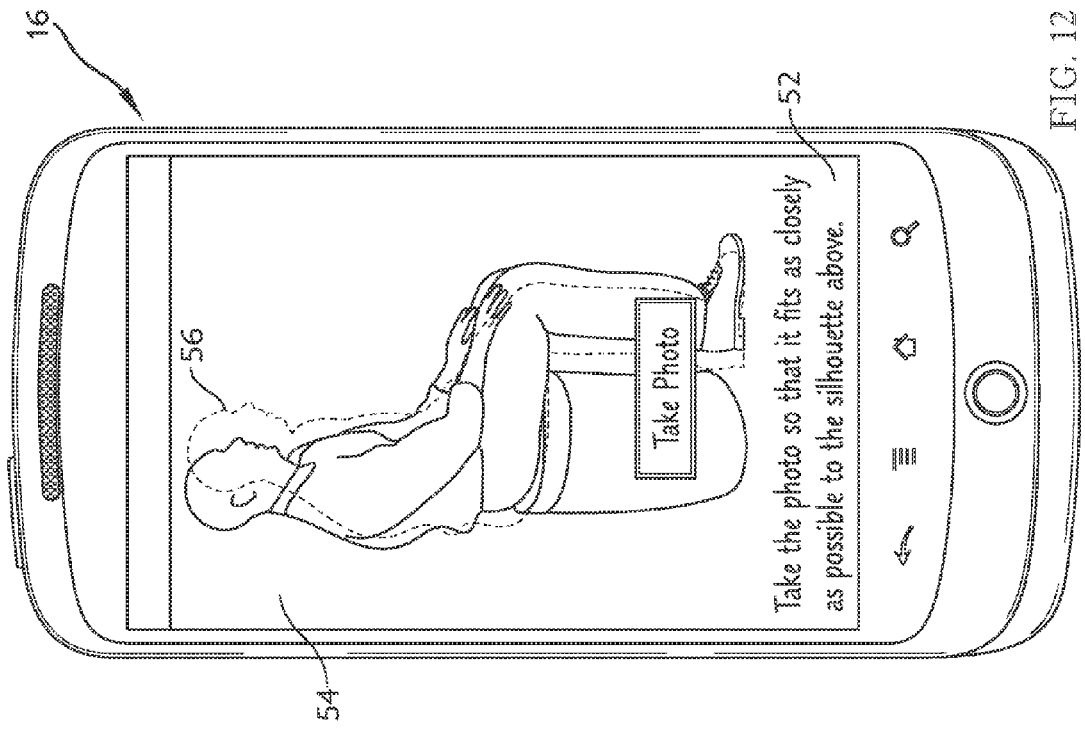

FIGS. 9-20 provide a series of screen shots illustrating user interface 12 functionality provided by at least one software application to obtain occupant data that may be used to determine the best-fit body arrangement for the occupant. Thus, a user may select the "Create a Tailored Fit" application icon 28 from the main menu illustrated in FIG. 7, thereby causing a welcome screen to be generated and output on the user interface 12, as illustrated in FIG. 9, providing directions 44 for beginning occupant-body fitting operation 100 as shown in FIG. 1. Subsequently, the user may be prompted by a series of input screens to input various pieces of information in various fields including an occupant's gender 46, an occupant's height 48, an occupant's weight 50, etc. That information may be entered, for example, using check boxes and/or using a keyboard of the terminal as shown in FIG. 10.

Additionally, as illustrated in FIGS. 11-18, the user may be prompted by a series of screens to use the mobile terminal's digital camera to obtain images of the occupant so that occupant-body fitting operation 100 will have occupant data indicating the relative proportions of the occupant's body. Note, the occupant may be using the assistance of another person to take these photographs of the occupant. It should be appreciated that the user may be provided with preliminary instructions that may instruct the user on where to position the modeled occupant when the photographing user is taking photographic images. This may or may not be necessary depending on whether the software is configured to make a determination of distance between the occupant to be modeled and the photographing user and whether the software compensates for such information.

Figure 11:
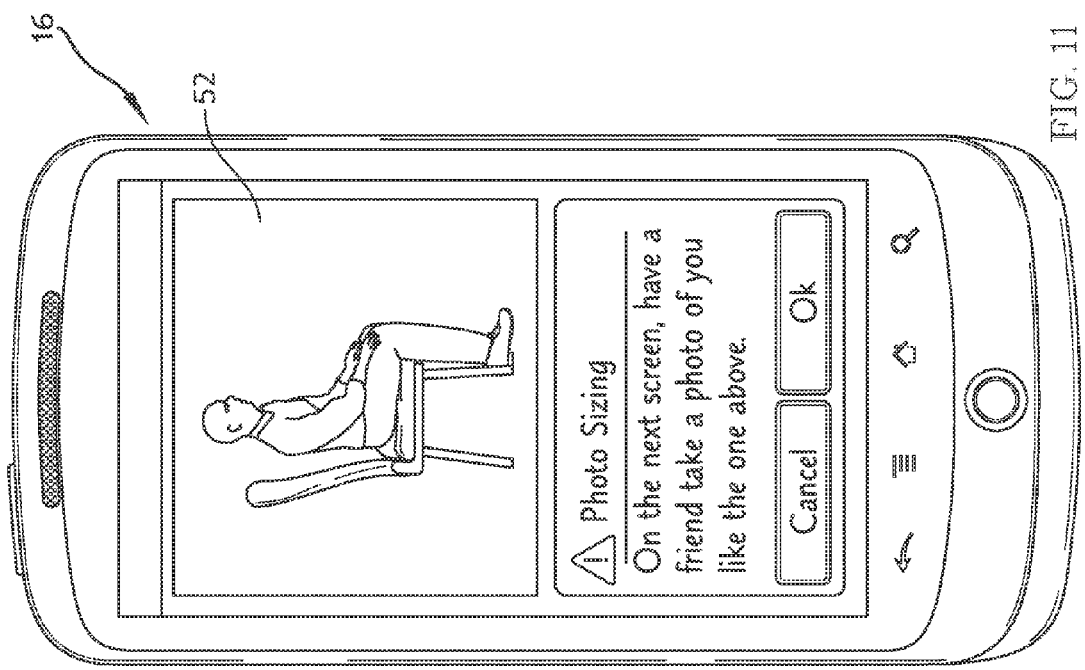

As illustrated in FIG. 11, the user may review instructions 52 for positioning the occupant's body to be photographed. As shown in FIG. 9, user interface 12 may be configured to prompt the user to locate the occupant's image 54 in a positioning outline 56 as close as possible based on instructions 58 generated by the software application running on mobile terminal 16. User interface 12 may be further configured to receive inputs from the user that locates occupant's image 54 in positioning outline 56. Once in that position, the user may be prompted to take the photographic image, which will trigger the storage of the image data in conjunction with the mobile terminal application.

Figure 14:
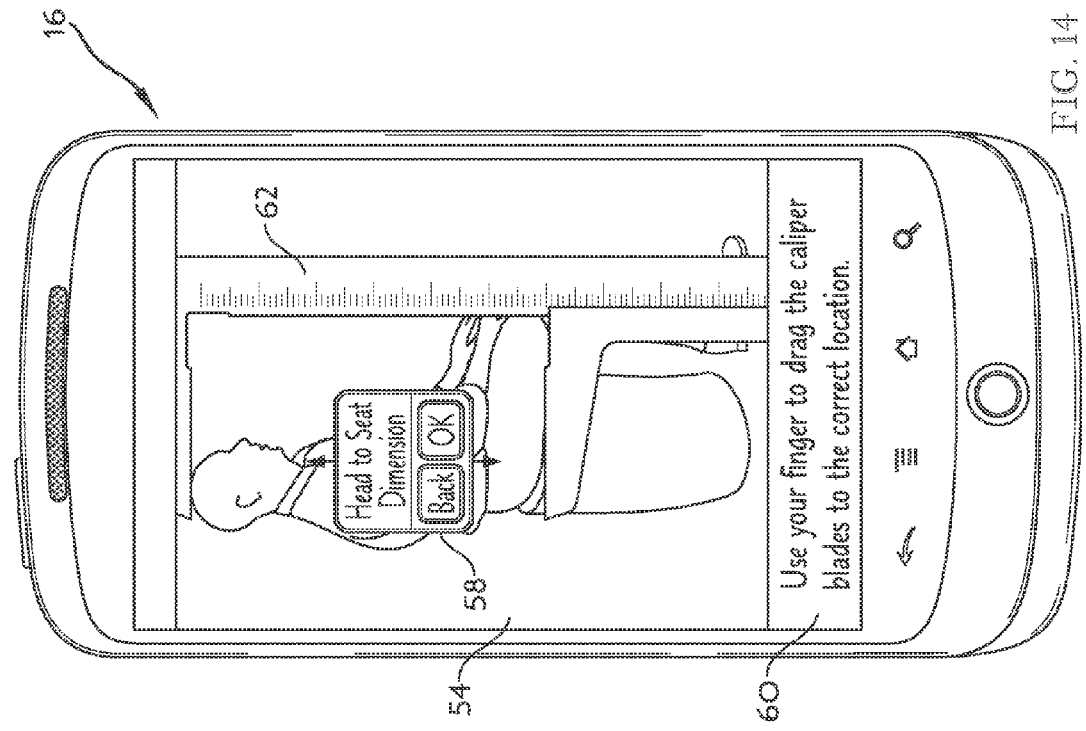
Figure 13:
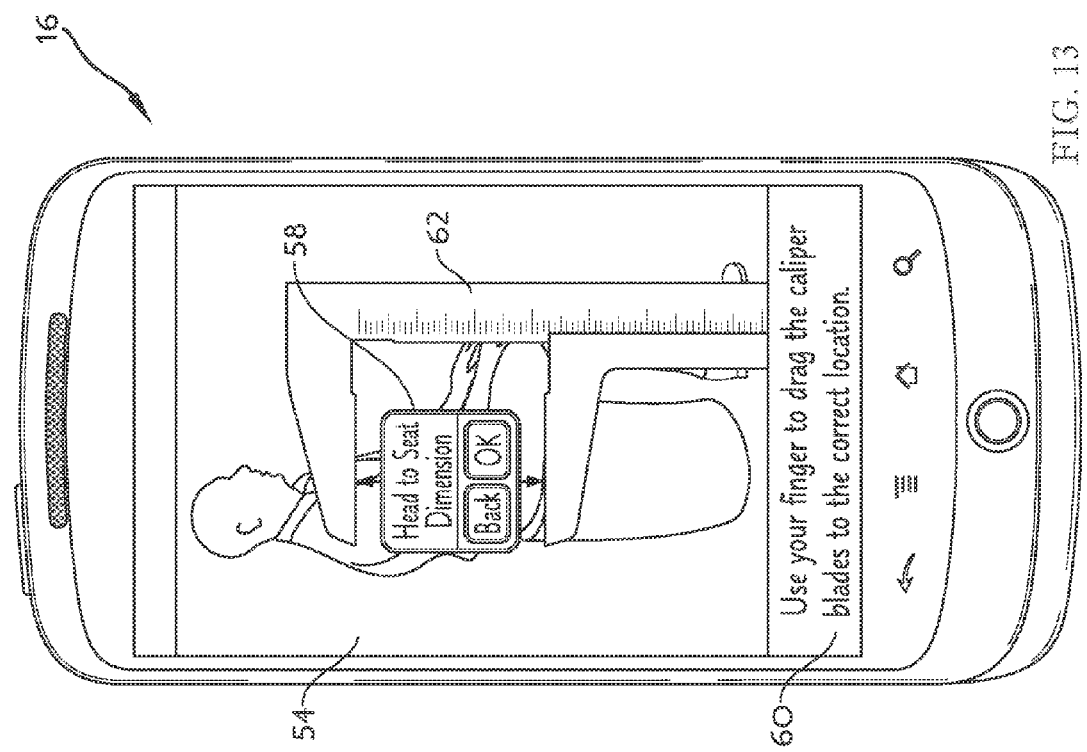
Figure 17:
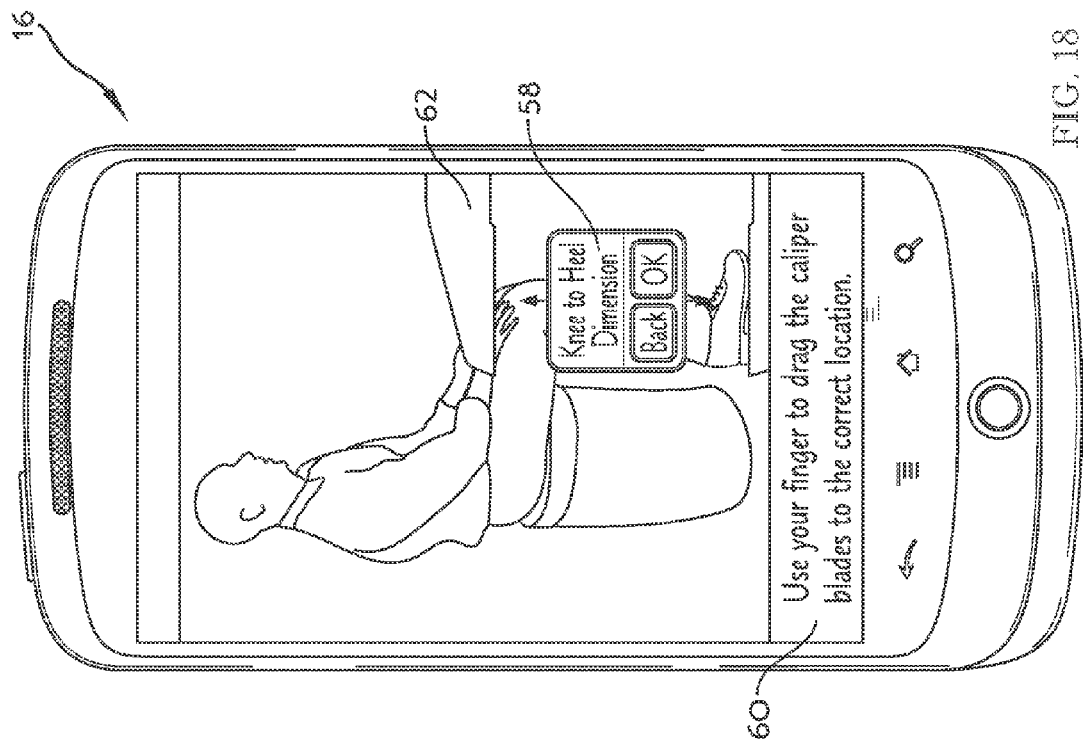
Figure 18:
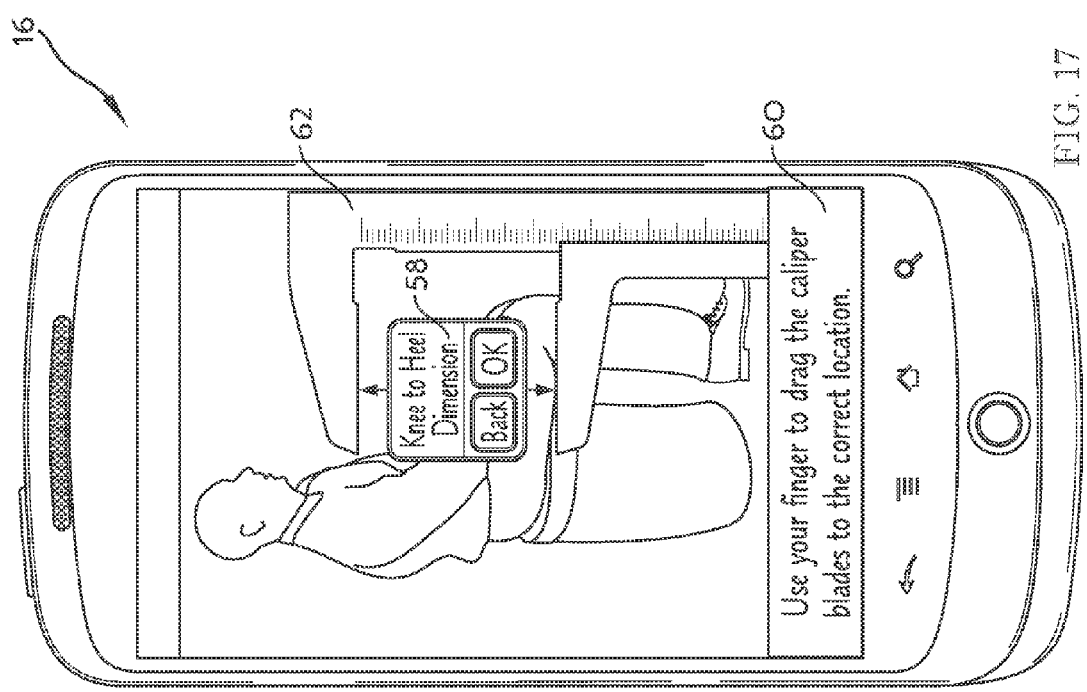

Next, the user may be prompted by instructions 58, 60 to obtain various measurements on the occupant's body by adjusting the distance shown between the blades of a virtual caliper 62 displayed over the image 54. The user may be able to adjust the caliper blade locations by using their finger to drag the caliper blades to the correct location. User interface 12 is configured to receive inputs from the user associated with adjusting virtual calipers 62. As a result, the user may be prompted by user interface 12 to click on an OK icon when the user has positioned the calipers 62 to span a distance specified in the instructions 58, e.g., head to seat dimension, as shown in FIGS. 13 and 14. FIG. 13 illustrates a beginning location of the caliper blades and FIG. 14 illustrates the final location of the caliper blades for that measurement. Likewise, the user may be prompted to click on an OK icon when the user has positioned the calipers 62 to span a distance specified in the instructions 58 for the back to knee dimension, as shown in FIGS. 15 and 16. FIG. 15 illustrates a beginning location of the caliper blades. FIG. 16 illustrates the final location of the caliper blades for that measurement. Also, the user is prompted to click on an OK icon when the user has positioned the calipers 62 to span a distance specified in the instructions 58, e.g., knee to heal dimension, as shown in FIGS. 17 and 18. FIG. 17 illustrates a beginning location of the caliper blades. FIG. 18 illustrates the final location of the caliper blades for that measurement.

Figure 19:
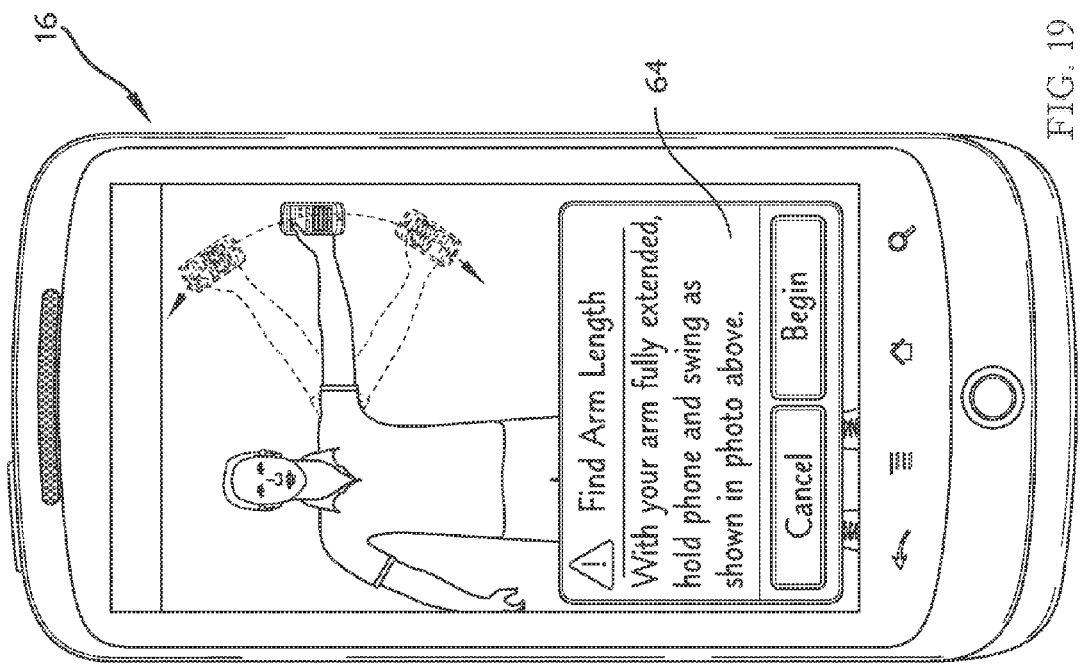

Subsequently, the user may be prompted by instructions 64 to perform various movements while holding the mobile terminal 16 as suggested in FIG. 19. This phase of the data acquisition subroutine may enable one or more accelerometers included in the mobile terminal 16 to obtain information regarding the arm length of the user based on the acceleration experienced by the accelerometer(s).

Figure 20:
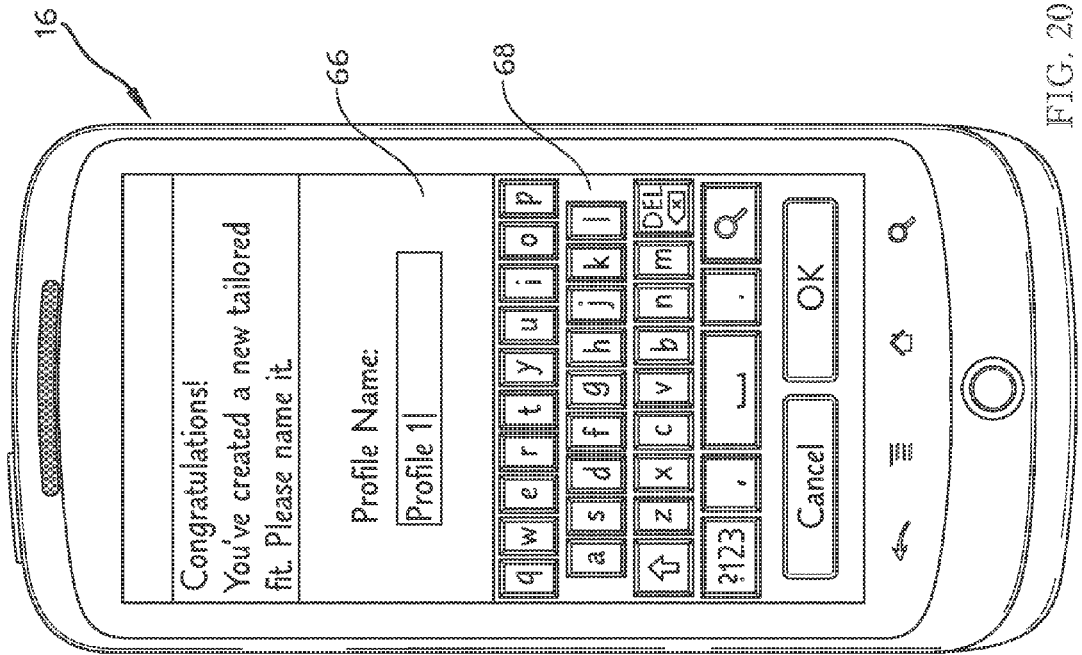

Once the data acquisition subroutine has obtained all the necessary data used for generating a data representation of the occupant, the user may be prompted by instructions 66 to input identifying information, e.g., a name, for the data representation as shown in FIG. 20. As an example, user interface 12 may include a keyboard 68 provided by mobile terminal 16.

Figure 22:
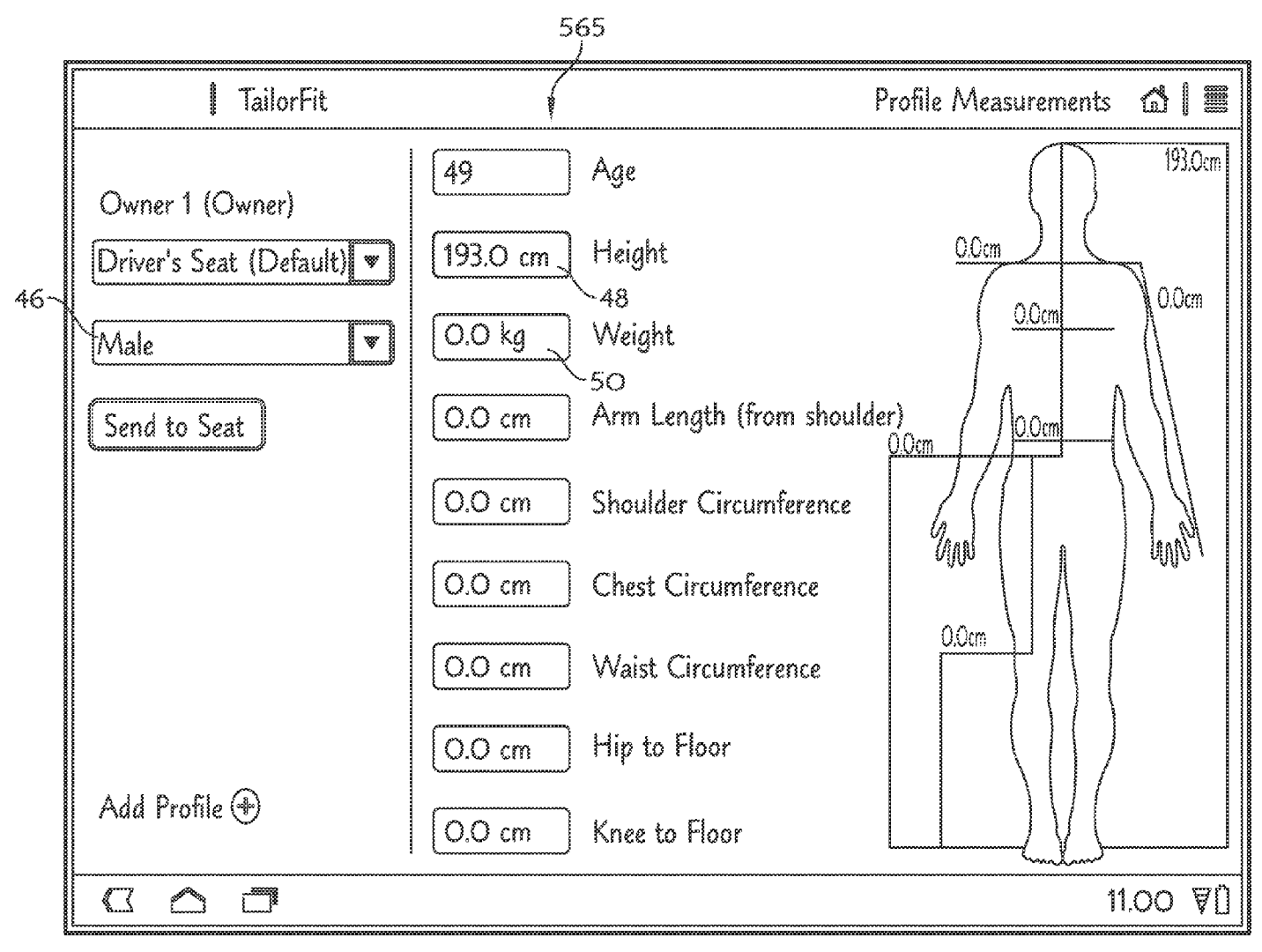

As another example, a user may input occupant data manually by logging into a user interface 12 with a user name 70 and a password 72 as shown in FIG. 21. As shown in FIG. 22, the user may then enter the occupant's gender 46 as well as anthropometric data 565 measured manually by the user as shown in FIG. 22. Thus, occupant data may be obtained by mobile terminal 16 without the use of sensors for measuring anthropometric data associated with the occupant.

As explained above, the software required to model the occupant via a data representation and associated occupant-body fitting may be performed using the software application running on mobile terminal 16 alone, or as illustrated in FIG. 1, in combination with a server-implementation using occupant-body fitting operation 100 (which may or may not be implemented as server software depending on the "fatness" of the mobile terminal application deemed acceptable). The mobile terminal application may rely on increasingly large amounts of software residing on a server, it the mobile terminal application is meant to be "thin," i.e., requiring less memory on the mobile terminal for operation.

An occupant-support system 200 includes a configuration control system 210 and an adjustable vehicle seat 202 as shown in FIG. 24. The occupant-support system 200 is configured to implement a vehicle-seat fitting process 300 that provides a best-fit arrangement of vehicle seat 202 as suggested in FIG. 23.

Vehicle-seat fitting process 300 includes the operations of acquiring data 302, calculating body arrangement 304, calculating seat solution 338, and adjusting vehicle seat 340 as shown in FIG. 23. Acquiring data 302 is accomplished by obtaining the occupant's anthropometric data and the vehicle's equipment data. The occupant data is then used in calculating body arrangement 304 and vehicle-equipment data is used in calculating seat solution 338 to determine how the vehicle's equipment should be positioned to achieve the best-fit arrangement described previously. Adjusting vehicle seat 340 uses the instructions generated in calculating seat solution 338 to adjust the position of the vehicle seat 202. Adjusting vehicle seat 340 may also be used to adjust the position of a steering wheel, mirrors, heads-up display, and control pedals to further improve the fit to the occupant.

Figure 25:
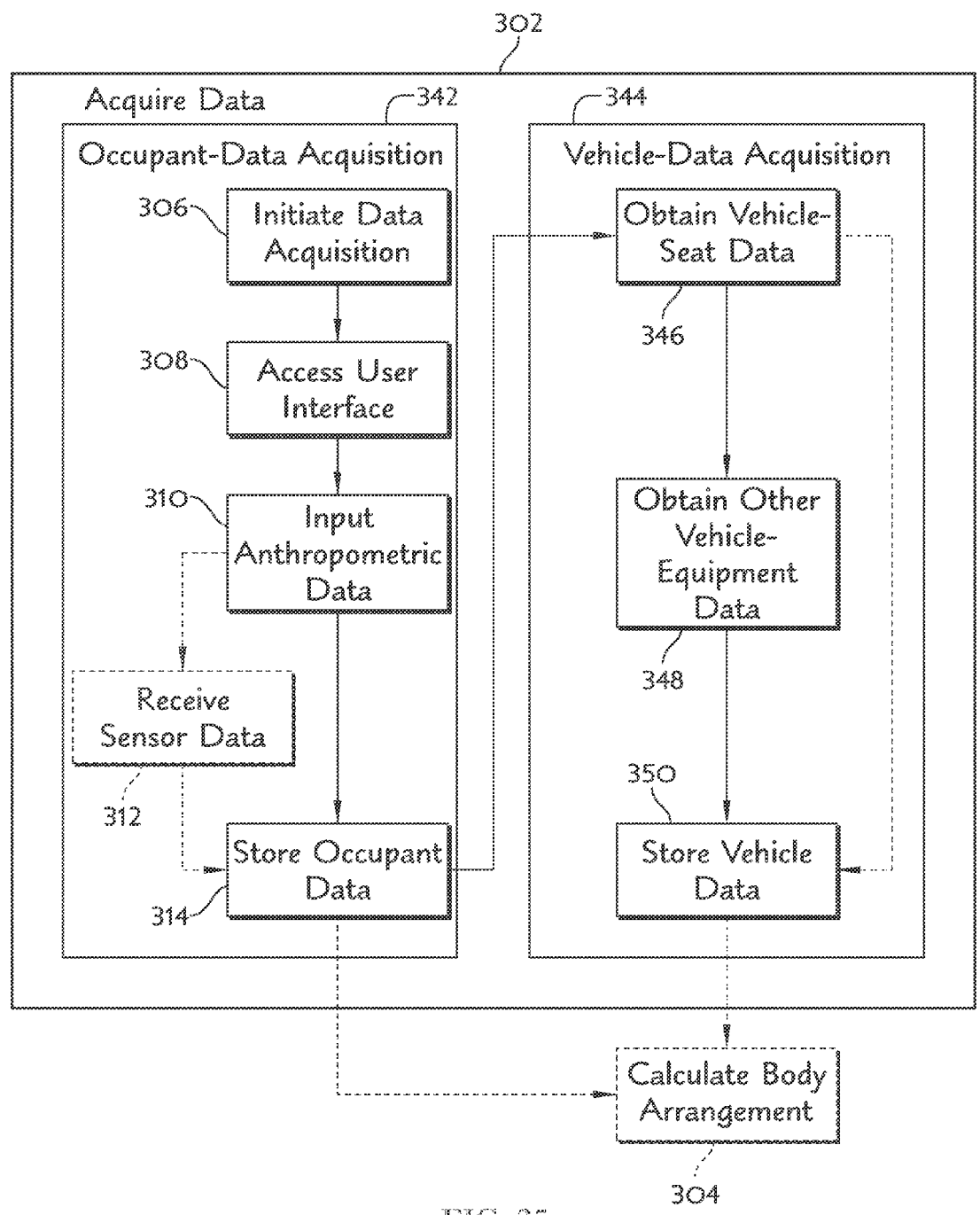

Acquiring data 302 may include the operations of acquiring occupant data 342 and acquiring vehicle data 344 as shown in FIG. 25. As shown there, acquiring occupant data 342 illustratively includes initiating data acquisition 306, accessing user interface 308, inputting anthropometric data 310, optionally receiving sensor data 312, and storing occupant data 314. Acquiring vehicle data 344 illustratively includes obtaining vehicle-seat data 346, obtaining other vehicle-equipment data 348, and storing vehicle data 350 as shown in FIG. 25.

Initiating data acquisition 306 may be performed illustratively on mobile terminal 16 as discussed previously. Accessing user interface 308 may be performed by the user accessing user interface 12 included in mobile terminal 16 to input occupant data during the operation of inputting anthropometric data 310. Inputting anthropometric data 310 may include inputting data which includes occupant's weight (W), occupant's height (H), and occupant's gender (G). Other body measurements may be input as well. Receiving sensor data 312 may include receiving data from sensors included in one of mobile terminal 16, vehicle seat 202, or a vehicle interior. Sensor data may include a measurement representative of a distance (A) between an occupant's head and an occupant's seat, a distance (B) between an occupant's back and an occupant's knee, and a distance (C) between an occupant's knee and an occupant's heel. Storing occupant data 314 may include storing the occupant data on mobile terminal 16, in memory included in the vehicle, or remotely on computer 14, which is also called server 14.

Obtaining vehicle-seat data 346 may be performed illustratively by mobile terminal 16 communicating with vehicle seat 202 to determine a configuration and capability of vehicle seat 202. Vehicle-seat configuration and capability may be stored on memory included in vehicle seat 202 or on memory included in the vehicle. Vehicle-seat configuration and capability may also be stored on server 14 or another server and retrieved through the use of a vehicle-seat identifier which may be associated with the vehicle-seat configuration and capability.

Obtaining other vehicle-equipment data 348 of vehicle-data acquisition may be performed illustratively by mobile terminal 16 communicating with the vehicle to determine a make and model of the vehicle so that internal cabin geometry may be determined. As an example, a profile of the windshield and a distance between the windshield and the floor of the vehicle may be obtained and used later during calculating seat solution 338. Vehicle cabin data may be stored in memory included in the vehicle seat, memory included in the vehicle, or on server 14 and retrieved using a vehicle identifier which may be associated with the vehicle. As an example, the vehicle identifier may be a Vehicle Identification Number (VIN) of the vehicle.

Figure 29:
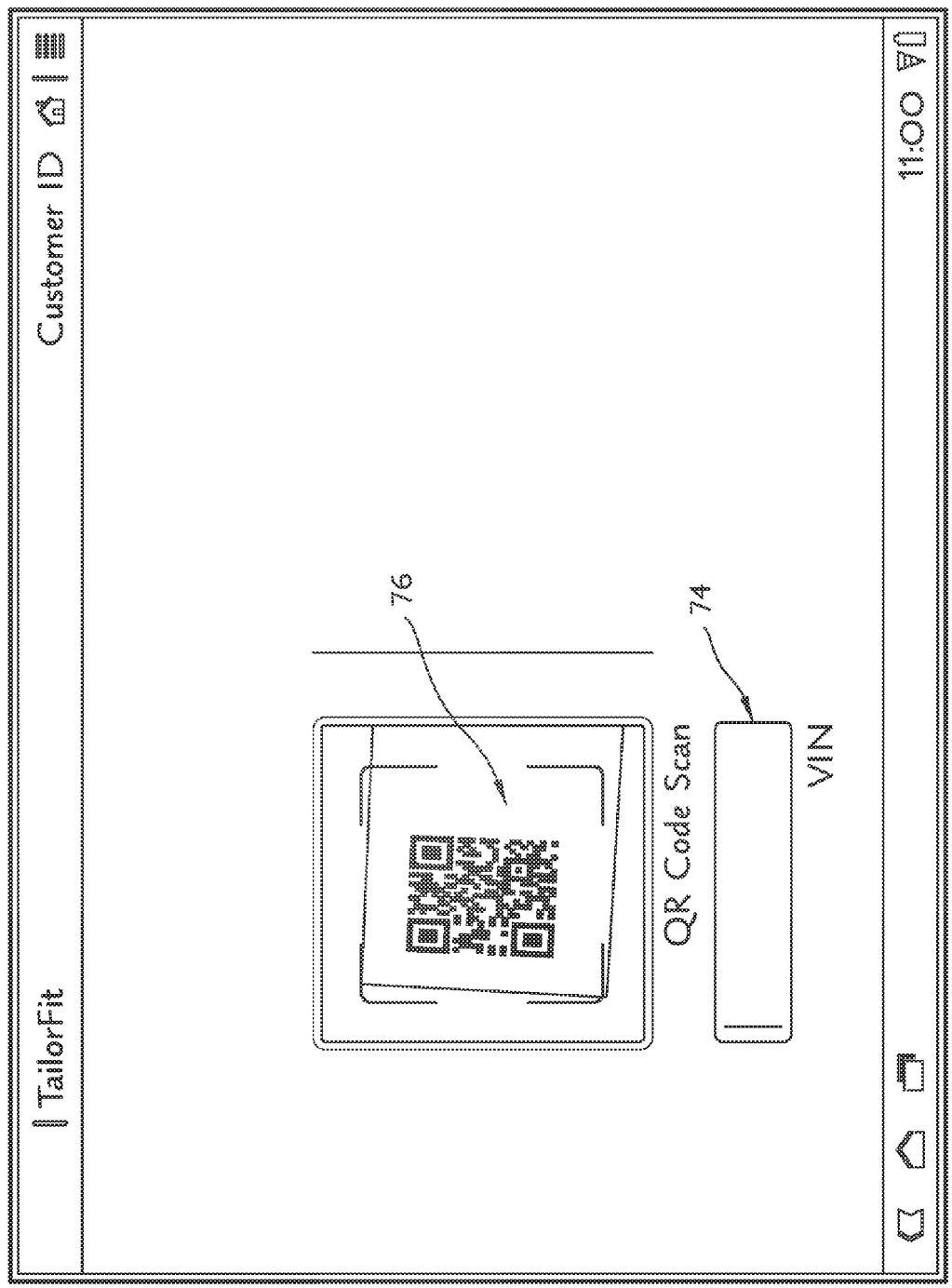
Figure 30:
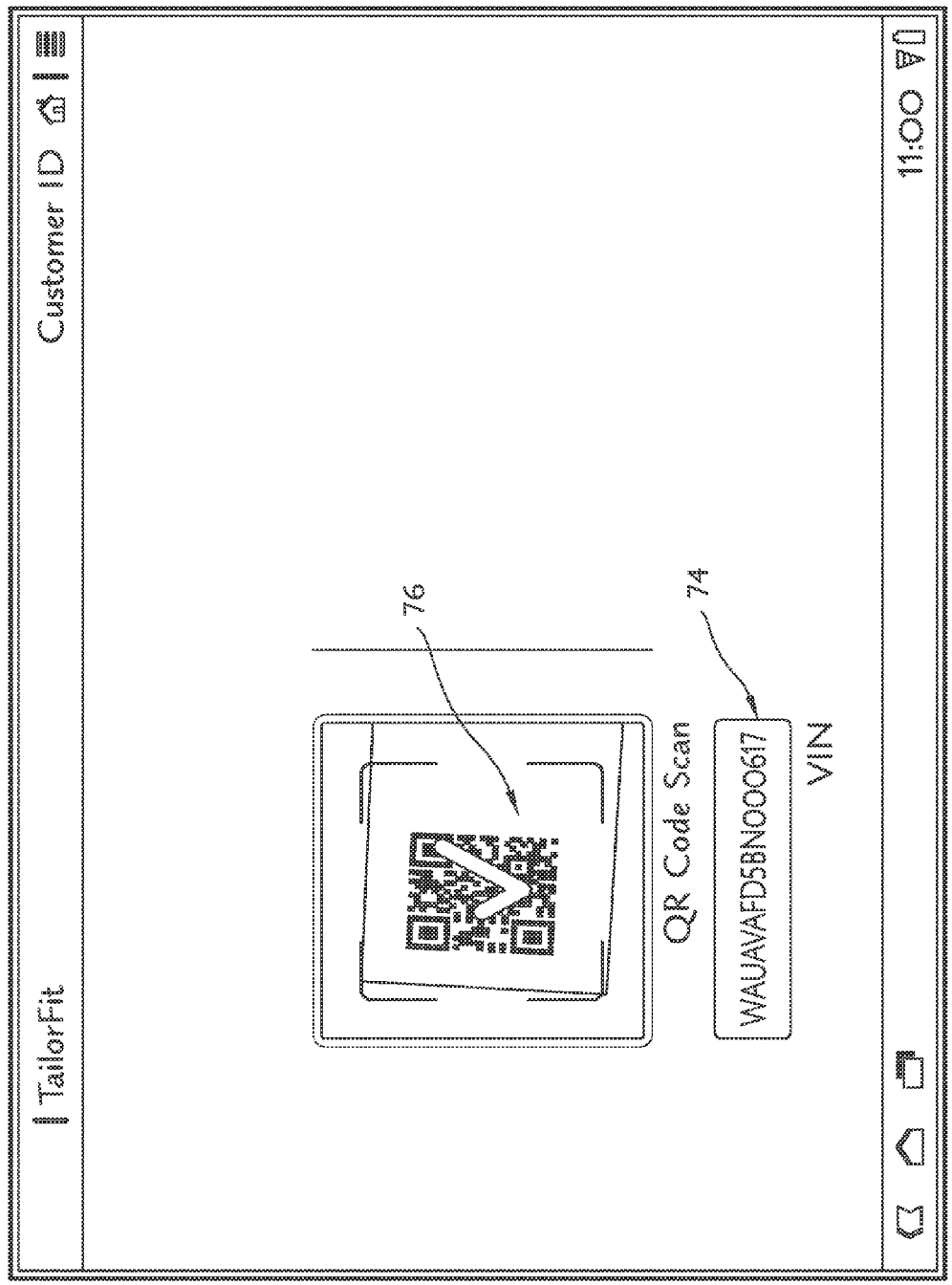
Figure 31:
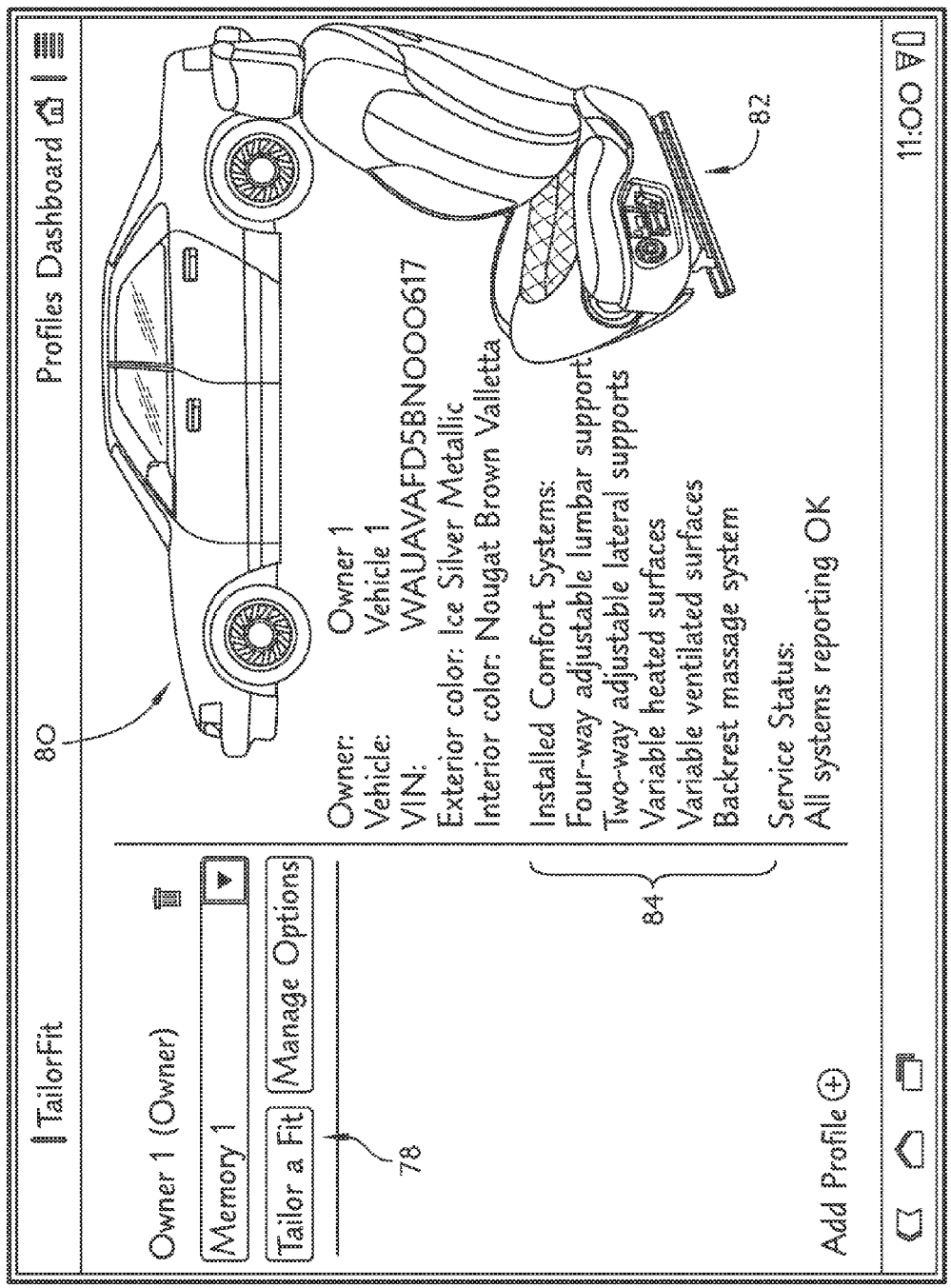

Obtaining vehicle-seat data 346 and other vehicle-equipment data 348 may obtained from inputting manually a VIN 74 as shown in FIG. 29. The user may also hold a card having a QR code 76 thereon in front of a sensor included in mobile terminal 16. The sensor may be a camera which scans the QR code and determines automatically vehicle data as suggested in FIGS. 29 and 30. Once the VIN is known and input into mobile terminal 16, an occupant profile 78 including known occupant data, a vehicle picture 80, a vehicle-seat picture 82, and vehicle data 84 may be displayed as shown FIG. 31.

Figure 26:
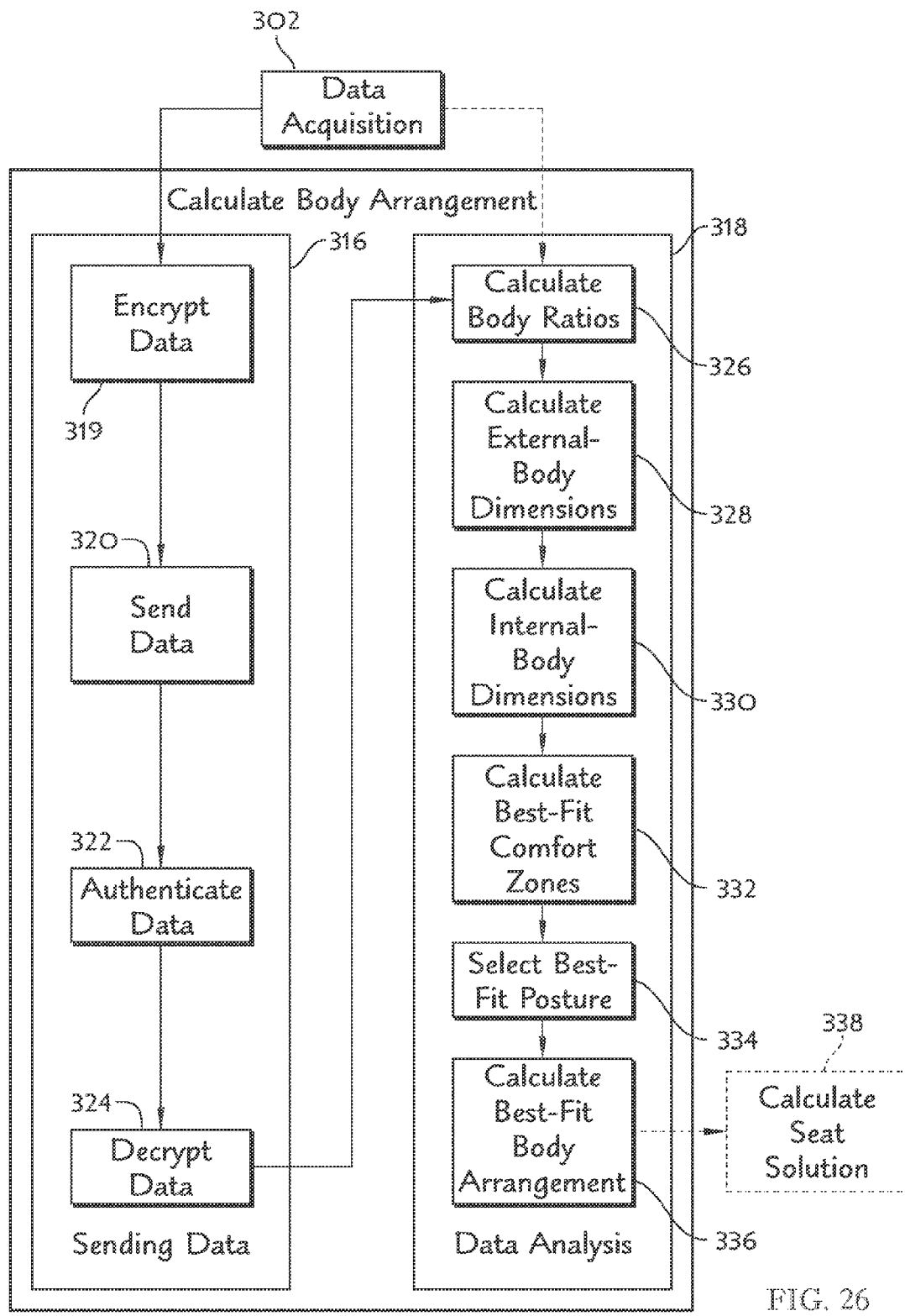

After the occupant data and vehicle data have been obtained during data acquisition 302, the data may then be used during calculating body arrangement 304 as shown in FIG. 26. Calculating body arrangement 304 may include the operations of sending data 316 and data analysis 318. Sending data 316 by way of illustration may include vehicle and occupant data encryption 319, sending encrypted data 320, data authentication 322, and data decryption 324. Sending data 316 may be used in the situation where data analysis 318 is not performed on the same device as data acquisition 302. As an example, data acquisition 302 may be performed on mobile terminal 16 while portions of calculating body arrangement 304 may be performed by remote server 14. Calculating body arrangement 304 may be performed on the same device as data acquisition 302 such that the operation of sending data 316 may not be performed.

Data analysis 318 may include the operations of calculating body ratios 326, calculating external-body dimensions 328, calculating internal-body dimensions 330, calculating best-fit comfort zones 332, selecting a best-fit posture 334, and calculating best-fit body arrangement 336 as shown in FIG. 26. During data analysis 318, the measurements and data taken during data acquisition 302 may be used to calculate a best-fit arrangement of the occupant's body which maximizes comfort and minimizes safety risks. The best-fit body arrangement may then be used during calculating seat solution 338 to generate seat-adjustment instructions which may be sent to various pieces of equipment for either manual or automatic adjustment during adjusting of vehicle seat 340. Sending adjustment instructions 356 may include encrypting adjustment instructions 358, sending encrypted instructions 360, and decrypting vehicle adjustment instructions 362.

During calculation of body ratios 326, distances (A, B, and C) obtained during data acquisition 302 may be used to calculate a set of ratios. The ratios and the occupant data (weight W, height H, and gender G) obtained during inputting anthropometric data 310 may be provided as inputs to calculating external-body dimensions 328. Calculating external-body dimensions 328 may produce additional dimensions beyond those measured during data acquisition 302.

External-body dimensions may then be used as inputs during calculating internal-body dimensions 330 to calculate a set of internal-body dimensions. Calculating internal-body dimensions 330 may include a first operation, which is performed by estimating distances between an occupant's flesh and the occupant's bones included in the occupant's skeleton, and a second operation, which is performed by using the estimated flesh thicknesses to calculate a set of internal-body dimensions that may be associated with an occupant's skeleton. As an example, the first operation may calculate the thickness of flesh between an occupant's pelvis and an outer surface of the occupant's back and calculate the thickness of flesh between the occupant's knee joint and an outer surface of the occupant's knee. The second operation may then subtract the two thicknesses previously calculated to determine an internal body dimension associated with an occupant's femur.

At least one of the internal-body dimensions calculated during calculating internal-body dimensions 330 may then be used with predetermined criteria as inputs to calculating best-fit comfort zones 332 for the occupant as shown in FIG. 26. Calculating best-fit comfort zones 332 may include a first operation and a second operation. The first operation may be calculating all of the possible best-fit comfort zones that may be established for a particular occupant based on the occupant data obtained during data acquisition 302. The second operation may include eliminating best-fit comfort zones based on the available positions in which the vehicle seat, vehicle pedals, and steering wheel may be arranged. As a result, a set of best-fit comfort zones may be established. Each best-fit comfort zone in the set may be associated with one of several seating postures that the occupant may assume while sitting in the vehicle.

During selection of best-fit posture 334, one best-fit comfort zone may be selected from the set of best-fit comfort zones established during calculation of best-fit comfort zones 332. As an example of selecting the best-fit posture, the best-fit comfort zone associated with a slouching posture and the best-fit comfort zone associate with an erect posture may be determined. An intermediate best-fit comfort zone associated with a moderate amount of slouch between the slouching posture and the erect posture may be chosen as the output of selecting best-fit posture 334.

Finally, calculating a best-fit body arrangement 336 may use the best-fit posture determined during selection of the best-fit posture 334 to determine an arrangement of the occupant's body that maximizes comfort and minimizes risk to the occupant while sitting on vehicle seat 202. The best-fit body arrangement may then be used during calculation of seat solution 338 as shown in FIG. 27.

Figure 27:
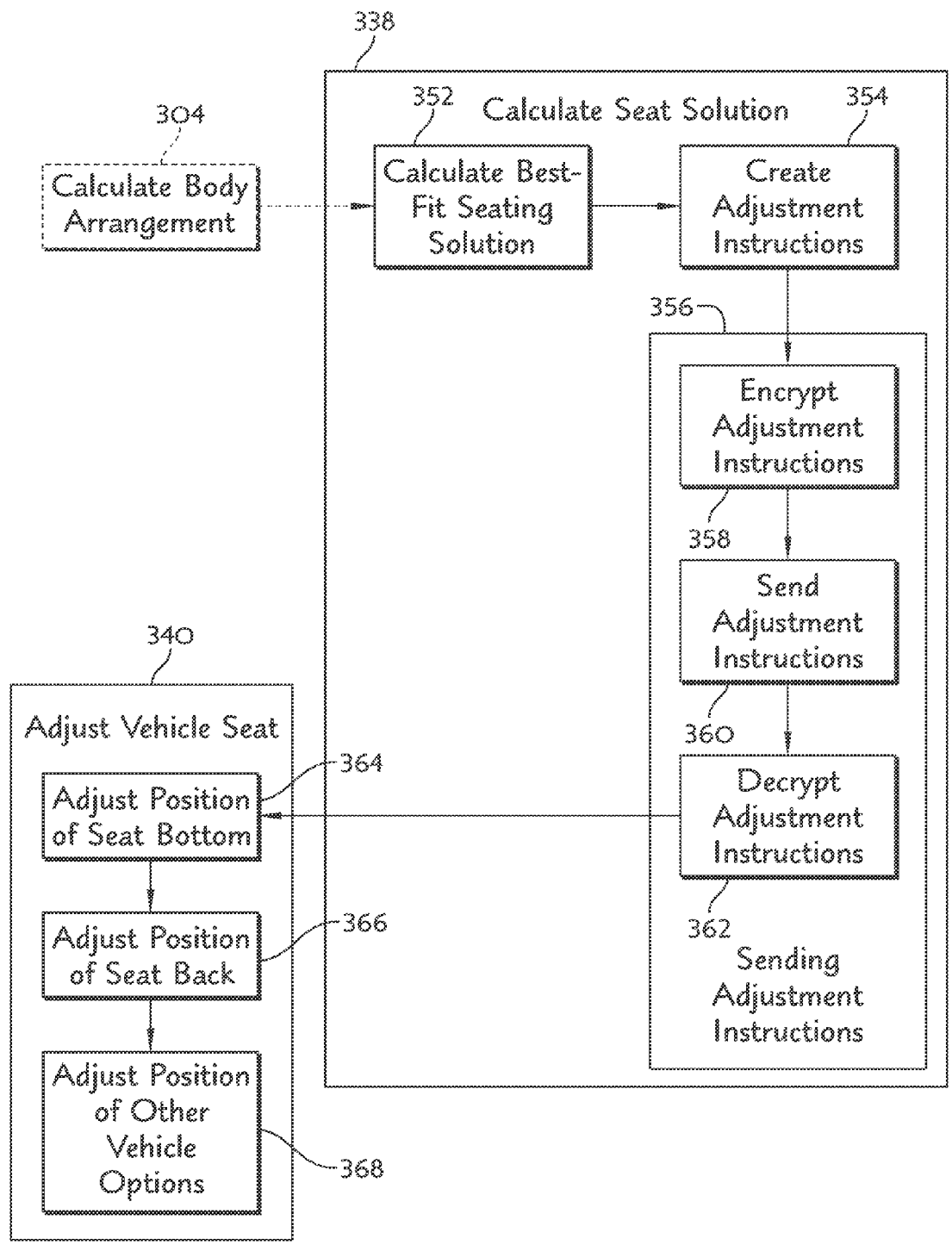

Calculating seat solution 338 may include calculating best-fit seating solution 352, creating adjustment instructions 354, and sending adjustment instructions 356 as shown in FIG. 27. Calculating best-fit seating solution 352 may use the best-fit body arrangement and vehicle data to determine an arrangement of vehicle seat 202 and other vehicle equipment which allows the occupant's body to be in the best-fit body arrangement. After the best-fit seating solution 352 has been determined, the best-fit seating solution may be used to create adjustment instructions 354. These instructions may be used to change the position of the vehicle seat, steering wheel, and vehicle pedals, among other equipment in the vehicle, to achieve the best-fit body arrangement determined earlier. After the adjustment instructions have been generated, the adjustment instructions may be communicated to vehicle seat 202 during sending adjustment instructions 356.

Sending adjustment instructions 356 may include encrypting adjustment instructions 358, sending encrypted instructions 360, and decrypting adjustment instructions 362 as shown in FIG. 27. As an illustrative example, data analysis 318 may be performed on remote server 14. As a result, adjustment instructions may be sent during sending adjustment instructions 356 to mobile terminal 16. Remote server 14 may encrypt adjustment instructions 358 and send encrypted instructions 360. Mobile terminal 16 may be used to receive the encrypted adjustment instructions and communicate those adjustment instructions to vehicle seat 202. A control unit included in vehicle seat 202 may then decrypt the adjustment instructions.

In another embodiment of calculating body arrangement 304 and calculating seat solution 338, data analysis 318 may be performed on mobile terminal 16 without any communication with remote server 14. Mobile terminal 16 may perform data analysis 318, calculating best-fit seating solution 352, creating adjustment instructions 354, encrypting adjustment instructions 358, and sending encrypted instructions 360 to the control system of the vehicle seat or the vehicle.

Decrypted adjustment instructions may then be used by the control unit of the vehicle seat during adjusting vehicle seat 340 as shown in FIG. 27. Adjusting vehicle seat 340 may include adjusting a position of a seat bottom 364 included in the vehicle seat, adjusting a position of a seat back 366 included in the vehicle seat, and adjusting positions of other vehicle options 368. As an example, other vehicle options could be other adjustments of the vehicle seat such as a movable headrest, adjustment of a steering wheel, and adjustment of vehicle pedals. The vehicle seat, steering wheel, and vehicle pedals may move automatically if powered. However, the vehicle seat, steering wheel, and vehicle pedals may be moved manually should the vehicle not be equipped with powered equipment. In that circumstance, decryption of the adjustment instructions may be performed by mobile terminal 16.

Various embodiments may be implemented with a vehicle seat that includes various types of functionality including powered adjustable seatback angle, height adjust, cushion tilt, fore/aft slide, upper back angle, cushion length adjust, powered headrest etc. Additionally, such a seat may include a pneumatic system that includes, for example, upper side bolsters, cushion bolsters, 4-way lumbar adjust, a 10 point programmed massage system, etc. Further, such a seat may include various types of climate control functionality including seat heating, active cooling, ventilation, and/or a full seat memory system. Navigating all of these options is sometime overwhelming to a user; further, the user may not understand fully how the various setting interact with one another or which setting are objectively more beneficial for an occupant's body size, dimensions, and physical conditions.

As suggested in FIGS. 11-19, sensors included in mobile terminal 16 may be used to determine occupant data that can be used to model the occupant's body and proportions. Such sensors may include the camera provided in the mobile terminal, one or more accelerometers. Thus, one or more sensors included in mobile terminal 16 may work in conjunction with one or more software application running on mobile terminal 16 to obtain anthropometric data associated with occupant. In accordance with at least one embodiment, at least one sensor may be used in conjunction with a software application running on mobile terminal 16 and, optionally, sensors and/or transponders in the occupant's seating area to also provide anthropometric data associated with the occupant's body in relative relationship to the interior of a vehicle including the seating area.

Thus, in accordance with the present disclosure, a Graphical User Interface (GUI) and associated software application(s) may run on mobile terminal 16 and be configured to determine human body size and proportion data using the mobile terminal's camera and analyzing body segment lengths, height, weight, clothes size, etc. Software algorithms for performing analysis of the occupant's body size and proportion data may be running on the user's mobile terminal and/or in a server(s) accessible via the Internet that may receive raw or preliminarily analyzed data from the mobile terminal. That server(s) may run software configured to provide analytical functionality that may provide an optimized or customized fit for the occupant in the occupant's vehicle seat. Utility of the software for analyzing an occupant's size and proportional dimensions may also be used to improve or customize fit of seats other than automotive seats and may be used to improve seating in aircraft, watercraft, or motorcycles as well. Moreover, there is additional utility in using the software to optimize or customize a seat that is home or office furniture; additionally, such software may be used to improve fit of wheelchairs and other mobility assistance devices.

Figure 28:
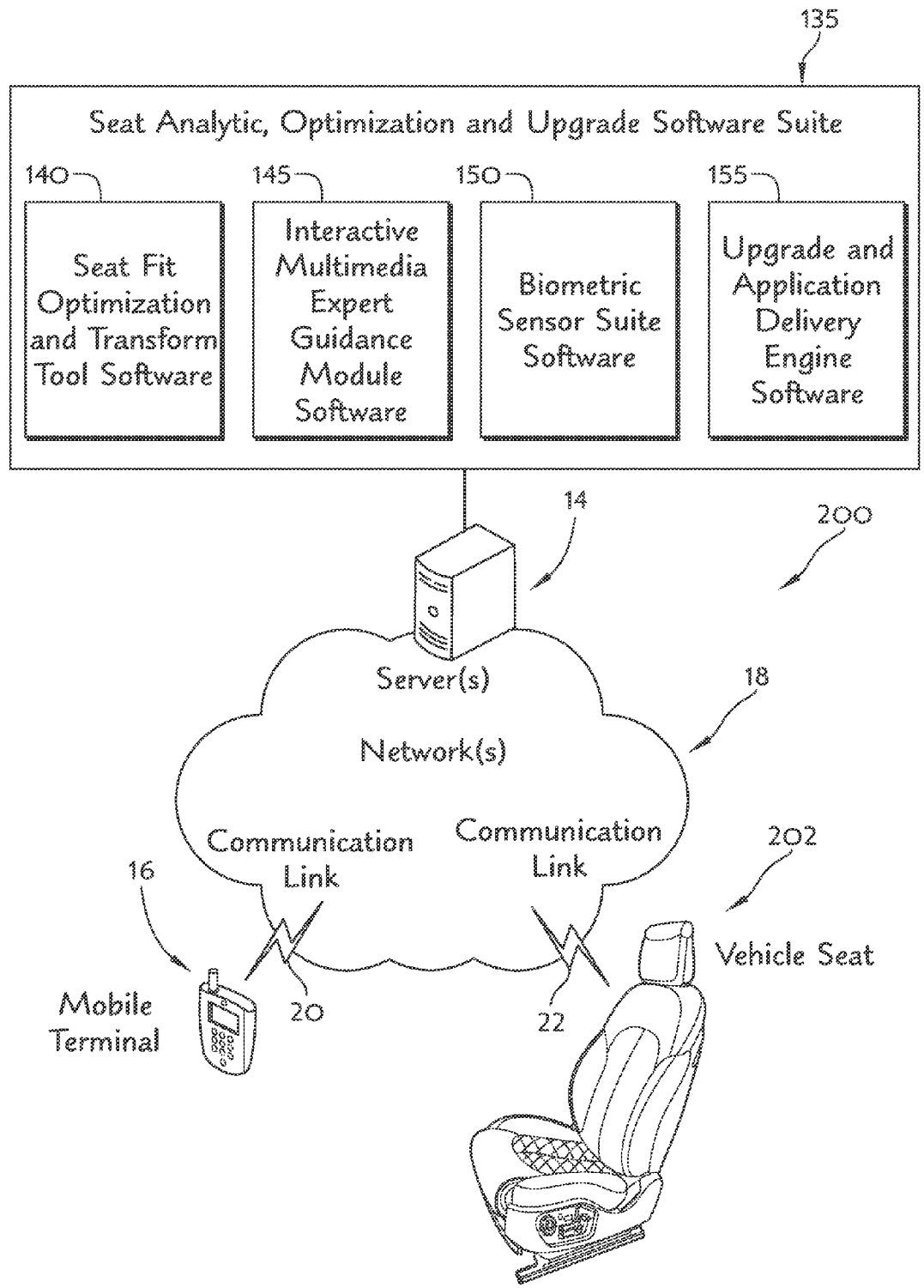

GUI and applications may be implemented on a PDA and/or via server-application context as shown in FIG. 28. Alternatively, or in addition, some or all of such applications may be implemented on or in connection with software and/or hardware provided on a vehicle. Thus, one or more software applications analyzing the determined human body size and proportion data may be used to select optimized seat adjustment parameters for comfort, fit, safety, etc. In an implementation where the collected data is acquired in relationship with the occupant's interaction with their vehicle, this software may optionally be configured to detect position(s) of view mirrors, operation peddles, steering wheel, heads up display, etc. to optimize occupant's experience.

As shown in FIG. 28, equipment and processes for adjusting user-adjustable equipment in a vehicle provides improved utility. First, the process for adjusting user-adjustable equipment provides instructions to the user that allows the user to customize the vehicle seat and other user-adjustable equipment so that safety and comfort is maximized. Second, the specific algorithms used to obtain the best-fit seating solution may be managed and updated on servers. Third, centrally locating the generation of the best-fit seating solution provides the ability to control dissemination of the algorithms used to generate the best-fit seating solution. Fourth, by generating the equipment-adjustment instructions and communicating them automatically to powered actuators included in the user-adjustable equipment, vehicles built to include best-fit seating solution technology may automatically respond to the instructions. Fifth, by generating the equipment-adjustment instructions and communicating them to a user in the field, all vehicle seats may be adjusted according to the presently disclosed process. Sixth, the process of generating a best-fit seating solution and generating equipment-adjustment instructions is done remotely from the equipment. As a result, equipment in other fields may be adjusted such as other vehicle seating (airplanes, trains, boats, motorcycles), wheel chairs, and office furniture.

Figure 33:
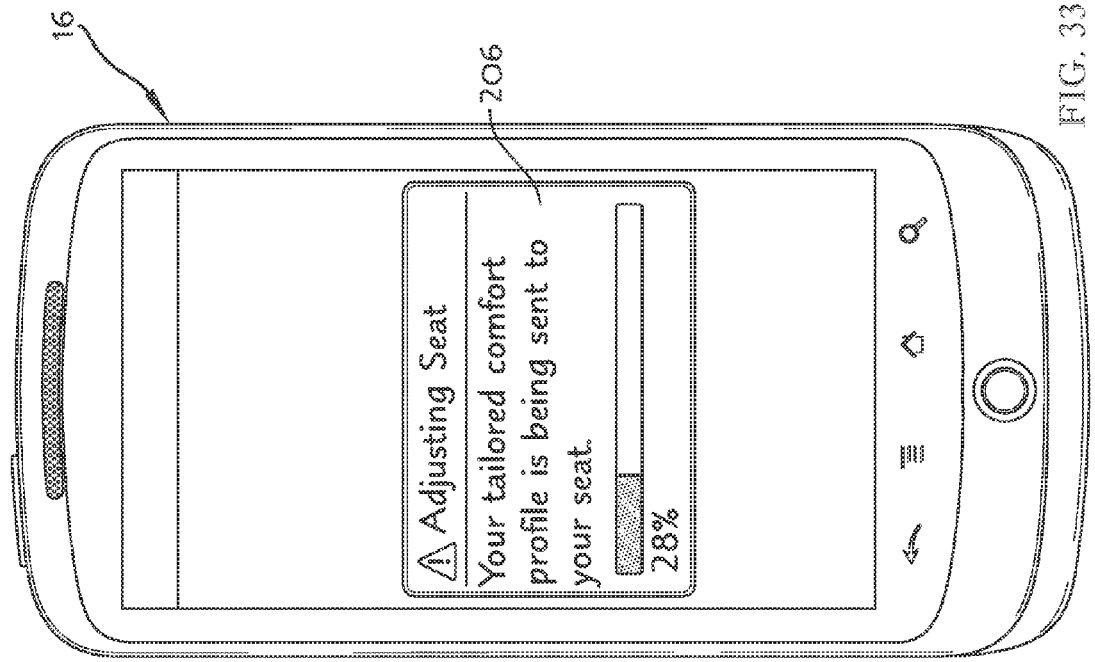
Figure 32:
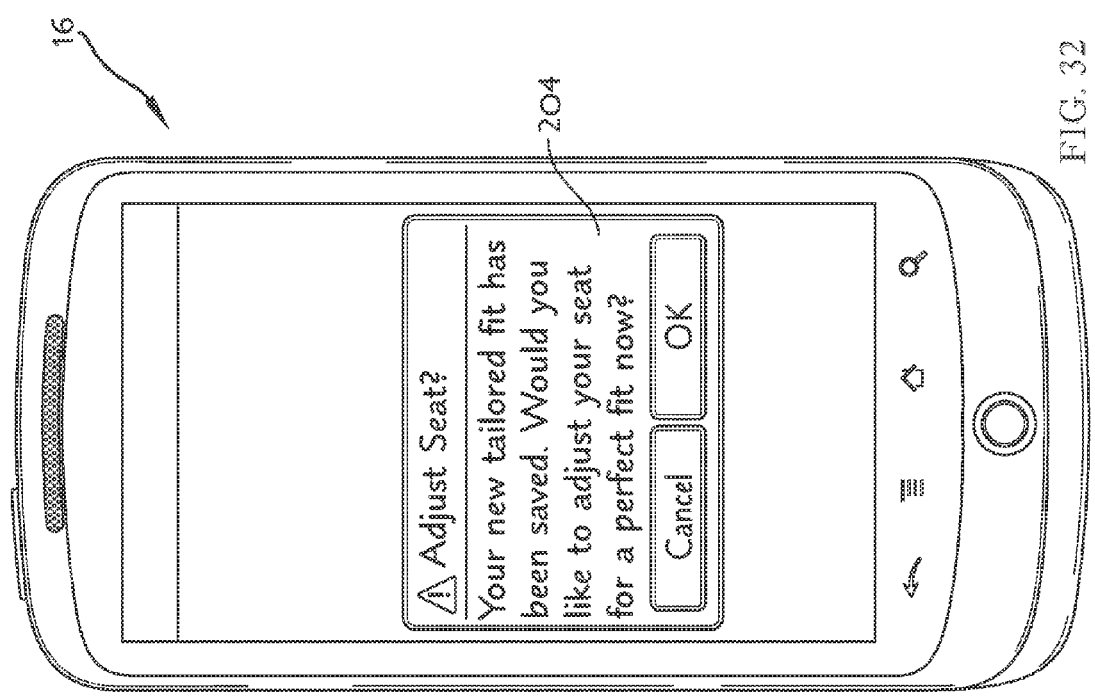
Figure 34:
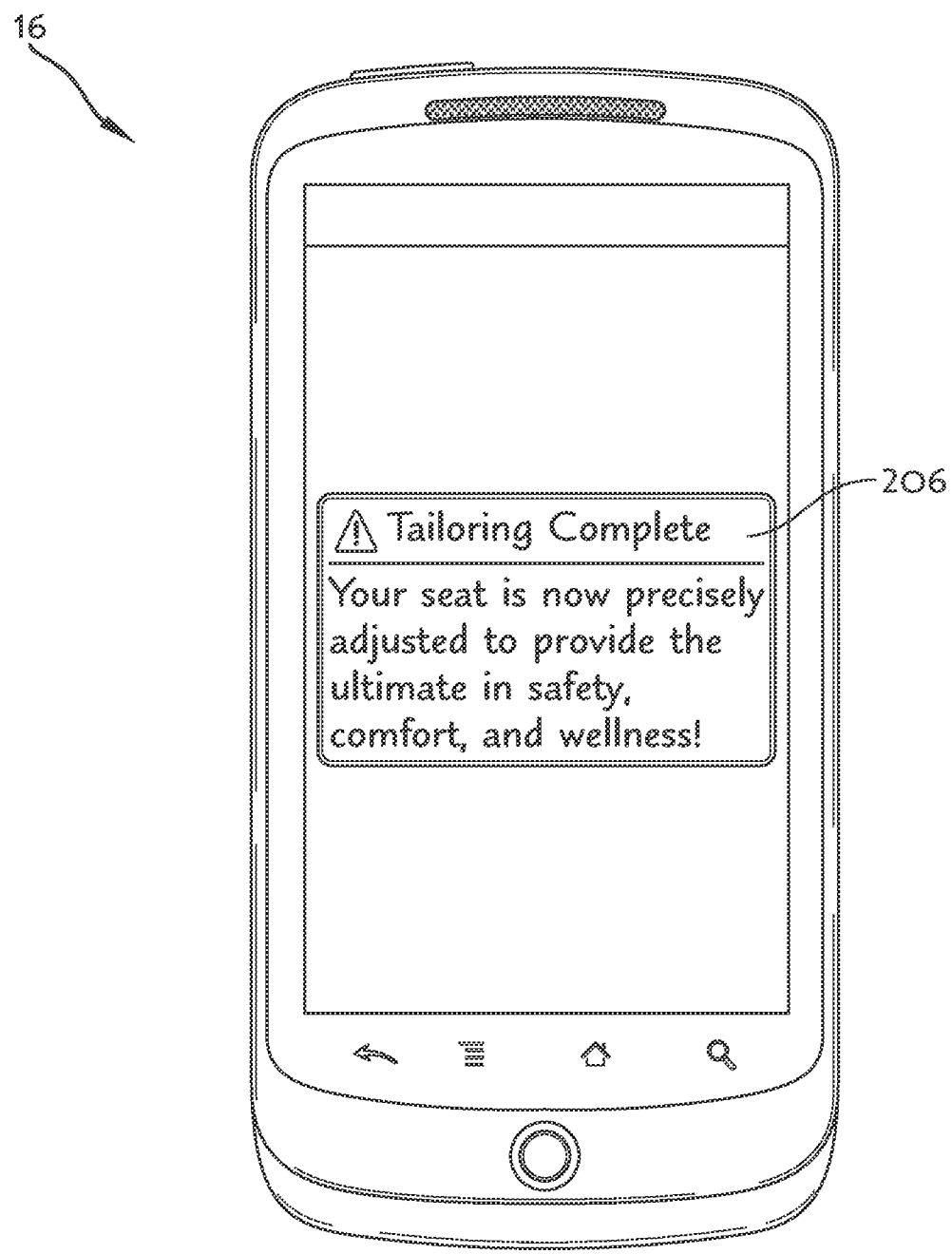
Figure 35:
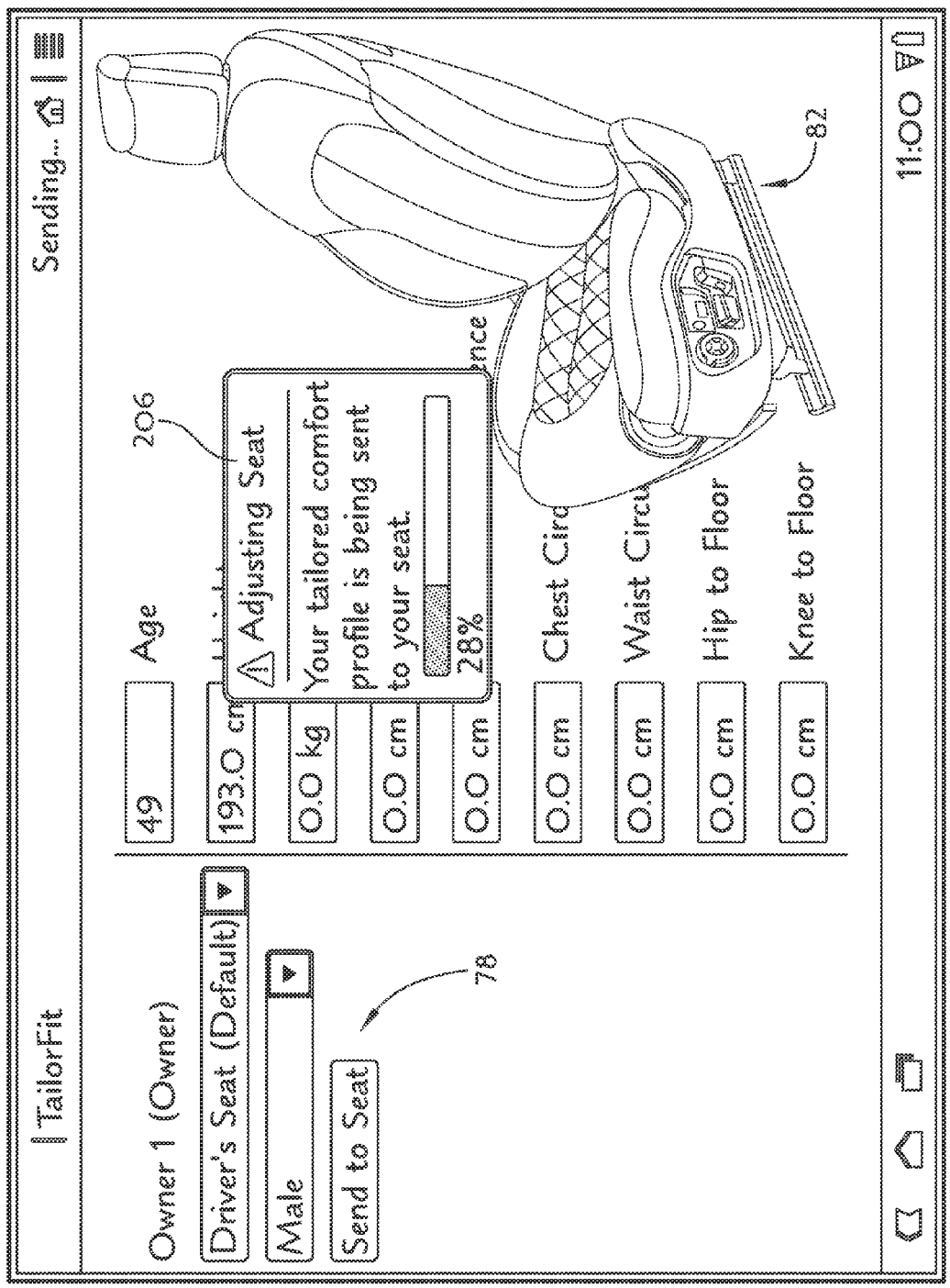
Figure 36:
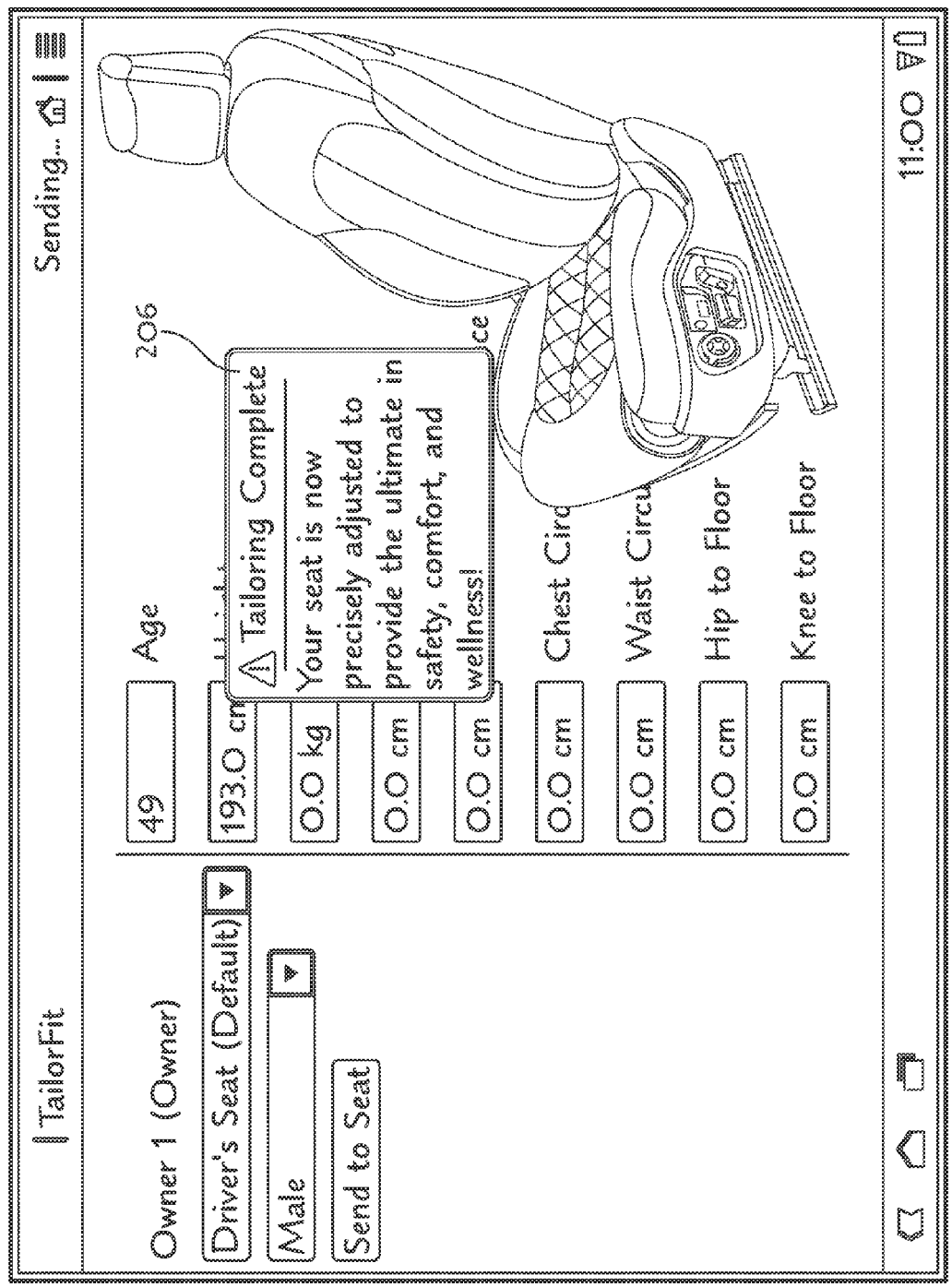

FIGS. 32-36 provide a series of screen shots illustrating user interface functionality provided by at least one software application and used to deliver best-fit seating solution to vehicle seat 202. As shown in FIG. 32, the mobile terminal 16 may provide the user with the option 204 of adjusting their vehicle seat 202 to provide the best-fit arrangement. If the user selects that option, mobile terminal 16 may provide a series of status messages 206 providing an indication of adjusting vehicle seat 340 as shown in FIGS. 33 and 34. Another indication of adjusting vehicle seat 340 is also shown FIGS. 35 and 36.

Figure 37:
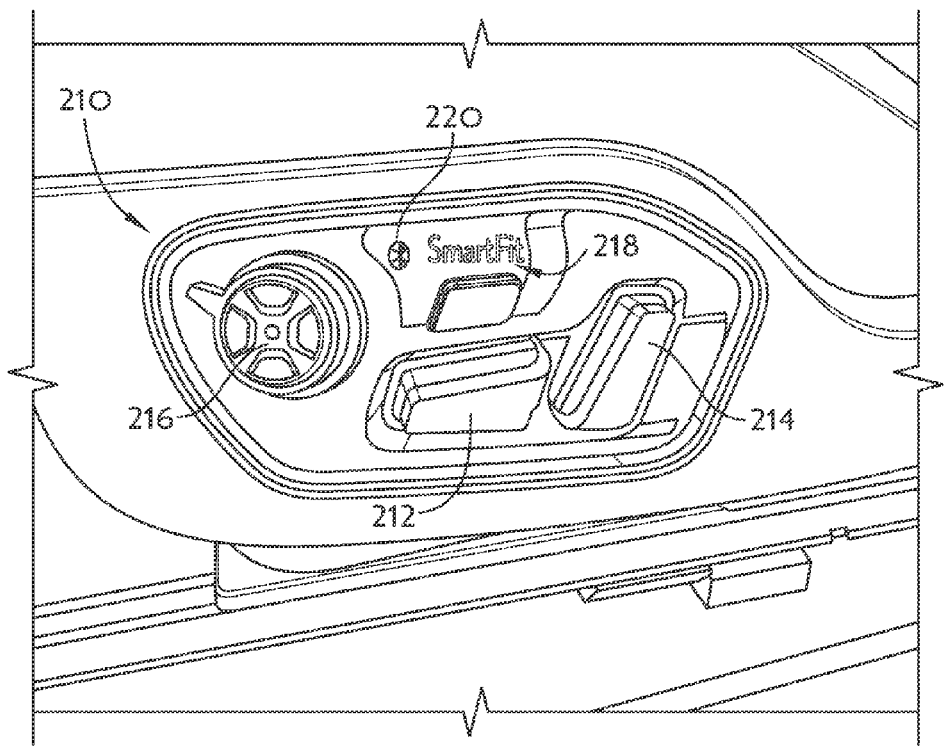
Figure 38:
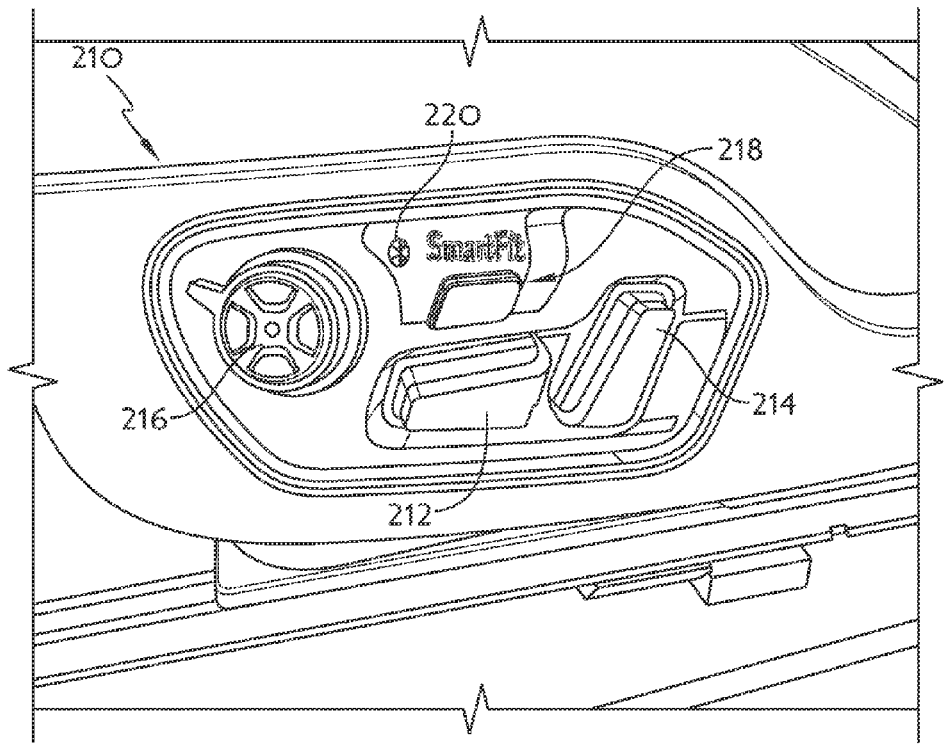

Vehicle seat 202 may include powered and/or manual adjustment mechanisms. FIGS. 37 and 38 provide perspective illustrations of examples of on-seating unit control panels 208 provided in accordance with the present disclosure. On-seating unit control panels 208 may include a control panel 208 that includes adjustment controls 212 for adjusting the horizontal component of the vehicle seat, controls 214 for adjusting the vertical component of the vehicle seat, various massage/heating/cooling functionality controls 216, controls 218 for adjusting the headrest of the vehicle seat, in addition to an indicator 220 of whether the vehicle seat is presently receiving or transmitting data and/or instructions via communication unit 18 to mobile terminal

16 or another component via a communication protocol such as a BLUETOOTH® system. Further, the control panel 208 also includes an indicator 222, which is configured to signify whether the vehicle seat is in the best-fit arrangement as shown in FIG. 38.

Optionally, the seat connectivity interface may also be configured to provide communication and control interfaces that enable a user or the user's mobile terminal to interface with the occupant's vehicle seat or seating area to both acquire data (e.g., data from other products/zones than the vehicle seat including steering wheel, foot pedals, rear view mirrors, etc.) to control structural or environment configuration of the vehicle seat or seating area.

As explained above, services and functionality provided in accordance with the present disclosure may provide the user with the option of receiving expert guidance from one or more guidance sources regarding how the occupant's vehicle seat should be configured for one or more physical ailments or conditions or to provide a specified goal of the user.

Accordingly, as illustrated in FIG. 39, the user interface functionality provided by at least one software application may include selection of one or more items provided on a menu for enabling a user to select from one or more physical ailments or treatment conditions for which he is seeking assistance in accordance with the present disclosure. Such physical ailments or treatment conditions may include, for example, lower back pain 224, numbness in seat 226, leg discomfort 228, stiffness of back 230, headrest positioning 232 for increased safety or a stiff neck, thermal discomfort 234, etc.

Once a user has selected from one of the displayed options, the mobile application may be configured to display expert guidance 236 pertaining to the selected condition in combination with educational information such as videos and/or audio programs 238 regarding treatment of the specified condition and/or positioning of the occupant's vehicle seat to obtain relief from certain symptoms or undesirable experiences. FIG. 40 provides a screen shot illustrating the user interface functionality provided by at least one software application for disseminating treatment information and/or recommendations for positioning of a vehicle seat in accordance with the present disclosure.

As explained above with connection to the seat-fit optimization and transform software 140 illustrated in FIG. 28, the dissemination of interactive multimedia expert guidance may be performed in whole or in part by the mobile application(s) running on the mobile terminal 16. However, it is also foreseeable in accordance with the present disclosure, that some portion of the functionality, e.g., storage, analysis, etc. may be performed using software running on a servers 14 accessible via one or more communication units 18 (also called networks 18) from the mobile terminal 16, e.g., interactive multimedia expert guidance module software 145.

As explained above, services and functionality provided in accordance with the present disclosure provide the occupant with the option of upgrading one or more features of the occupant's vehicle seat to provide increased comfort, physical therapies, optimized seating configurations for particular occupant activities or interests, etc. For example, the occupant may be provided with the opportunity to upgrade their vehicle seat features in conjunction with the dissemination of queried expert advice, e.g., "You should consider a lower back therapy treatment, downloadable for $2.99 to your mobile terminal as a source of relieve for your lower back pain."

FIGS. 41-47 provide screen shots illustrating the user interface functionality provided by at least one software application for enabling a user to select from one or more upgrade options for upgrading functionality provided by the occupant's vehicle seat via wireless Over The Air (OTA) configuration in accordance with the present disclosure.

Figure 41:
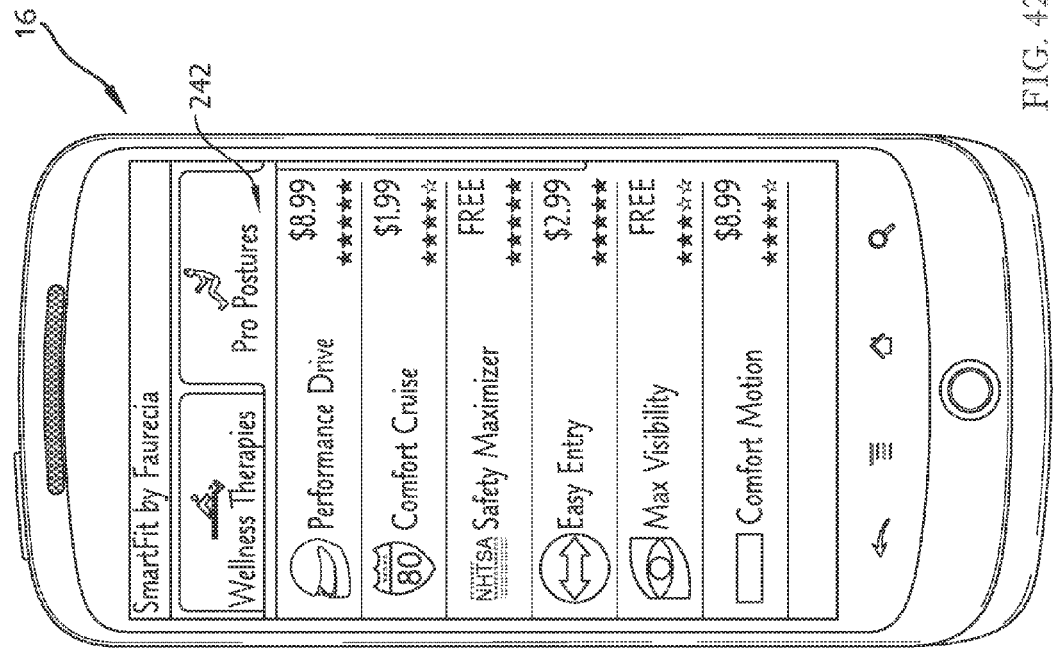
Figure 42:
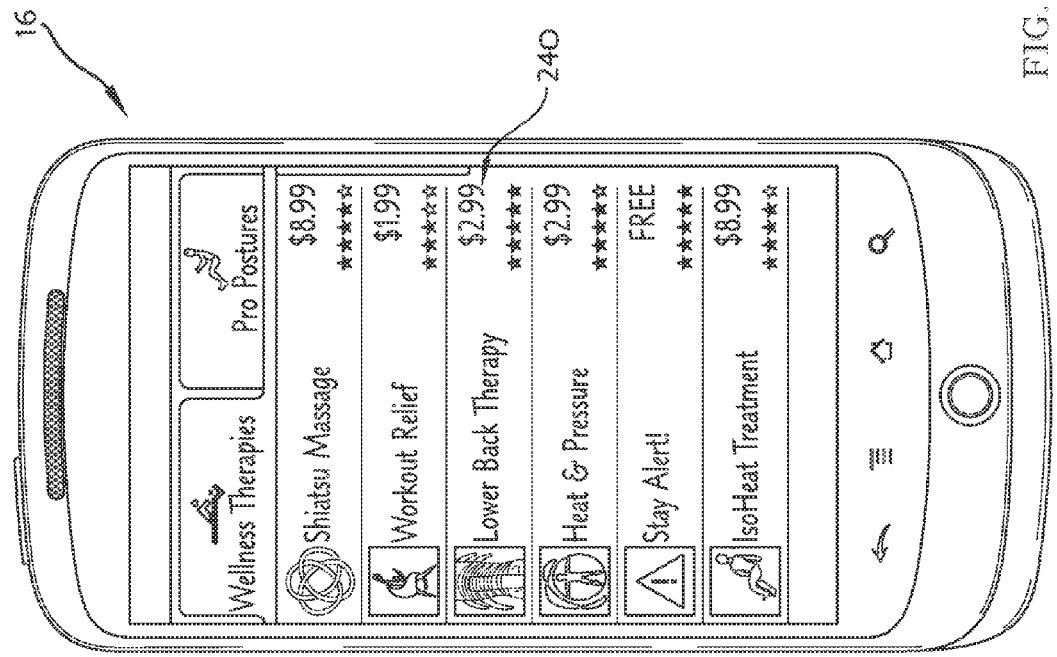
Figure 43:
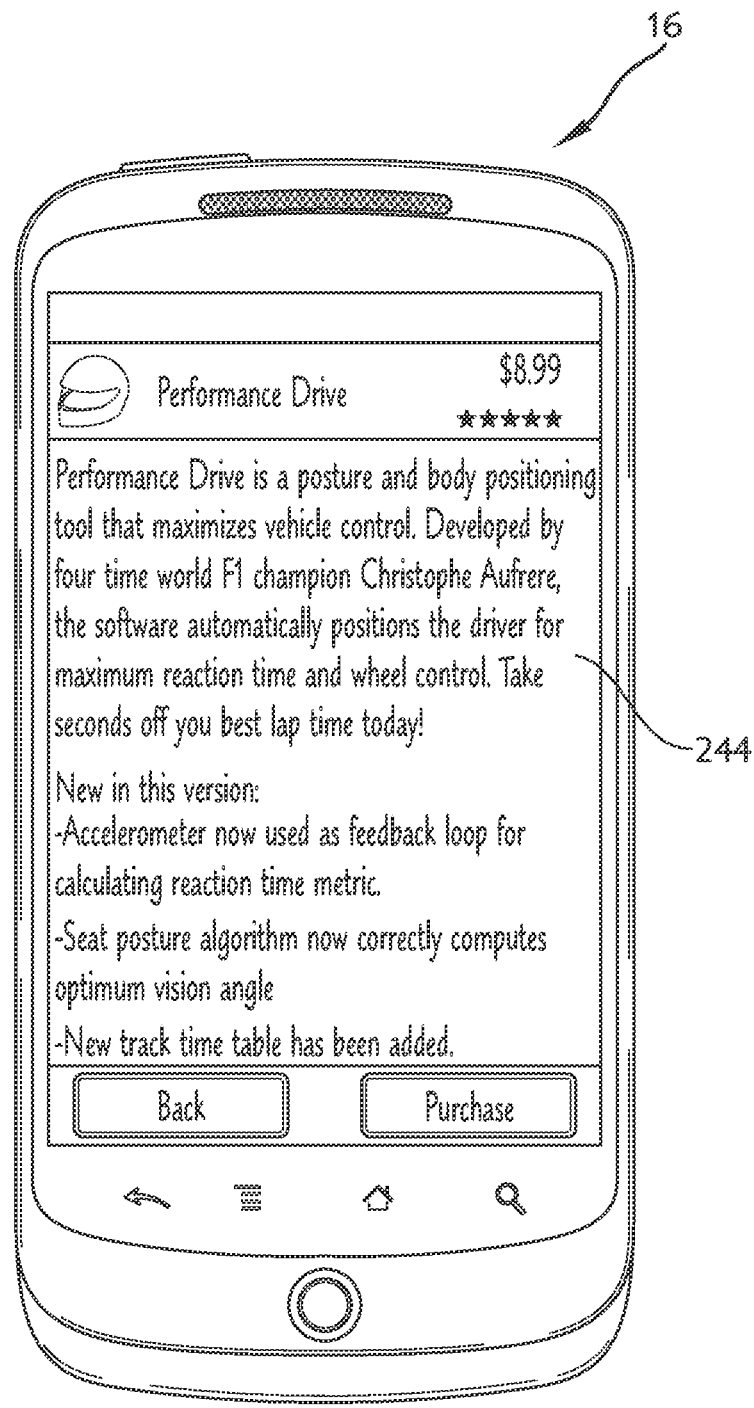

The menu of upgrade options may not be limited to therapeutic treatments as shown in FIG. 41, but may also include positioning application options 242 for optimizing certain aspects of the occupant's experience including driver performance, cruising comfort safety maximization, ease of entry, increased driver visual acuity, and motion comfort improvement, etc. The upgrade application and delivery software running on the mobile terminal may also be configured to provide additional information 244 explaining the performance, value or benefit resulting from the upgrade (see FIG. 43). Moreover, the software application for providing various customization and/or upgrade options may, itself, be an upgradeable application.

Figure 45:
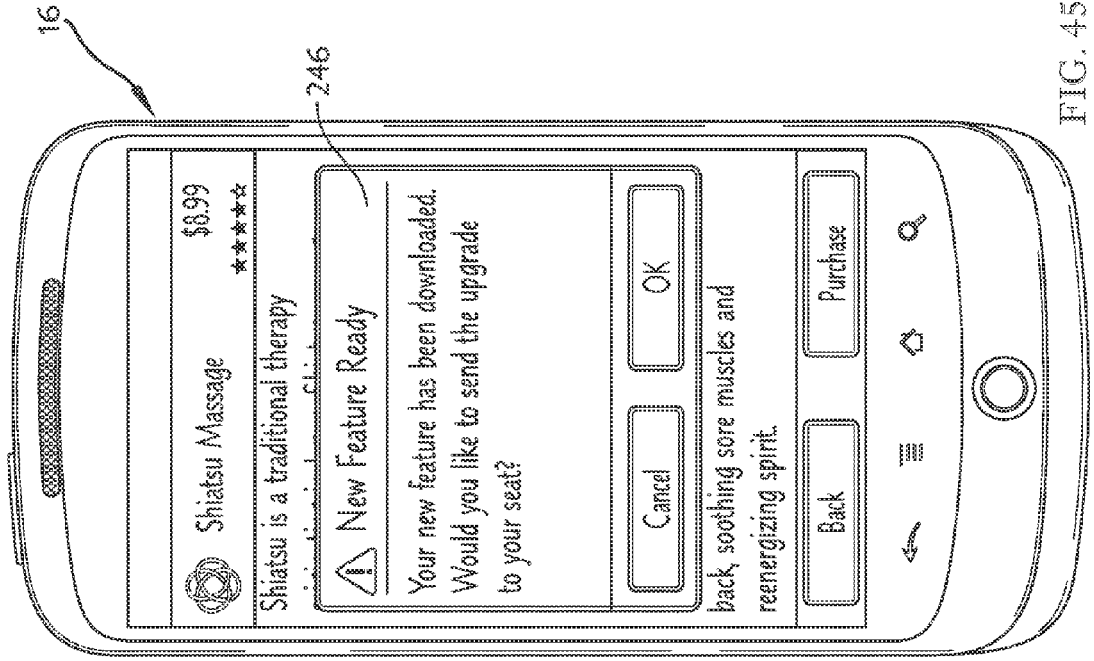
Figure 44:
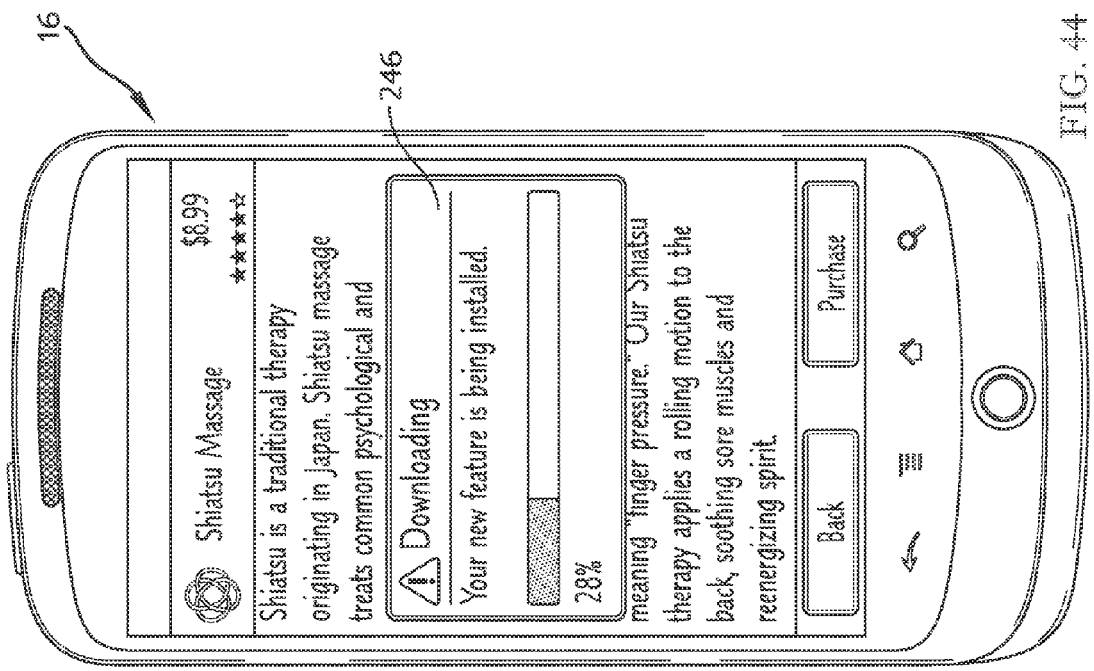

Once the user has selected at least one upgrade from a menu of upgrades 240, such upgrades may be downloaded to the occupant's mobile terminal 16. As a result, such upgrades may be installed in the occupant's vehicle seat via communication unit 18. FIGS. 44 and 45 provide a series of screen shots illustrating the user interface functionality provided by at least one software application and used to deliver data and/or software programming associated with the upgraded functionality to the user's mobile terminal.

Figure 47:
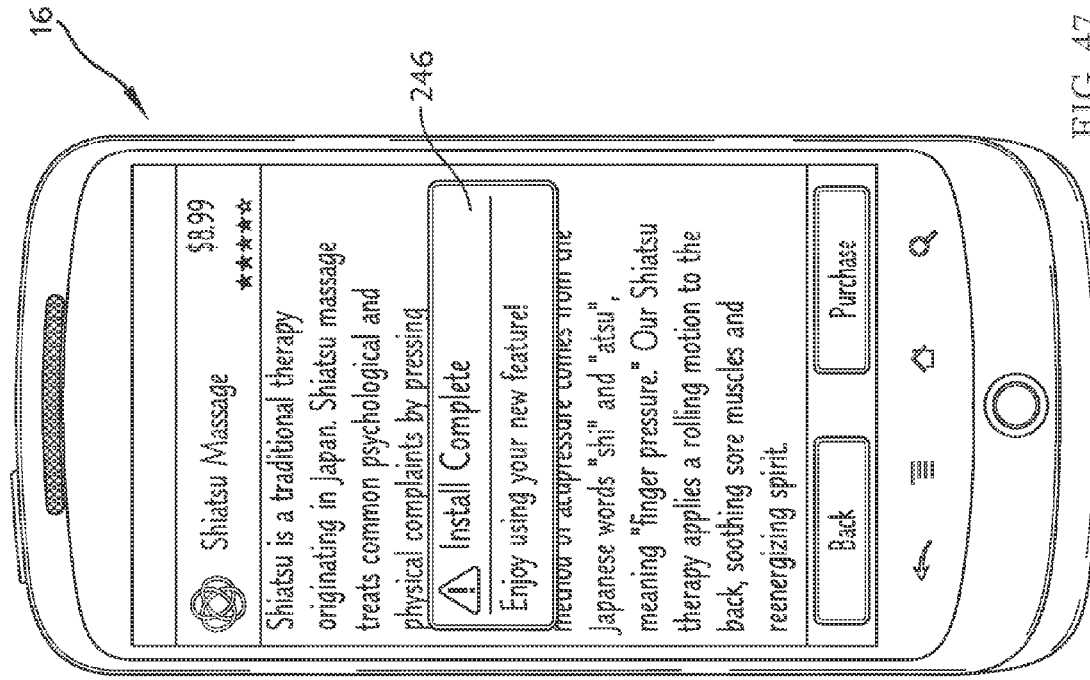
Figure 46:
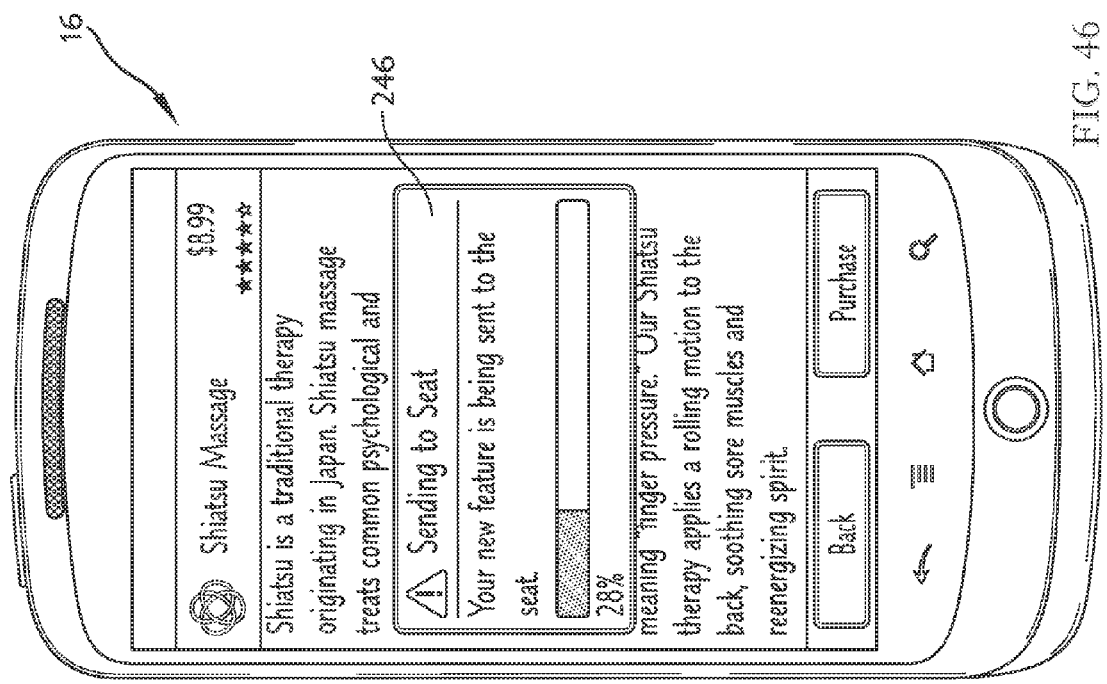

FIGS. 46 and 47 provide a series of screen shots illustrating the user interface functionality provided by at least one software application and used to provide status update information 246 regarding the delivery of the data and/or software programming associated with the upgraded functionality from an occupant's mobile terminal 16 to the occupant's vehicle seat.

Figure 49:
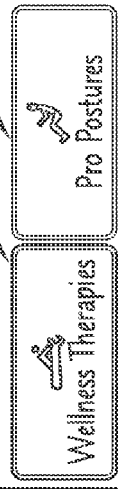

Another series of screen shots illustrating the user interface functionality provided by at least one software application are shown in FIGS. 48-53. The user interface functionality enables a user to select from one or more upgrade options for upgrading functionality provided by the occupant's vehicle seat via the communication unit. A user may be presented with an option to select a Wellness Therapies button 568 or a Pro Postures button 569 as shown in FIG. 48. As an example, the user has selected Wellness Therapies button 568. The user is then able to select one or more options to include in the occupant support system. As shown in FIG. 49, the user has selected a Shiatsu Massage application 570, a Workout Relief application 571, and MicroFit application 574 among various other Wellness Therapies.

Figure 50:
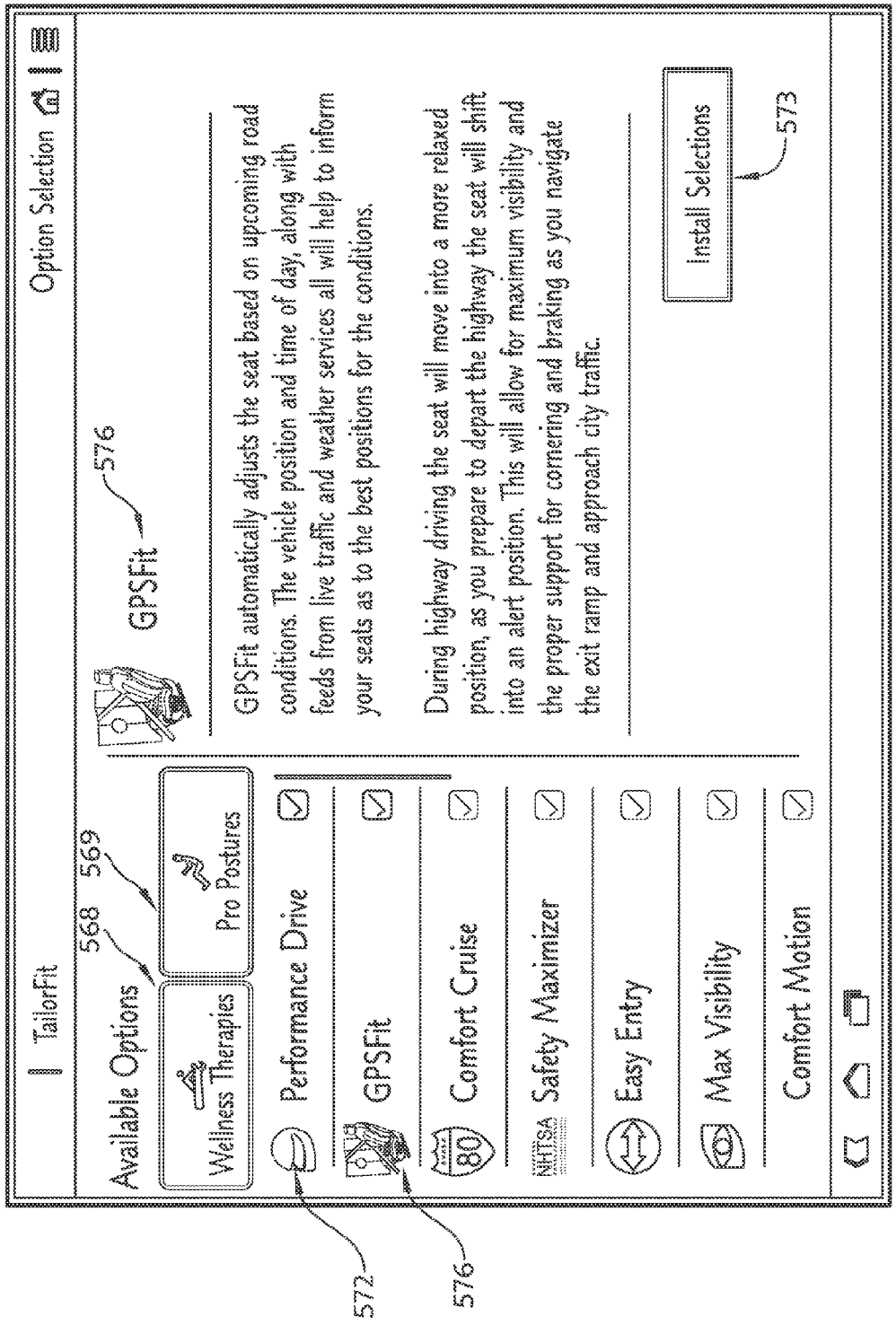
Figure 51:
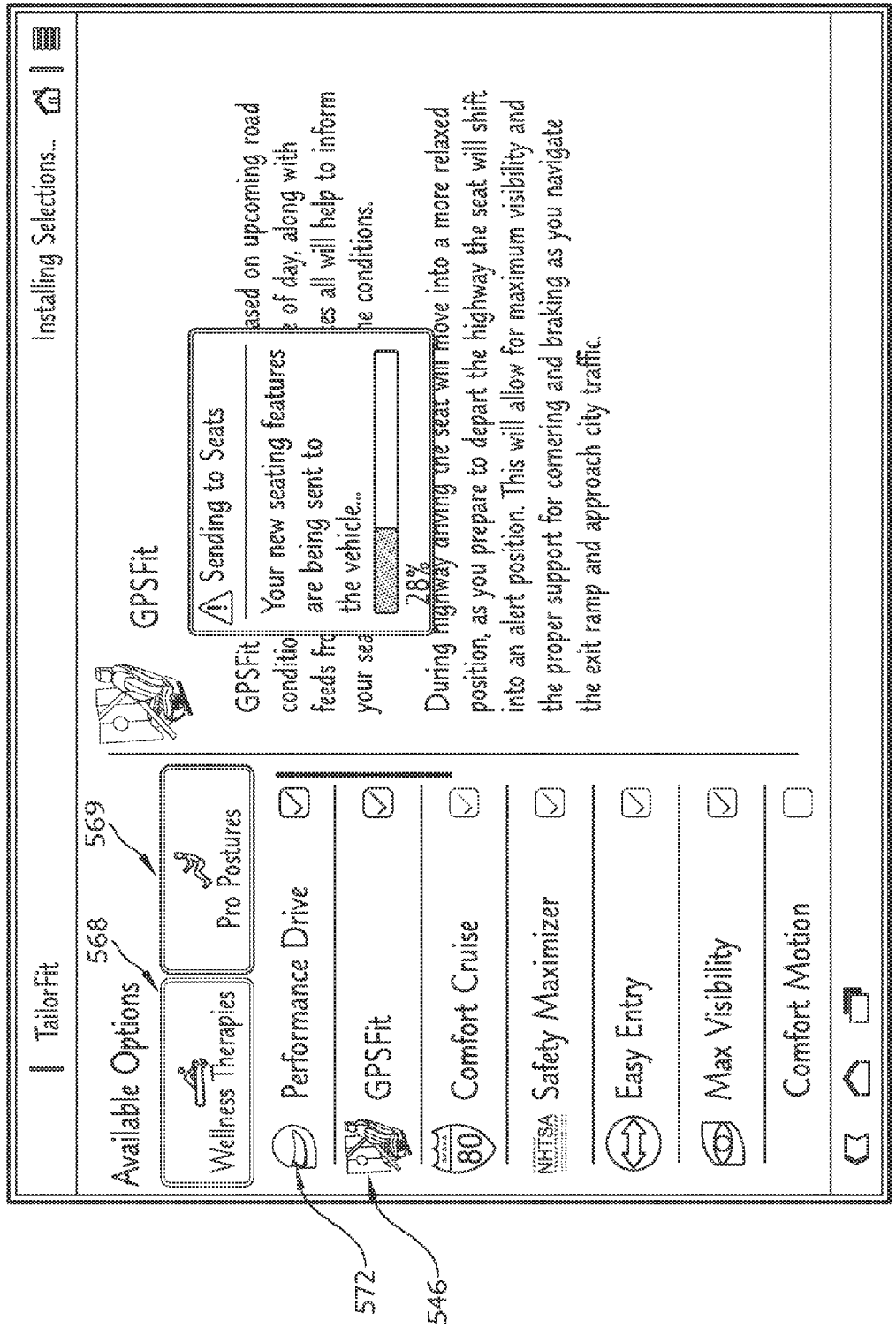
Figure 52:
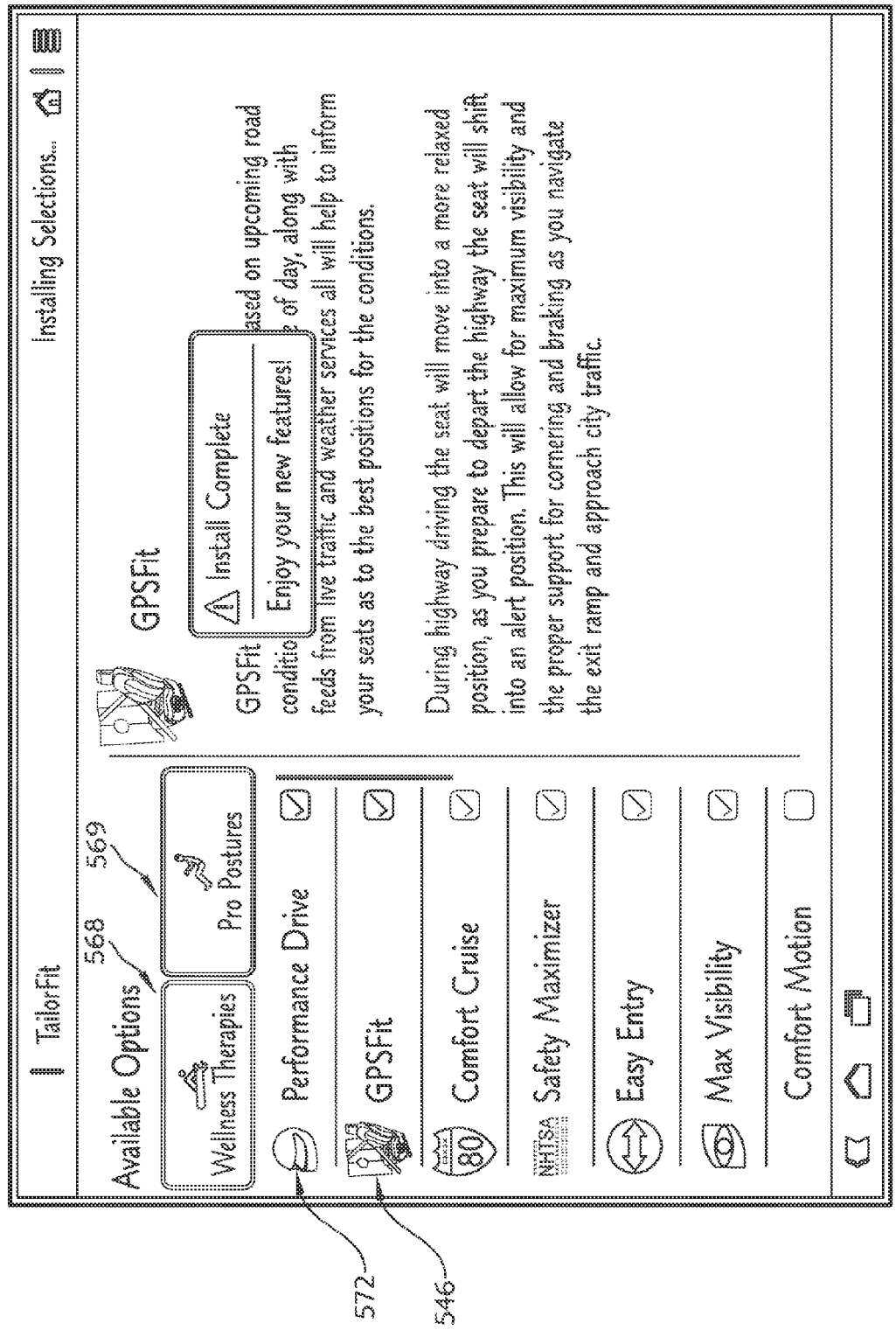

The user may also select Pro Postures button 569. As an example, the user may select a Performance Drive application 572 and the GPSFit application 576 as shown in FIG. 50. Once the user has selected the desired options, the user presses an Install Selections button 573 causing the selected options to be installed into the seat-movement system as suggested in FIG. 51 and verified in FIG. 52.

As explained above with connection to the seat-fit optimization and transform software 140 illustrated in FIG. 28, the upgrade and application delivery functionality may be provided in whole or in part by the mobile application(s) running on the mobile terminal 16. However, it is also foreseeable within the scope of the present disclosure that some portion of the functionality, e.g., storage, analysis, etc. may be performed using software running on a servers (e.g. server 14) accessible via communication unit 18 from the mobile terminal 16, e.g., upgrade and application delivery engine software 155.

As explained above, services and functionality provided in accordance with the present disclosure provide a vehicle seat that may include a plurality of sensors that monitor the health and well being of the user. The vehicle seat may transmit the monitored data to a server based application (either directly wirelessly or through a mobile terminal based software application) that provides analysis of the data to monitor the health and well being and/or provide further analysis regarding optimization and/or customization of one or more vehicle seat parameters.

Furthermore, the suite 135 may include biometric sensor suite software 150 configured to receive biometric data for the user acquired by sensors included within vehicle seat 202. That biometric data may be analyzed by the software suite to diagnose a physical condition or ailment and/or provide recommendations for positioning or altering the position of the occupant's vehicle seat to address or remedy the physical condition or ailment. Additionally, the software 150 may also be configured to provide recommendations on one or more upgrades that may be made to the occupant's vehicle seat 202 via upgrade and application delivery engine software 155, also included in the suite 135 (as explained herein in conjunction with FIGS. 25-31.

As explained above, services and functionality provided in accordance with the present disclosure provide the user with the option of optimizing or customizing their vehicle seat based on analysis performed by the seat-fit optimization and transform tool software (that may be implemented on server 14 and/or within an application running on the mobile terminal 16 illustrated in FIG. 28.

As explained above, a communication unit may be configured to provide communication and control interfaces that enable a user or the user's mobile terminal to interface with the occupant's vehicle seat or seating area to both acquire data (e.g., data from other products/zones than the vehicle seat including steering wheel, foot pedals, rear view mirrors, etc.) to control structural or environment configuration of the vehicle seat or seating area. This aspect may provide information to software included in the system for providing customization of seat positioning to enable optimization of seat positioning through feedback, as explained in FIG. 53.

Figure 53:
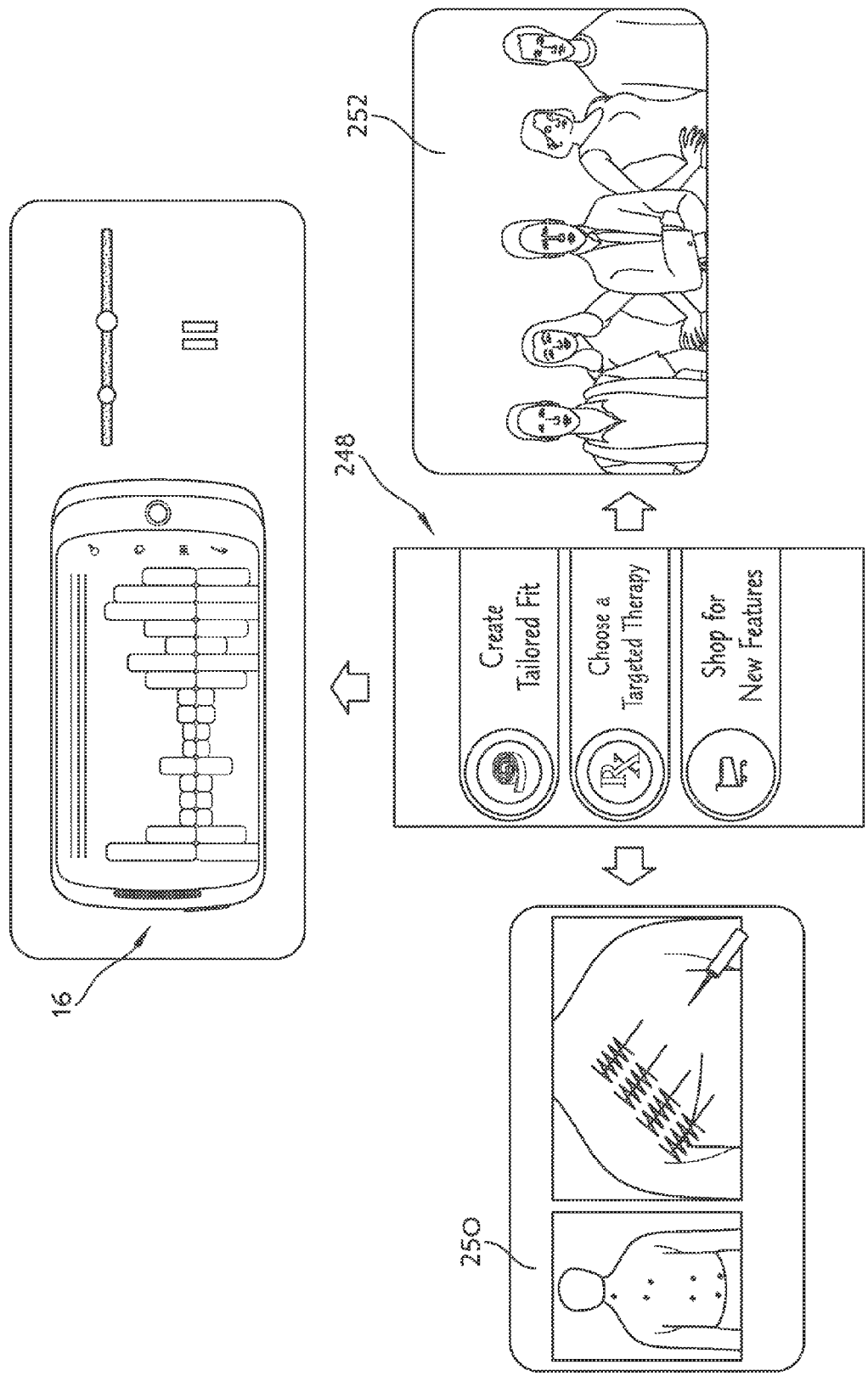

FIG. 53 provides an illustrative diagram used to explain functionality that may be provided to a user via the system, methodologies and components for acquiring, analyzing and utilizing user body specifications to provide for improved seating structure and environment configuration. By using the main menu 248 of the software applications provided in the present disclosure as a mechanism to gather and analyze data regarding occupants' experiences with vehicle seats and their associated physical conditions, the system can provide a mechanism for further analyzing occupant well being data as well as further improving upon seating technology. As a result, the main menu, and its associated back end software can be used to coordinate data acquisition for sensors 250 included in vehicle seats to provide additional information about the way that certain vehicle-seat settings and configurations affect the well being of the occupant. That information can then be output to the occupant's mobile terminal 16 to enable them to participate actively in the treatment and/or track the progress or regression of their physical conditions.

For example, if the vehicle seat were that of a long distance truck driver, sensors within the vehicle seat could be used to provide status information regarding the blood flow, temperature or other biometric data indicating his well being throughout his work day. Such information could be used to give recommendations for driving breaks, advice for alteration of the driver's vehicle seat parameters, application of heat or cold, etc. Furthermore, that data could also be used by one or more experts 252 to further optimize modeling and therapeutic treatments for individuals. As a result, the centralize function of the system services and functionality further improve the manner in which data is acquired, analyzed, and used to improve well being for individuals using seats of all kinds.

As shown for example in FIG. 54, another embodiment of an occupant-support system 400 may include configuration control system 10, a front vehicle seat 402, a rear vehicle seat 404, and a sensor package 406. Front and rear vehicle seats 402, 404 may be configured to communicate with communication unit 18 to achieve a best-fit arrangement of both the front and rear vehicle seat 402, 404. Sensor package 406 may include a sensor integrated into the vehicle seat and configured to sense an occupant's anthropometric data and an occupant's comfort data, and a sensor integrated into a vehicle cabin and configured to receive an input from mobile terminal 16, an input received from user interface 12, and an input received from computer 14.

As shown in FIG. 54, occupant-support system 400 may include front intelligent vehicle seat 402 and rear intelligent vehicle seat 404. Front and rear intelligent vehicle seats 402, 404 may be coupled to communication unit 18 and configured to exchange data about the position and state of each vehicle seat 402, 404 with one another. As a result, intelligent vehicle seats 402, 404 act as sources of data which may then be used to calculate a best-fit arrangement of both vehicle seats 402, 404. The best-fit arrangement of vehicle seats 402, 404 may be the arrangement of intelligent vehicle seats 402, 404 relative to one another that maximizes comfort and safety of each occupant sitting in his or her seat.

Figure 55:
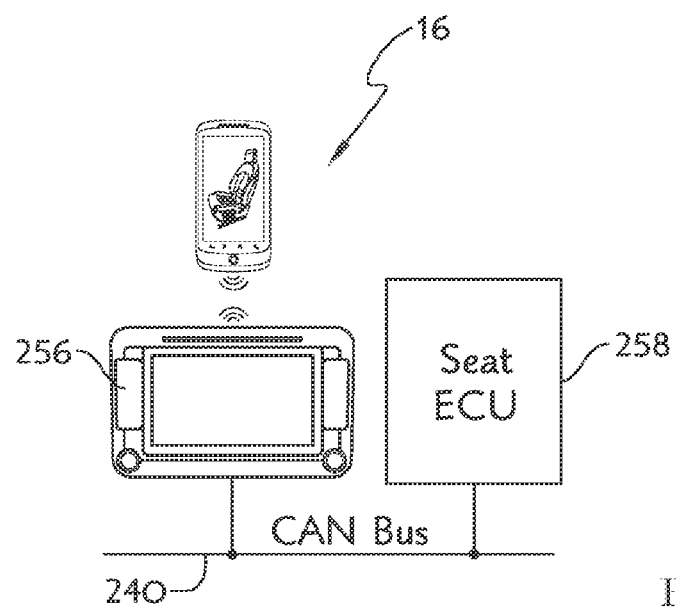
Figure 56:
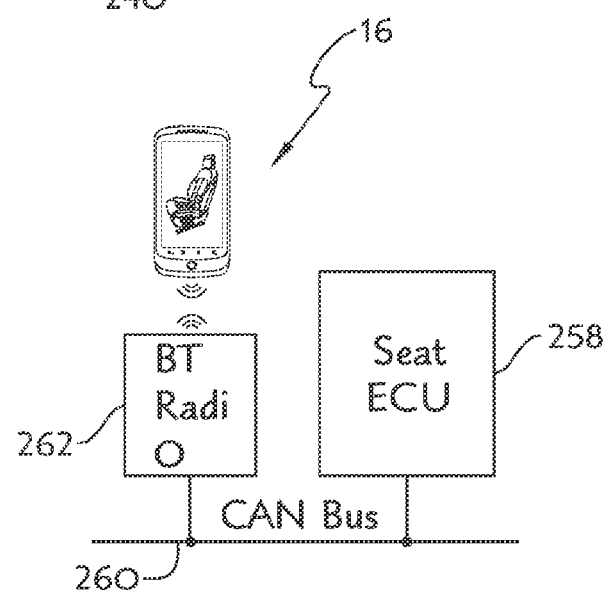
Figure 57:
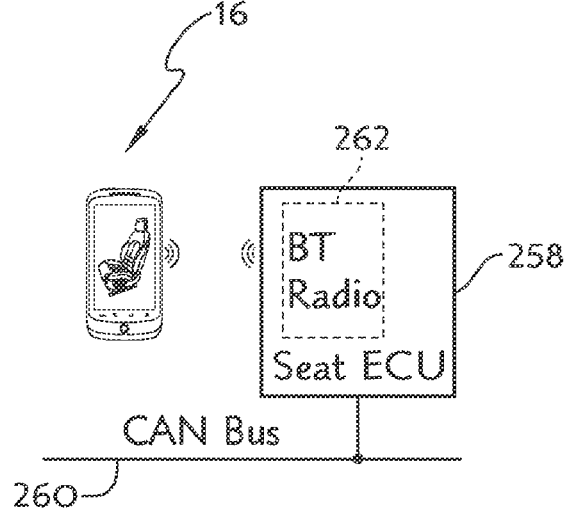

FIGS. 55-57 provide various illustrative diagrams describing various configurations for providing certain communication functionality provided in conjunction with an occupant's vehicle seat. As shown in FIG. 55, terminal 16 may communicate wirelessly with an occupant's vehicle communication and navigation system 256 that is coupled to the occupant's vehicle seat Electronic Control Unit (ECU) 258 via the CAN communication bus 260 (resident within the occupant's vehicle) to obtain sensor data from seat ECU 258 and provide configuration instructions to seat ECU 258 to optimize positioning and download upgrades. Alternatively, as shown in FIG. 56, mobile terminal 16 may communicate with a BLUETOOTH® radio 262 coupled to the Seat ECU 258 via the CAN communication bus 260. Further, as shown in FIG. 57, mobile terminal 16 may communicate wirelessly with Bluetooth® radio 262, which may be incorporated in the seat ECU 258 that is sitting on the CAN communication bus 260.

Figure 58:
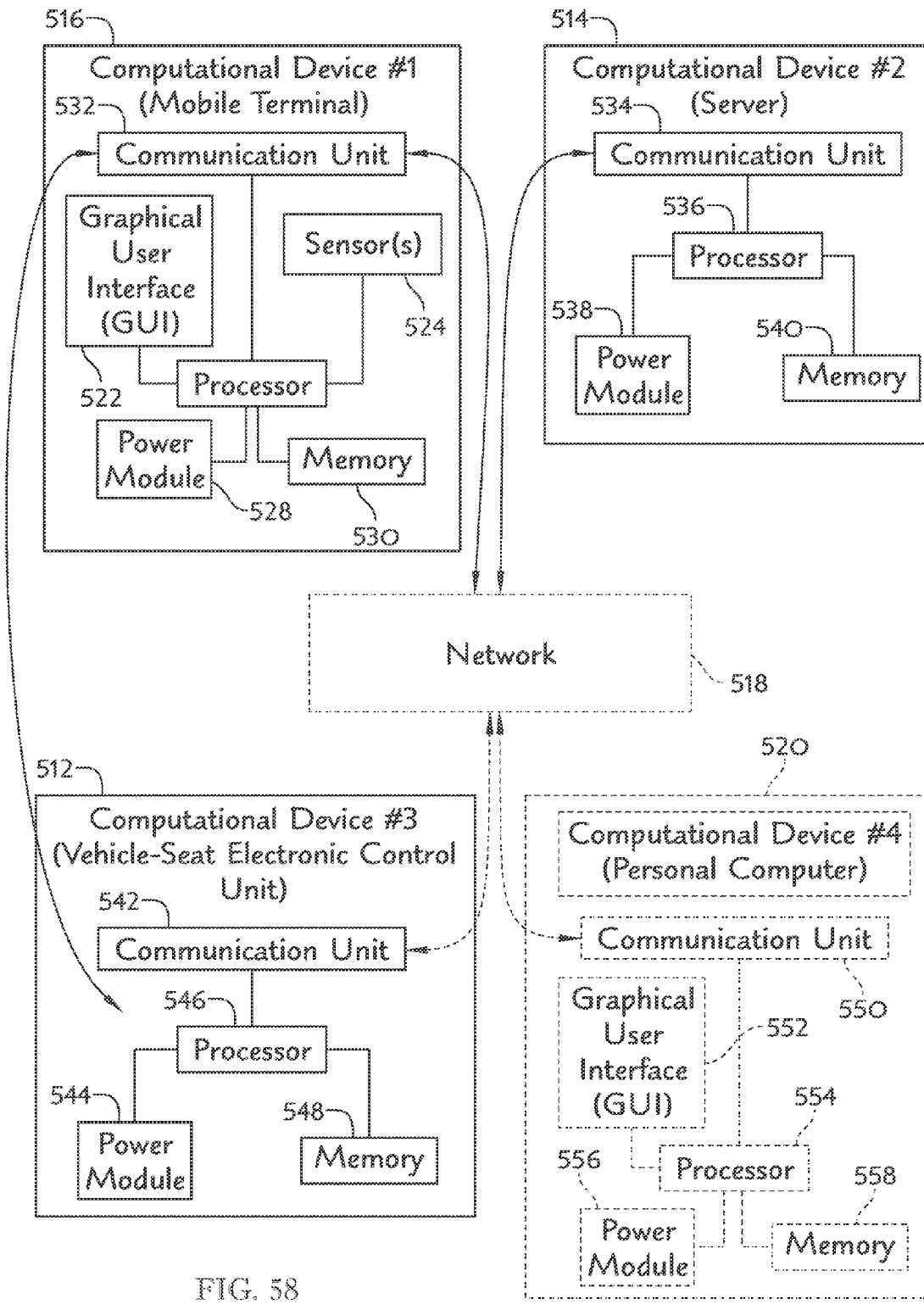
FIG. 58 is a diagrammatic view of another embodiment of an occupant-support system showing that the occupant-support system includes an illustrative mobile terminal, a server, a seat-movement system included in a vehicle seat, a personal computer and other equipment that may be used to provide communication between the equipment components.

As shown in FIG. 58 another embodiment of a configuration control system 510 may include a first computational device 516, a second computational device 514, a third computational device 512, a fourth computational device 520, and a network 518. First computational device 516 is illustratively a mobile terminal. Second computational device 514 may be illustratively a remote computer. Third computational device 512 may be illustratively a vehicle-seat electronic control unit. Fourth computational device 520 may be illustratively a personal computer. First, second, third, and fourth computational devices 512, 514, 516, 518 may communicate with one another through network 518.

First computational device 516 may include a graphical user interface 522, a sensor 524, a processor 526, a power module 528, a memory 530, and a communication unit 532 as shown in FIG. 58. Memory 530 could be implemented as discussed above. Power module 528 may be coupled to processor 526 to provide power thereto and to other components included in first computational device 516. Graphical user interface 522, sensor 524, and communication unit 532 may be coupled to processor 526 to provide data to processor 526 for processing according to instructions stored in memory 530. Additionally, data may also be stored in memory 530. Graphical user interface 522 and communication unit 532 may also coupled to processor 526 to communicate calculated results and/or data from processor 526 to a user or to other computational devices 514, 512, 520.

Second computational device 514 may include a processor 536, a power module 538, a memory 540, and a communication unit 534 as shown in FIG. 58. Memory 540 could be implemented as discussed above. Power module 538 may be coupled to processor 536 to provide power thereto and to other components included in second computational device 514. Communication unit 534 may be coupled to processor 536 to provide data from other computational devices 516, 512, 520 to processor 536 for processing according to instructions stored in memory 540. Additionally, data may also be stored in memory 540. The results of data calculated are communicated through communication unit 534.

Third computational device 512 may include a processor 546, a power module 544, a memory 548, and a communication unit 542 as shown in FIG. 58. Memory 548 could be implemented as discussed above. Power module 544 may be coupled to processor 546 to provide power thereto and to other components included in third computational device 512. Communication unit 542 may be coupled to processor 546 to send data between other computational devices 516, 514, 520 and processor 546 for processing according to instructions stored in memory 548. Additionally, data may also be stored in memory 548 for use at a later time.

Fourth computational device 520 may include a processor 554, a power module 556, a memory 558, a graphical user interface 552, and a communication unit 550 as shown in FIG. 58. Memory 558 could be implemented as discussed above. Power module 556 may be coupled to processor 554 to provide power thereto and to other components included in second computational device 520. Communication unit 550 may be coupled to processor 554 to send data between other computational devices 516, 514, 512 to processor 554 for processing according to instructions stored in memory 558. Additionally, data may also be stored in memory 558. Data may also be displayed or input via graphical user interface 552 for use by processor 554.

Configuration control system 510 may provide improved utility. First, a communication network and an intelligent vehicle seat facilitate multiple input and output methods for acquiring data about the occupant and modifying the arrangement of the vehicle seat. Second, each possible source of data and the intelligent vehicle seats may be configured as stand alone nodes on the communication network which facilitates simplified troubleshooting and communication across the network. Furthermore, interference with other equipment is minimized. Third, the user interface for inputting data and commands may be included in the vehicle, the mobile terminal, and the personal computer. As a result, convenience is maximized. Fourth, a communication network included in the vehicle provides the ability for intelligent equipment (e.g., front and rear vehicle seats), mobile terminals, and personal computers to communicate with one another and achieve an optimized arrangement of the entire vehicle cabin rather than just an optimized vehicle seat arrangement. Fifth, sensors included in the intelligent vehicle seats or vehicle cabin may provide feedback data to the remote server about changes in the occupant's anthropometric data and the occupant's comfort so that the best-fit seating solution may continually be updated.

An occupant-support system 600 in accordance with the present disclosure may include a configuration control system 602, a vehicle seat 604, and a pneumatic system 606 as shown diagrammatically in FIG. 60. Occupant-support system 600 may be configured to perform an occupant-support system fitting process 700 that provides an optimum-fit arrangement of occupant-support system 600.

Vehicle seat 604 may be mounted on a vehicle frame 610 included in a vehicle to move relative to vehicle frame 610. Vehicle seat 604 may include a seat bottom 626 coupled to vehicle frame 610 to slide back and forth relative to vehicle frame 610, a seat back 628 coupled to seat bottom 626 to pivot back and forth about a seat-back pivot axis 618 relative to seat bottom 626, and a seat-movement system 620 as shown in FIG. 60. Configuration control system 602 may provide instructions to seat-movement system 620 that causes seat-movement system 620 to move seat bottom 626 and seat back 628 to a best-fit arrangement associated with the occupant's anthropomorphic data.

Vehicle seat 604 may include additional functionality that includes height adjustment of vehicle seat 604, tilt of seat bottom 626, adjustment of upper back angle of seat back 628, adjustment of seat bottom length, movement of the headrest, etc. These various adjustments may be powered, manually operated, or a combination of powered and manual features. Further, such vehicle seat may include various types of climate control functionality including seat heating, active seat cooling, ventilation, and/or a full seat memory system.

Configuration control system 602 may include mobile terminal 16, remote computer 14, and communication unit 18. Mobile terminal 16 may include at least one software application that acquires the dimensions of an occupant using sensors included in mobile terminal 16, manual input of data, or a combination of the two. Occupant data may be used to model a best-fit arrangement that may be transferred to seat-movement system 620 via wired and/or wireless communication unit 18. As a result, seat-movement system 620 may move vehicle seat 604 to the best-fit arrangement associated with the occupant data collected previously.

Seat-movement system 620 may be able to move various portions of vehicle seat 504 because seat-movement system 620 illustratively includes a seat controller 640, a seat-back actuator 642, and a seat-bottom actuator 644 as shown diagrammatically in FIG. 60. Seat controller 640 may be a computer that may be in communication with seat-bottom actuator 644 and seat-back actuator 642. Seat-bottom actuator 644 may be an electric motor that provides force necessary to move seat bottom 626 back and forth on seat tracks 646. Seat-back actuator 642 may be an electric motor that provides force necessary to pivot seat back 628 back and forth relative to seat-back pivot axis 618.

Figure 63:
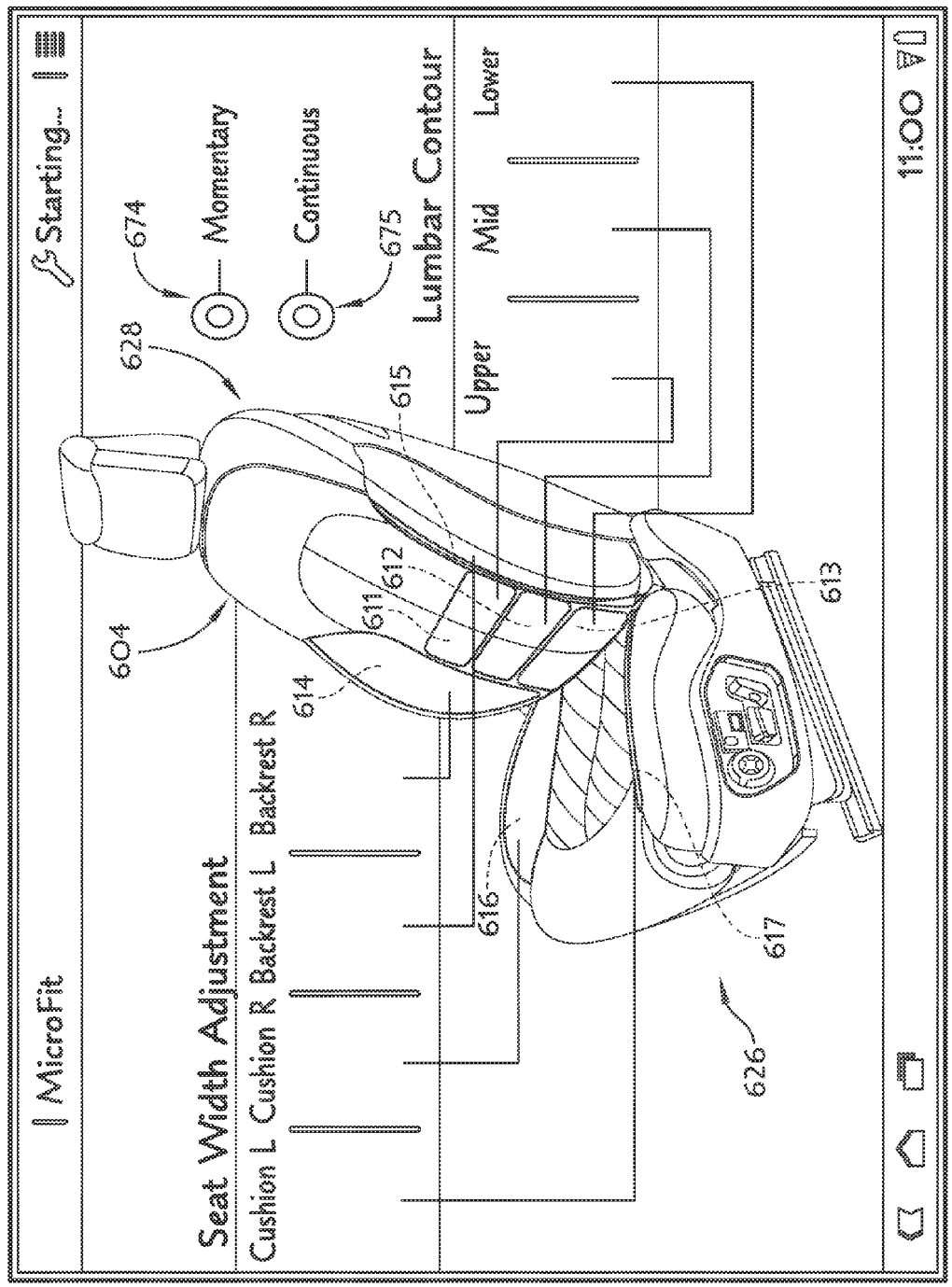

Pneumatic system 606 may include a pressurized air source 632, at least one pressure sensor 634, and at least one pneumatic bladder 611 as shown in FIGS. 60 and 63. As an illustrative example, pneumatic system 606 may include an upper lumbar bladder 611, a middle lumbar bladder 612, a lower lumbar bladder 613, a left seat-back wing bladder 614, a right seat-back wing bladder 615, a left seat-bottom wing bladder 616, and a right seat-bottom wing bladder 617. Each pneumatic bladder 611, 612, 613, 614, 615, 616, 617 may be coupled to pressurized air source 632 to receive pressurized air therein to inflate or to exhaust air to deflate each of the pneumatic bladders 611, 612, 613, 614, 615, 616, 617.

Each pneumatic bladder 611, 612, 613, 614, 615, 616, 617 may be further coupled to at least one pressure sensor 634 that may be configured to measure the air pressure in each pneumatic bladder 611, 612, 613, 614, 615, 616, 617 and communicate that pressure to seat-movement system 620. As a result, seat-movement system 620 may command pressurized air source 632 to inflate or deflate each pneumatic bladder 611, 612, 613, 614, 615, 616, 617 to cause the air pressure in each pneumatic bladder 611, 612, 613, 614, 615, 616, 617 to be in an acceptable pressure range as suggested in FIG. 65. As an example of use, pressure sensor 634 may sense a high pressure in middle lumbar bladder 612 and communicate the high pressure to seat-movement system 620 which in turn commands pressurized air source 632 to release air from middle lumbar bladder 612 causing the air pressure sensed in middle lumbar bladder 612 to decrease and be in the acceptable pressure range as suggested in FIG. 65.

As shown in FIG. 60, pneumatic system 606 may include pressurized air source 632, a bladder system including a plurality of pneumatic bladders 611, 612, 61N, a manifold 636 including separate valves associated with each bladder 611, 612, 61N, a pressure sensor 634, and an air-tubing system 638. Air-tubing system 638 may be configured to interconnect manifold 636 to associated air bladders 611, 612, 61N so that a common line from pressurized air source 632 may be used to supply manifold 636 with pressurized air. Air-tubing system 638 may be further configured to interconnect pressure sensor 634 to the common line so that the pressure in each bladder 611, 612, 61N may be sensed using only one pressure sensor by opening one valve and closing the other remaining valves, thereby sensing the pressure in each bladder 611, 612, 61N one at a time.

As a result of only one pressure sensor being used, the control of the air pressure in each bladder 611, 612, 61N may be handled in a serial manner. As an example, the air pressure in first bladder 611 may be sensed by pressure sensor 634. The pressure signal may then be communicated to seat-movement system 620 and seat-movement system 620 commands pressurized air source 632 to inflate, deflate, or maintain first pneumatic bladder 611 as required. Seat-movement system 620 may then command a first valve included in manifold 636 and associated with first bladder 611 to close and a second valve associated with second bladder 612 to open. The pressure in second bladder 612 may then sensed by pressure sensor 634. The pressure signal associated with second bladder 612 may then communicated to seat-movement system 620 wherein seat-movement system 620 takes action to maintain second bladder 612 in the acceptable range. As shown by the example, all additional bladders must be cycled in series before seat-movement system 620 is updated with the air pressure in first bladder 611.

Occupant-support system fitting process 700 may include acquiring data 702, calculating body arrangements 704, calculating seat solution 706, adjusting vehicle seat 708, and adjusting pneumatic system 710 as shown in FIG. 59. As discuss previously, acquiring data 702, calculating body arrangement 704, calculating seat solution 706, and adjusting vehicle seat 708 may operate to arrange vehicle seat 604 in a best-fit arrangement of vehicle seat 604 so that occupant's body is supported on vehicle seat 604 is positioned in a best-fit body arrangement. Adjusting pneumatic system 710 may fit vehicle seat 604 to the occupant using pneumatic bladders 611, 612, 613, 614, 615, 616, 617 so that an optimum-fit arrangement of occupant-support system 600 is established.

Figure 61:
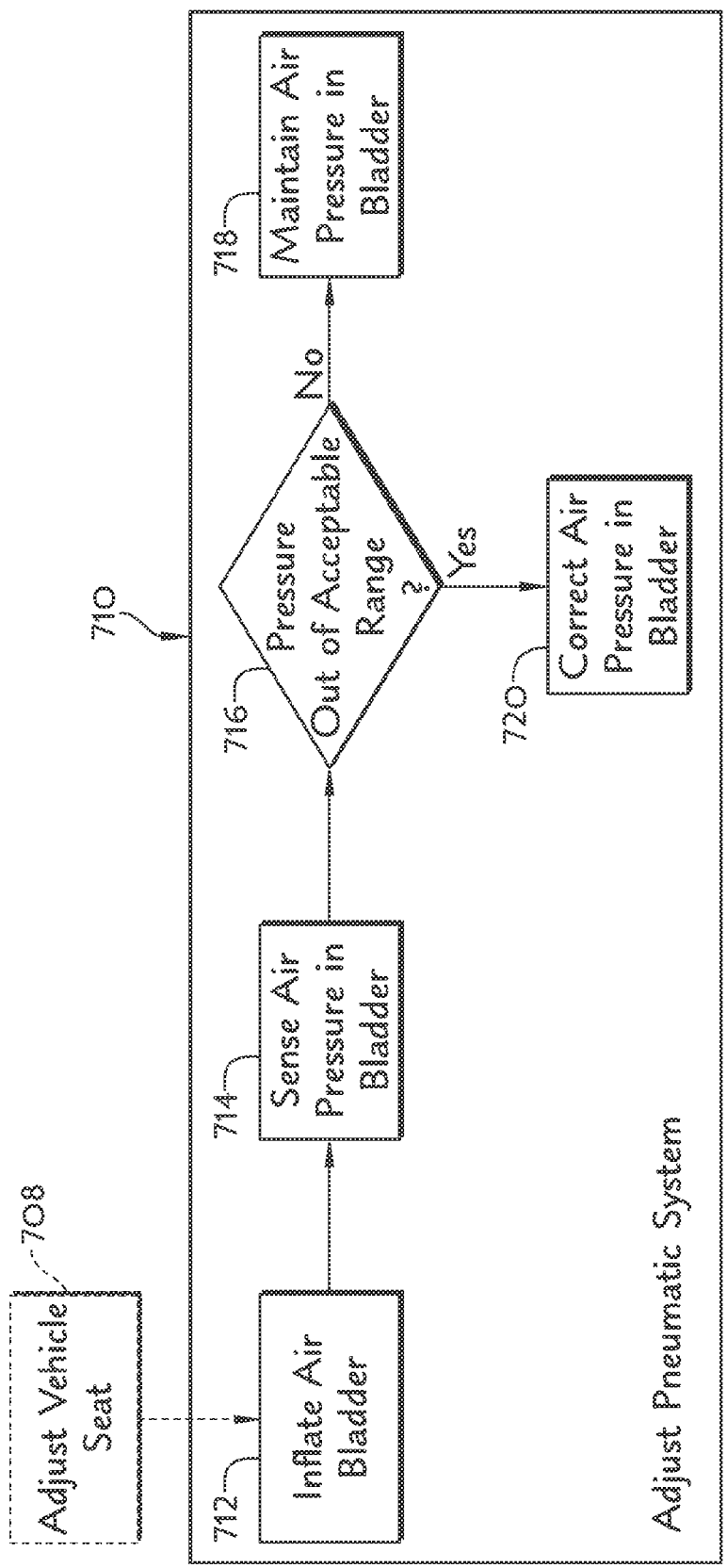

Adjusting pneumatic system 710 may include inflating air bladders 712, sensing air pressure in bladders 714, determining if pressure is out of an acceptable range 716, maintaining air pressure in the bladders 718 if the air pressure is in the acceptable range, and correcting air pressure in the bladders 720 if the air pressure is out of the acceptable range as shown in FIG. 61. Once the air pressure in the bladders has been maintained or corrected, the air pressure in the bladders may be sensed again as suggested in by phantom lines in FIG. 61.

Figure 62:
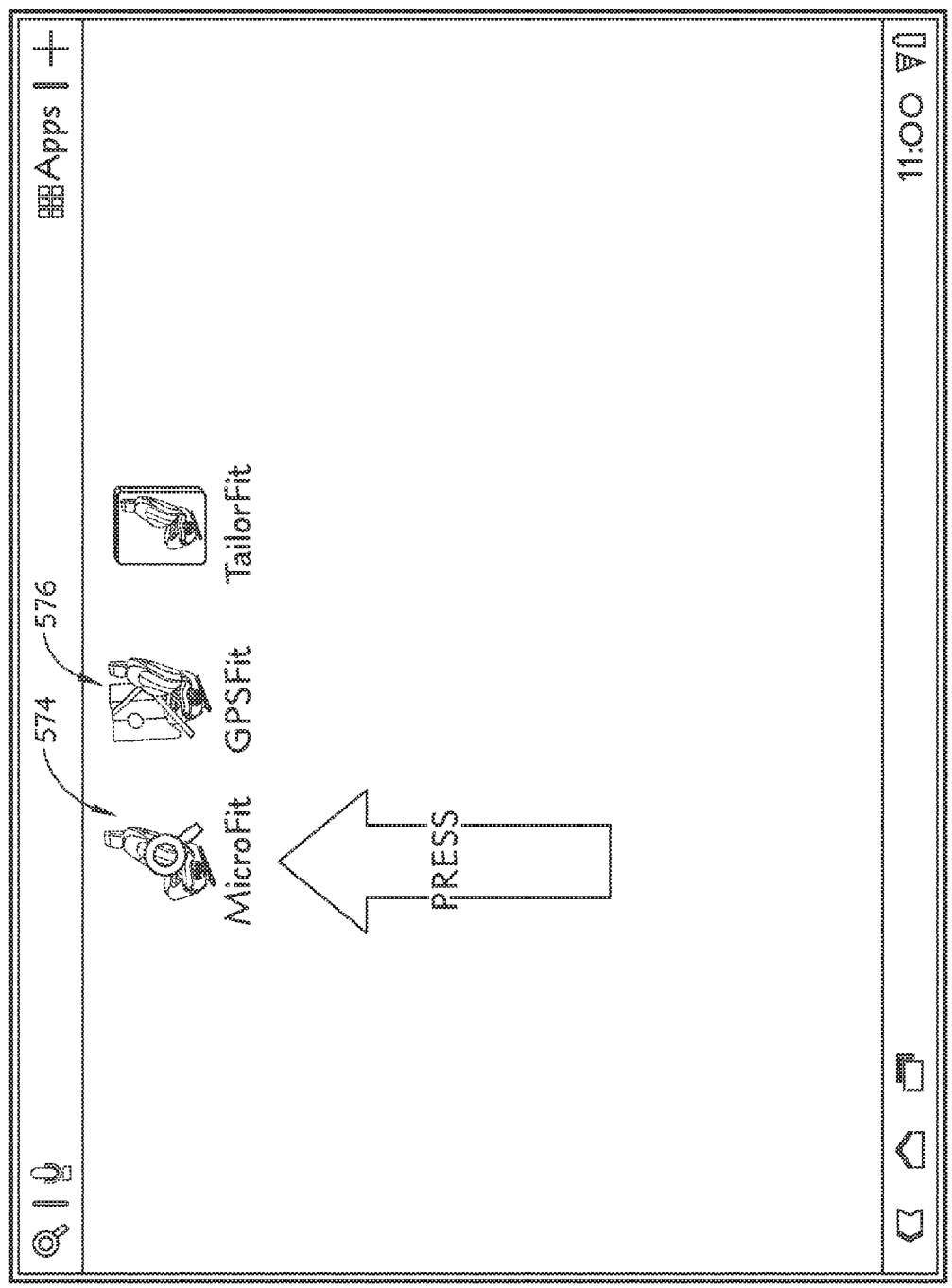
Figure 64:
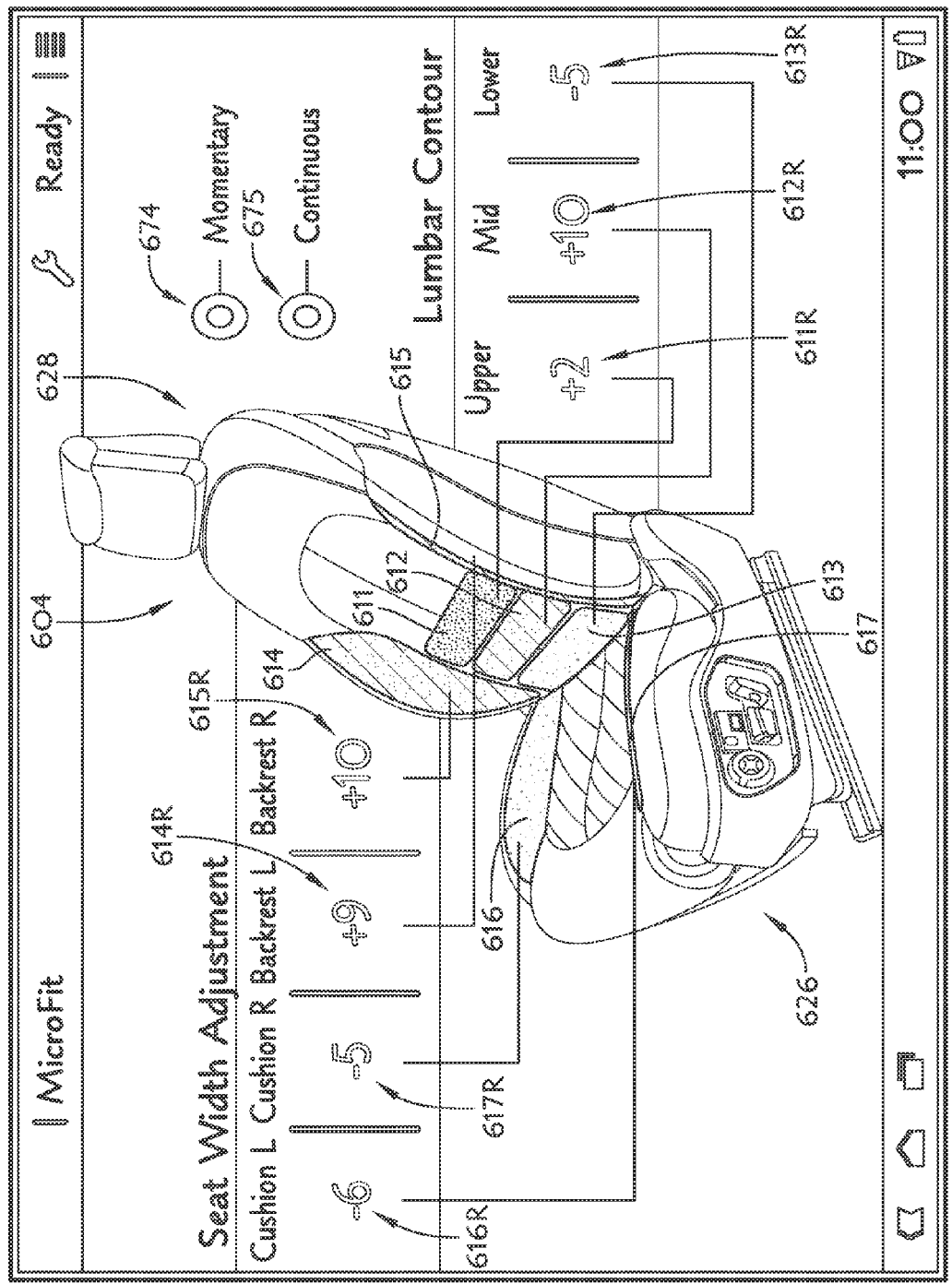

As an example, a user accesses and uses occupant-support system fitting process 700 by accessing a MicroFit application 574 stored in memory included in mobile terminal 16 as shown in FIG. 62. After MicroFit application 574 has been launched, Graphical User Interface (GUI) may show that a user may select either a momentary mode 674 or a continuous mode 675 of operation as shown in FIGS. 63 and 64. Momentary mode 674 of operation may cause adjusting of pneumatic system 710 to be executed once by seat-movement system 620. Continuous mode 675 of operation may cause adjusting of pneumatic system 710 to be executed continuously at predetermined intervals by seat-movement system 620.

In an example of momentary mode 674, during adjusting of pneumatic system 710, sensing air pressure in bladders 714 may determine an initial pressure in each pneumatic bladder 611, 612, 613, 614, 615, 616, 617. Air pressure in bladders 611, 612, 613, 614, 615, 616, 617 may be maintained or adjusted as needed.

As an example, sensing air pressure in bladders 714 may display a relative pressure differential for each pneumatic bladder 611, 612, 613, 614, 615, 616, 617 as shown in FIG. 64. A first output 611R associated with upper lumbar bladder 611 may show a pressure differential of +2 which is in the acceptable pressure range. A second output 612R associated with middle lumbar bladder 612 may show a pressure differential of +10 which is above the acceptable pressure range. A third output 613R associated with lower lumbar bladder 613 may show a pressure differential of −5 which is below the acceptable pressure range. A fourth output 614R associated with left seat-back wing bladder 614 may show a pressure differential of +9 which is above the acceptable pressure range. A fifth output 615R associated with right seat-back wing bladder 615 may show a pressure differential of +10 which is above the acceptable pressure range. A sixth output 616R associated with left seat-bottom wing bladder 616 may show a pressure differential of −6 which less than the acceptable pressure range. A seventh output 617R associated with the right seat-bottom wing bladder 617 may show a pressure differential of −5 which is below the acceptable pressure range.

Figure 65:
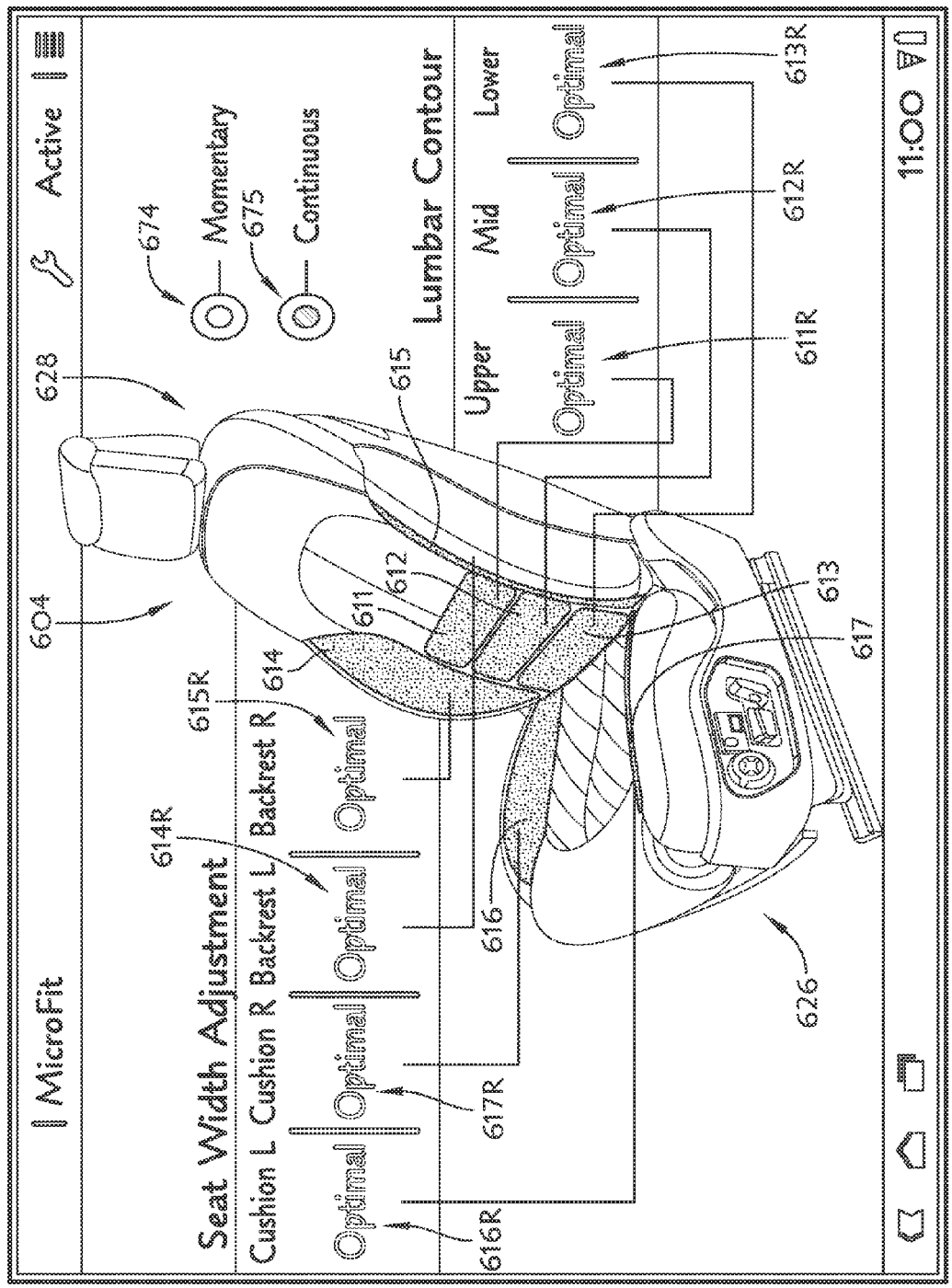

These pressure signals may then be communicated to seat-movement system 620 which in turn commands pressurized air source 632 to adjust those pressure differentials outside of the acceptable pressure range to be within the acceptable pressure range. As an example, pressurized air source 632 may lower the air pressure in middle lumbar bladder 612 and in seat-back wing bladders 614, 615 so that the pressure differential returns to the acceptable range as shown in FIG. 65. Pressurized air source 632 may also increase the air pressure in lower lumbar bladder 613 and seat-bottom wing bladders 616, 617 so that the pressure differential returns to the acceptable range. At the same time, pressurized air source 632 may maintain the air pressure in upper lumbar bladder 611 as it is already in the acceptable range.

In an example of the continuous mode, during adjusting of pneumatic system 710, sensing air pressure in bladders 714 may determine an initial pressure in each pneumatic bladder 611, 612, 613, 614, 615, 616, 617. Air pressure in bladders 611, 612, 613, 614, 615, 616, 617 may be maintained or adjusted as needed. Adjusting of pneumatic system 710 may then keep performing adjusting of pneumatic system 710 at a predetermined interval so that all bladders remain in the acceptable pressure range.

Figure 66:
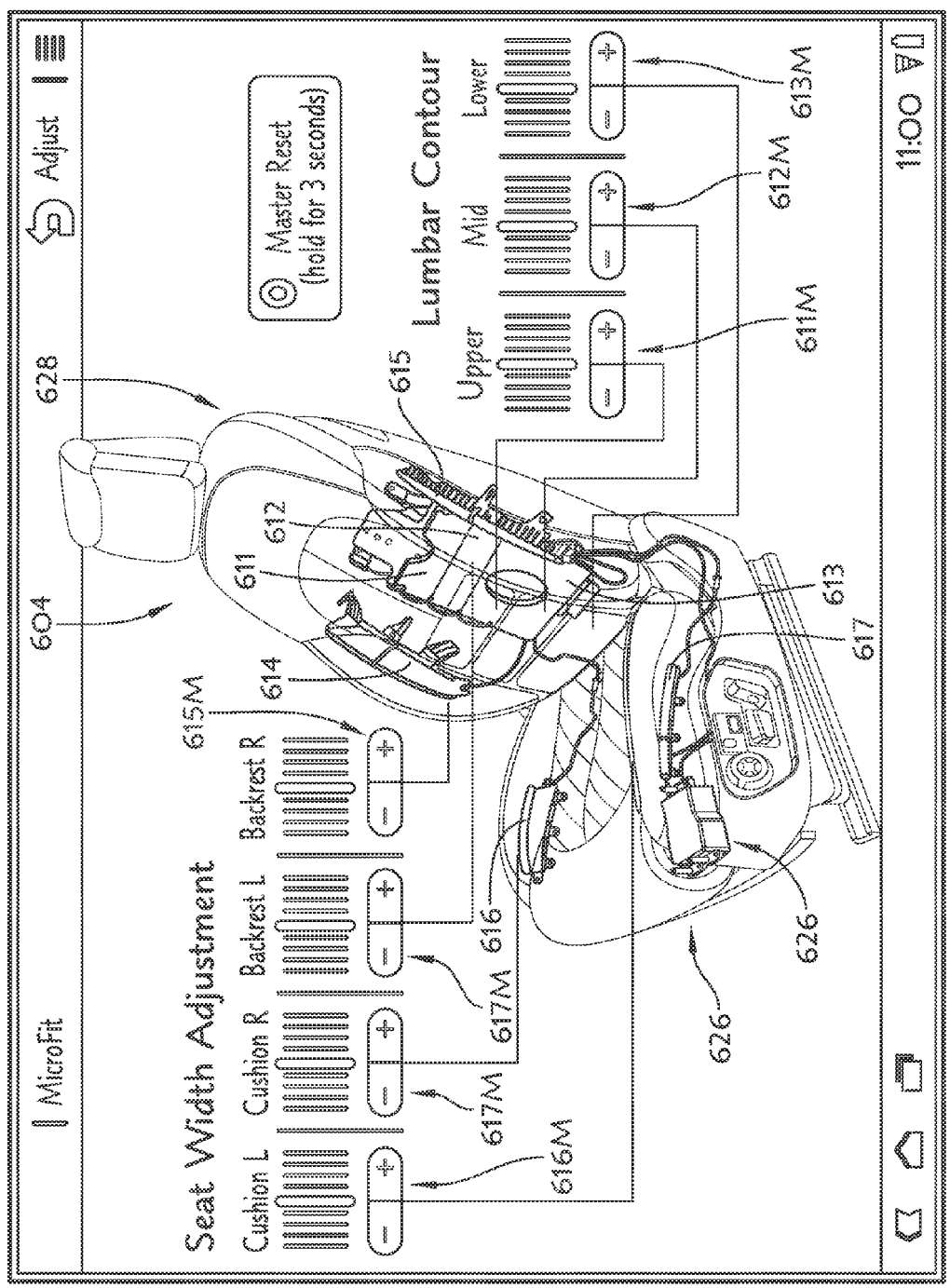

MicroFit application 574 may also include a manual mode in which the user can adjust the air pressure of each pneumatic bladder 611, 612, 613, 614, 615, 616, 617 and override the pre-defined acceptable pressure range as suggested in FIG. 66. As an example, the user may desire a lower pressure in the upper lumbar bladder 611, a higher pressure in the middle lumbar bladder 612, and the default acceptable pressure in the lower lumbar bladder 613. The user may adjust manually the air pressure in each pneumatic bladder 611, 612, 613, 614, 615, 616, 617 by using associated controls 611M, 612M, 613M, 614M, 615M, 616M, and 617M as shown in FIG. 66.

In one illustrative embodiment, a pneumatic system 806 may include pressurized air source 832, a plurality of air bladders 811, 812, 81N, a manifold 836 including separate valves associated with each bladder 811, 812, 81N, a plurality of pressure sensors 834, 835, 83N, and an air-tubing system 838 arranged to interconnect each bladder 811, 812, 81N, pressurized air source 832, and each pressure sensor 834, 835, 83N. Each bladder 811, 812, 81N may be coupled to pressurized air source 832 by a tube included in air-tubing system 838 so that each bladder 811, 812, 81N can be inflated and deflated separately. Each pressure sensor 834, 835, 83N may be coupled to a separate bladder 811, 812, 81N by a tube so that the air pressure in each bladder 811, 812, 81N can be monitored at the same time. Continuous pressure signals from separate pressure sensors 834, 835, 83N may be sent to seat-movement system 620 causing seat-movement system 620 to continuously command pressurized air source 832 to continuously maintain the air pressure in each bladder 811, 812, 81N in the acceptable range. As a result of having separate pressure sensors 834, 835, 83N for each bladder 811, 812, 81N, the control of the air pressure in each bladder 811, 812, 81N may be handled in a parallel manner.

Another embodiment of an occupant-support system 1000 may include configuration control system 602, vehicle seat 604, pneumatic system 606, and a prediction system 1002 as shown diagrammatically in FIG. 69. Occupant-support system 1000 may be configured to perform occupant-support system predicted fitting process 900 that that includes arranging vehicle seat 604 in an initial best-fit arrangement using configuration control system 602, calculating a predicted future position of a vehicle using prediction system 1002, and configuring both the position of vehicle seat 604 and pneumatic system 606 to cause the occupant to be supported appropriately when the vehicle moves through the predicted future position.

Prediction system 1002 may include a Global Positioning Satellite (GPS) unit 1004 and a mapping unit 1006. As an example, GPS unit 1004 may be coupled to communicate with mapping unit 1006 and configured to determine a real-time position of the vehicle relative to earth and a real-time speed of the vehicle. GPS unit 1004 may transmit the real-time position and speed to mapping unit 1006. Mapping unit 1006 may use the real-time position and speed to calculate a predicted future position and speed of the vehicle using map data stored in memory included in mapping unit 1006. Mapping unit 1006 may be further coupled to communicate with seat-movement system 620 to send corresponding predicted future-position data and predicted future-speed data to seat-movement system 620 to cause vehicle seat 604 and pneumatic system 606 to be adjusted so that vehicle seat 604 and pneumatic system 606 may be in an optimum-fit arrangement appropriate for the predicted future position and speed.

In some embodiments, seat controller 640 of seat-movement system 620 may communicate with configuration control system 602 during the operations of staging occupant-support system 912 included in occupant-support system predicted fitting process 900. As an example, prediction system 1002 may communicate a predicted future position and/or predicted future-position data to seat controller 640 that requires movement of seat bottom 626 forward relative to vehicle frame 610 which may cause an occupant's head to contact a roof of the vehicle. As a result, seat controller 640 may request a new best-fit arrangement for vehicle seat 604 that takes into account the desired change in the seat bottom location. In this scenario, staging-occupant support system 912 may further include a reconfiguring operation in which seat controller 640 sends revised vehicle data via communication unit 18 to remote computer 14 so that a revised optimum-fit arrangement may be determined and sent back to seat controller 640 by way of communication unit 18.

As shown in FIG. 68, occupant-support system predicted fitting process 900 illustratively includes acquiring data 902, calculating a body arrangement 904, calculating a seat solution 906, adjusting a vehicle seat 908, adjusting a pneumatic system 910, and staging occupant-support system 912 as shown in FIG. 68. As discussed previously, acquiring data 902, calculating body arrangement 904, calculating seat solution 906, adjusting vehicle seat 908, and adjusting pneumatic system 910 may operate to arrange vehicle seat 604 in an optimum-fit arrangement of vehicle seat 604 that arranges an occupant's body in a best-fit body arrangement while minimizing an interface pressure between the occupant and vehicle seat 604. Staging occupant-support system 912 may arrange vehicle seat 604 and pneumatic system 606 so that the occupant is supported as the vehicle passes through a future position at a future speed.

Staging occupant-support system 912 may include the operations of determining actual vehicle position 914, determining actual vehicle speed 916, calculating predicted future position of the vehicle 918, calculating predicted future speed of the vehicle 920, calculating predicted seat solution 922, adjusting vehicle seat 924, adjusting pneumatic system 926, and establishing optimum-fit arrangement 928 of occupant-support system 1000. As an example, a user may access and use occupant-support system predicted fitting 900 by accessing a GPSFit application 576 stored in memory that may be included in mobile terminal 16. After GPSFit application 576 has been launched, the GUI may show an initial arrangement of vehicle seat 604, pneumatic system 606, and a map 1048 showing the location of vehicle 1001 and surrounding roads and terrain. Activating GPSFit application 576 may cause occupant-support system predicted fitting 900 to start the staging occupant-support system process 912.

Prediction system 1002 may include a data receiver 1008 that may be configured to obtain weather data and/or traffic data as suggested in FIG. 69. Data receiver 1008 may be coupled to seat-movement system 620 to provide the weather and/or traffic data to seat-movement system 620 to cause movement of vehicle seat 604 and pneumatic system 606 to be altered so that the occupant sitting in vehicle seat 604 may be positioned to respond appropriately for weather and traffic conditions associated with the weather and traffic data.

Figure 71:
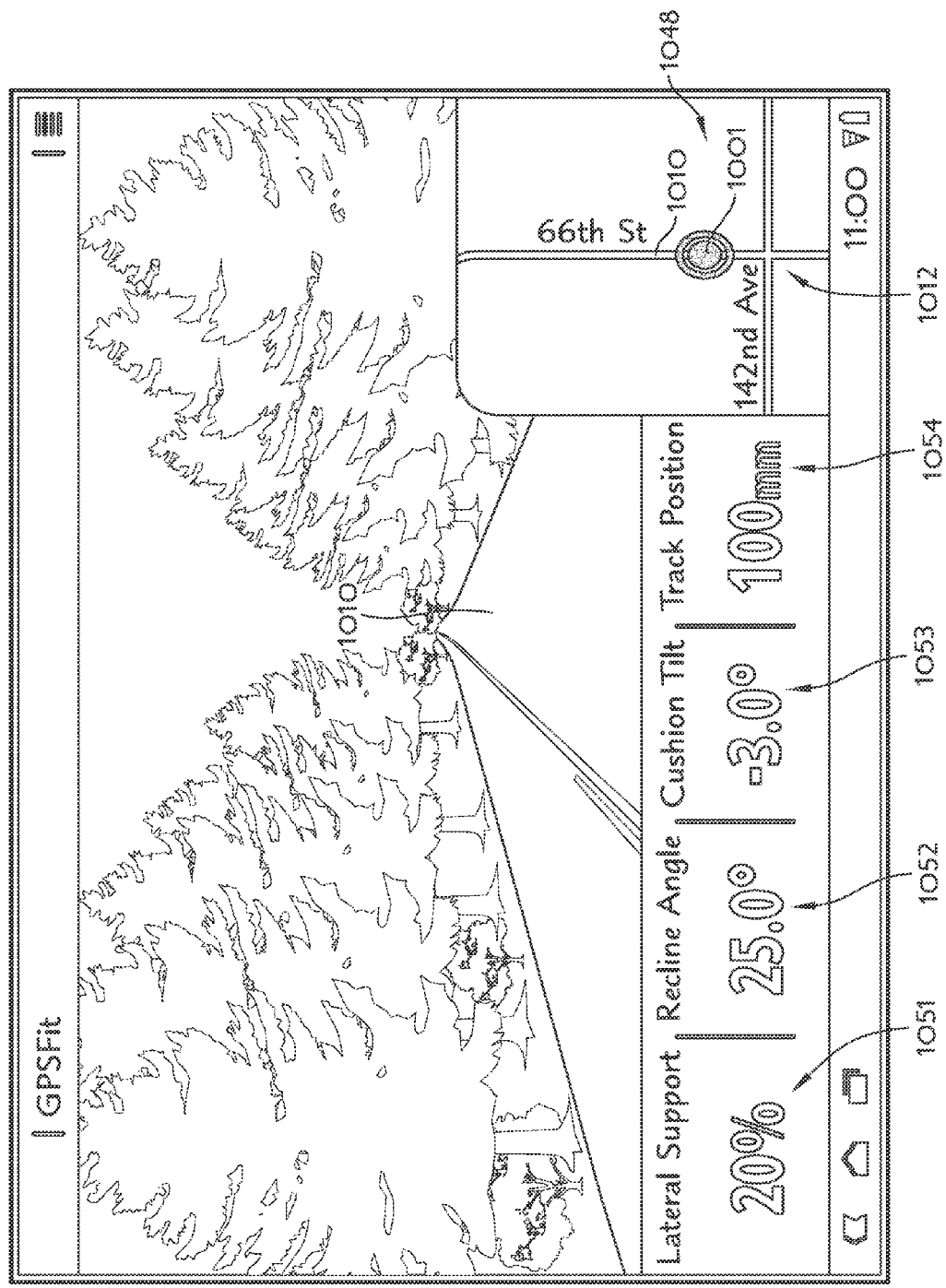

In an example of use, the user has activated the GPSFit application causing the occupant-support system predicted fitting 900 to begin. As shown in FIG. 71, vehicle 1001 may be traveling along a relatively straight section 1010 of a road 1012. Staging occupant-support system 912 begins with vehicle seat 604 and pneumatic system in an initial optimum-fit arrangement that is suitable for typical driving conditions. As an example, a lateral-support output 1051 indicates that lateral support begins at 20%, a recline-angle output 1052 indicates that recline angle is at 25 degrees, a cushion-tilt output 1053 indicates that cushion tilt is at −3 degrees, and a track-position output 1054 indicates that track position is at 100 mm as shown in FIG. 71.

Figure 72:
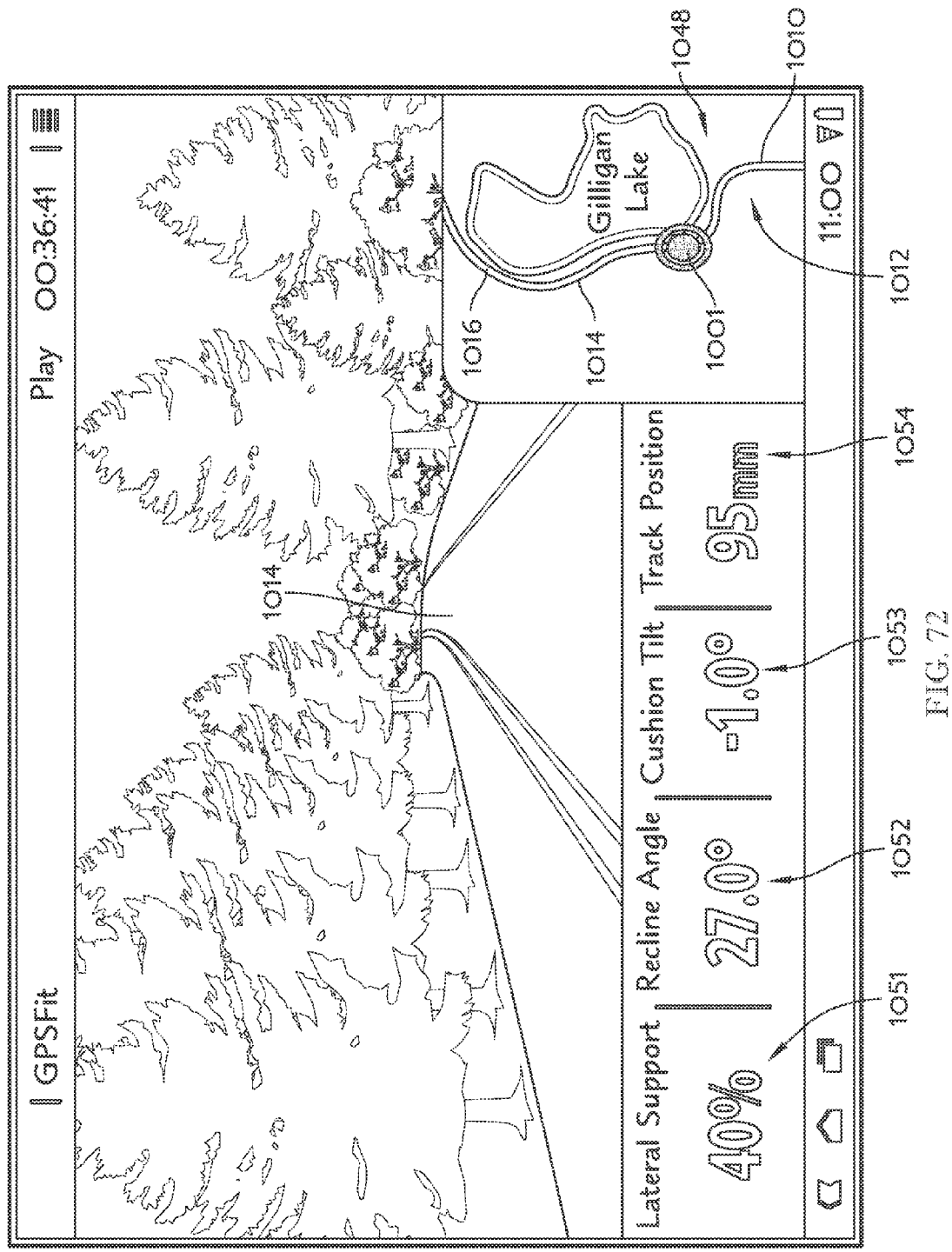

Staging occupant-support system 912 may calculate predicted future position and speed 918, 920 in which GPS unit 1004 and mapping unit 1006 look ahead and calculate that vehicle 1001 will be in a wavy portion 1014 of road 1012 as shown in FIG. 72. Prediction system 1002 may provide a predicted future position and speed to seat-movement system 620 causing vehicle seat 604 to move its track position from 100 mm to 95 mm as indicated by track-position output 1054, seat bottom 626 to increase cushion tilt from −3.0 degrees to −1.0 degrees as indicated by cushion-tilt output 1053, and seat back 628 to increase the recline angle from 25 degrees to 27 degrees as indicated by recline-angle output 1052, and simultaneously increasing lateral support from 20% to 40% as indicated by lateral-support output 1051 as shown in FIG. 72. While vehicle 1001 may be in wavy portion 1014, prediction system 1002 provides a new predicted future position and speed.

Figure 73:
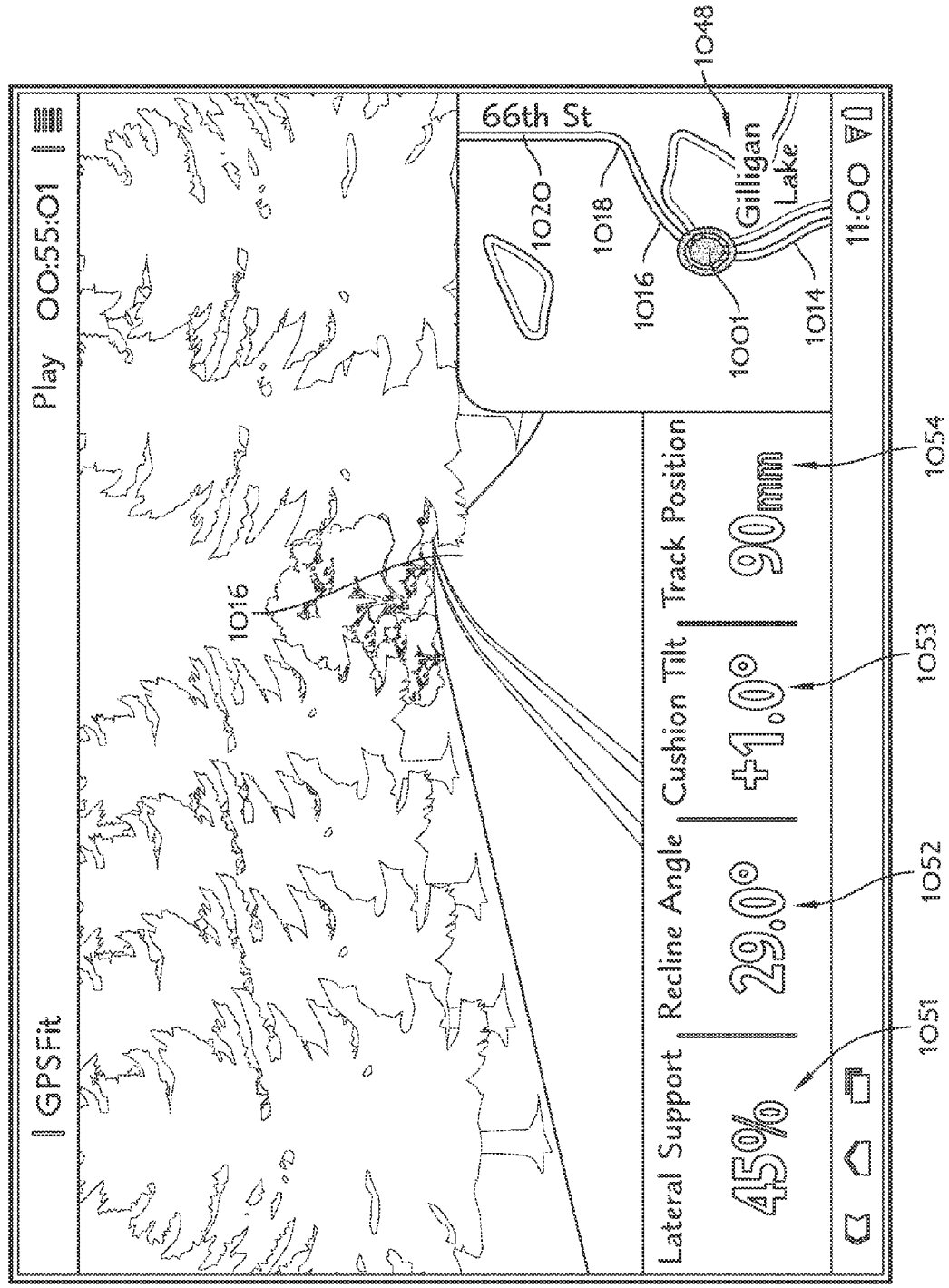

The new predicted future position and speed may be associated with a large right-hand curve 1016 as shown in FIG. 73. Prediction system 1002 may then send the third new future position and speed to seat-movement system 620 to cause vehicle seat 604 to move its track position from 95 mm to 90 mm as indicated by track-position output 1054, seat bottom 626 to increase cushion tilt from −1.0 degrees to +1.0 degrees as indicated by cushion-tilt output 1053, and seat back 6 to increase the recline angle from 27 degrees to 29 degrees as indicated by recline-angle output 1052 and simultaneously increasing lateral support from 40% to 45% as indicated by lateral-support output 1051 as shown in FIG. 73.

Figure 74:
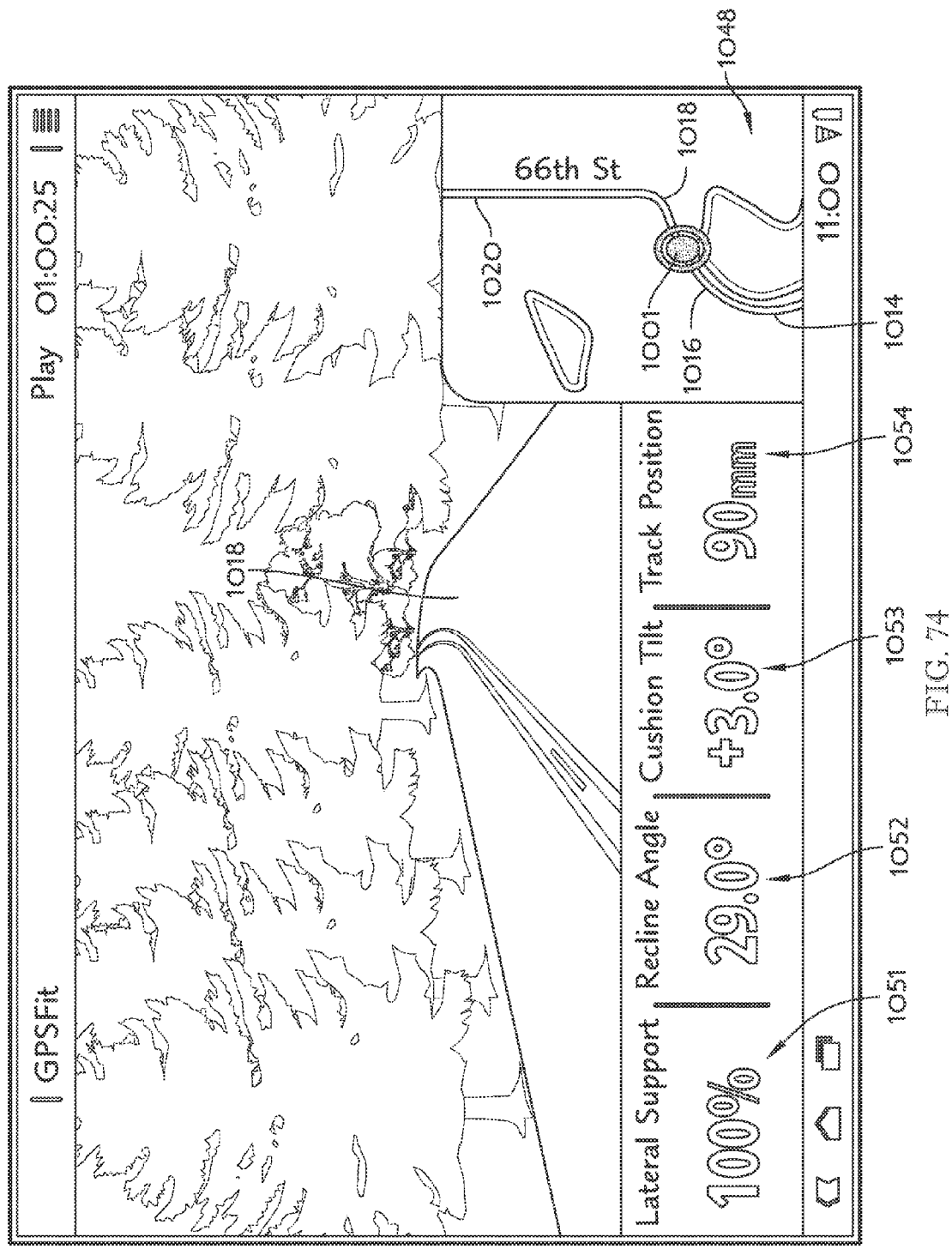

Prediction system 1002 may then calculate another new predicted future position and speed that may be associated with another left-hand turn 1018 in road 1012 as shown in FIG. 74. Prediction system 1002 may then send the newest predicted future position to seat-movement system 620 that causes vehicle seat 604 to maintain the track position at 90 mm as indicated by track-position output 1054, seat bottom 626 to increase cushion tilt from +1.0 degrees to +3.0 degrees as indicated by cushion-tilt output 1053, and seat back 628 to maintain the recline angle at 29 degrees as indicated by recline-angle output 1052, and simultaneously increasing lateral support from 45% to 100% as indicated by lateral-support output 1051 as shown in FIG. 74.

Figure 75:
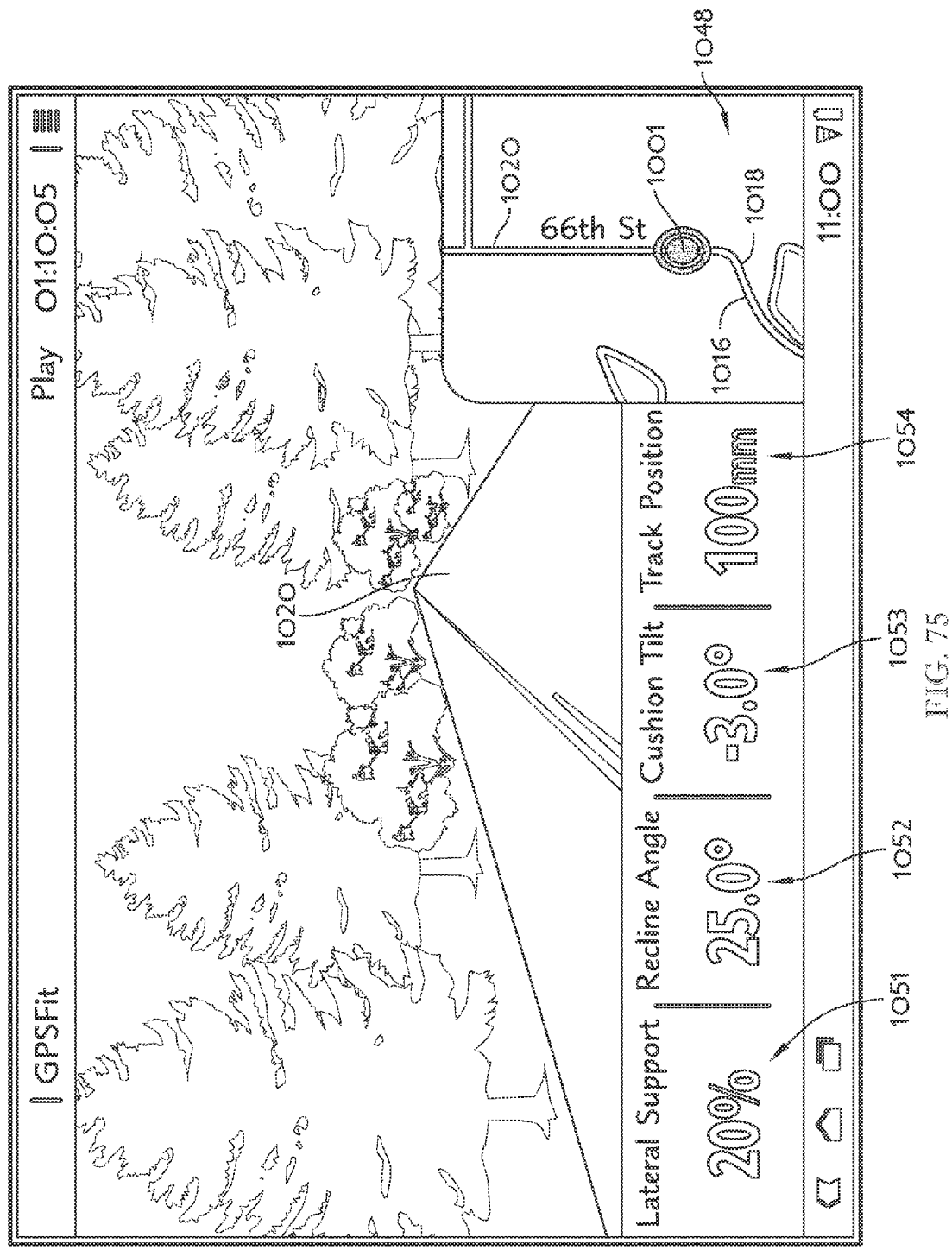

Finally, prediction system 1002 may calculate yet another new predicted future position and speed that may be associated with another straight portion 1020 in road 1012 as shown in FIG. 75. The newest predicted future position and speed may then be sent to seat-movement system 620 to cause vehicle seat 604 to move its track position from 90 mm to 100 mm as indicated by track-position output 1054, seat bottom 626 to decrease cushion tilt from +3.0 degrees to −3.0 degrees as indicated by cushion-tilt output 1053, and seat back 628 to decrease the recline angle from 29 degrees to 25 degrees as indicated by recline-angle output 1052, and simultaneously decreasing lateral support from 100% to 20% as indicated by lateral-support output 1051 as shown in FIG. 75. As vehicle 1001 remains on second straight portion 1020, seat-movement system 620 may maintain the configuration of vehicle seat 604 and pneumatic system 606 as shown in FIG. 75.

Prediction system 1002 may also cause vehicle data to be updated by seat controller 640. Prediction system 1002 may provide additional limitations to movement of vehicles eat 604 as a result of mapping unit 1006 of prediction system 1002 providing a predicted future position and speed to seat controller 640 that arranges the occupant's eyes at a specific location relative to the vehicle frame or windshield. As an example, traffic or weather data may suggest that the occupant have improved visibility requiring that the occupant's eyes be at a higher elevation thus improving visibility. As a result, a different set of adjustment instructions may be needed as a revised best-fit arrangement of vehicle seat 604 thus causing calculating body arrangement 904, calculating seat solution 906, and adjusting vehicle seat 908 to be re-initiated using the updated vehicle data.

Occupant-support systems 400, 600, 800, 1000 provide improved utility. First, communication unit 18 and vehicle seats 402, 404, 604 facilitate further customized seating fit to the occupant based on data provided by one or more sensors within the occupant's vehicle seat and/or vehicle. This customized seating fit can be provided optionally on a continuous basis. Second, the data used to customize the occupant's seating fit may be generated using professional personnel's manual measurement of the occupant's dimensions and inputting of that data into a customized computer application on behalf of the occupant, thereby improving ease of implementation. Third, Occupant-support systems 400, 600, 800, 1000 can compensate for sensed and/or predicted future physical conditions based on GPS detection of the location of the occupant's vehicle and mapping to vehicle road configurations and/or conditions so as to target the occupant's seating experience to compensate for predicted vehicle handling and speed.

The description of specific embodiments is not intended to be limiting of the present disclosure. To the contrary, those skilled in the art should appreciate that there are numerous variations and equivalents that may be employed without departing from the scope of the present disclosure. Those equivalents and variations are intended to be encompassed by the present disclosure.

In the following description of various present disclosure embodiments, reference is made to the accompanying drawings, which form a part hereof, and in which is shown, by way of illustration, various embodiments in which the present disclosure may be practiced. It is to be understood that other embodiments may be used and structural and functional modifications may be made without departing from the scope and spirit of the present disclosure.

Moreover, it should be understood that various connections are set forth between elements in the following description; however, these connections in general, and, unless otherwise specified, may be either direct or indirect, either permanent or transitory, and either dedicated or shared, and that this specification is not intended to be limiting in this respect.

While this present disclosure has been described in conjunction with the specific embodiments outlined above, it is evident that many alternatives, modifications and variations will be apparent to those skilled in the art. Accordingly, the various embodiments of the present disclosure, as set forth above, are intended to be illustrative, not limiting. Various changes may be made without departing from the spirit and scope of the present disclosure.

Additionally, it should be understood that the functionality described in connection with various described components of various present disclosure embodiments may be combined or separated from one another in such a way that the architecture of the present disclosure is somewhat different than what is expressly disclosed herein. Moreover, it should be understood that, unless otherwise specified, there is no essential requirement that methodology operations be performed in the illustrated order; therefore, one of ordinary skill in the art would recognize that some operations may be performed in one or more alternative order and/or simultaneously.

Further, it should be understood that, in accordance with at least one embodiment of the present disclosure, system components may be implemented together or separately and there may be one or more of any or all of the disclosed system components. Further, system components may be either dedicated systems or such functionality may be implemented as virtual systems implemented on general purpose equipment via software implementations.

Although the utility of various present disclosure embodiments has been described in connection with the distribution of promotional content, it should be understood that distributed information is not limited to promotional content but may also or alternatively include non-promotional material.

As a result, it will be apparent for those skilled in the art that the illustrative embodiments described are only examples and that various modifications can be made within the scope of the present disclosure as defined in the appended claims.

The invention claimed is:

1. An occupant support system comprising
a vehicle seat including a seat bottom mounted to a vehicle frame included in a vehicle for movement relative to the vehicle frame, a seat back coupled to the seat bottom to pivot about a seat-back pivot axis relative to the seat bottom, and a seat-movement system coupled to the seat back and seat bottom to control movement of the seat back and seat bottom and
a configuration control system configured to receive an input including occupant data associated with an occupant and a computer configured to receive the occupant data, calculate external body dimensions using the occupant data, calculate internal body dimensions using at least the external body dimensions, and calculate a first body arrangement of the occupant using the internal body dimensions and predetermined criteria,
wherein the seat-movement system is configured to move the vehicle seat to the first body arrangement.

2. The occupant support system of claim 1, wherein the input is provided by a sensor.

3. The occupant support system of claim 1, wherein the input is provided by a user interface.

4. The occupant support system of claim 1, wherein the configuration control system is further configured to receive an input including vehicle-seat configuration data associated with a configuration of the vehicle seat relative to the vehicle frame.

5. The occupant support system of claim 1, wherein the configuration control system is further configured to receive an input including vehicle data associated with the vehicle.

6. The occupant support system of claim 5, wherein the computer is further configured to calculate a second body arrangement of the occupant using the predetermined criteria and the vehicle data and the seat-movement system is configured to move the vehicle seat to the second body arrangement.

7. The occupant support system of claim 6, wherein the configuration control system is further configured to receive an input including vehicle-seat configuration data associated with a configuration of the vehicle seat relative to the vehicle frame and the computer is further configured to limit movement of the vehicle seat relative to the vehicle frame using the vehicle data, the vehicle-seat configuration data, and predetermined criteria.

8. The occupant support system of claim 7, wherein the configuration control system is further configured to receive an input including environmental data associated with an environment surrounding the vehicle and the computer is further configured to limit movement of the vehicle seat relative to the vehicle frame using the vehicle data, the vehicle-seat configuration data, predetermined criteria, and the environmental data.

9. The occupant support system of claim 8, wherein the environmental data includes at least one of weather data and traffic data.

10. The occupant support system of claim 1, wherein the configuration control system is further configured to receive an input from a user interface including a manual adjustment of the seat-movement system and the computer is configured to calculate a second body arrangement using the manual adjustment, predetermined criteria, and the first body arrangement and the seat-movement system is configured to move the vehicle seat to the second body arrangement.

11. The occupant support system of claim 10, wherein the configuration control system is further configured to receive an input including vehicle-seat configuration data associated with a configuration of the vehicle seat relative to the vehicle frame and the computer is further configured to limit movement of the vehicle seat relative to the vehicle frame using the vehicle-seat configuration data and predetermined criteria.

12. The occupant support system of claim 11, wherein the configuration control system is further configured to receive an input including environmental data associated with an environment surrounding the vehicle and the computer is further configured to limit movement of the vehicle seat relative to the vehicle frame using the vehicle data, the vehicle-seat configuration data, predetermined criteria, and the environmental data.

13. An occupant support system comprising
a vehicle seat including a seat bottom mounted to a vehicle frame included in a vehicle for movement relative to the vehicle frame, a seat back coupled to the seat bottom to pivot about a seat-back pivot axis relative to the seat bottom, and a seat-movement system coupled to the seat back and seat bottom to control movement of the seat back and seat bottom and
a configuration control system including a sensor configured to obtain biometric data associated with an occupant and a computer configured to receive the biometric data, determine a physical condition of the occupant using the biometric data, and determine a first body arrangement using the biometric data and predetermined criteria, wherein the seat-movement system is configured to move the vehicle seat to the first body arrangement.

14. The occupant support system of claim 13, wherein the sensor is included within the vehicle seat.

15. The occupant support system of claim 14, wherein the computer is further configured to determine information regarding blood flow of the occupant using the biometric data.

16. The occupant support system of claim 15, wherein the computer is further configured to determine the first body arrangement using the biometric data, blood flow information, and predetermined criteria.

17. The occupant support system of claim 13, wherein the configuration control system includes an input including occupant data associated with an occupant and the computer is further configured to receive the occupant data, calculate external body dimensions using the occupant data, calculate internal body dimensions using at least the external body dimensions, and calculate the first body arrangement of the occupant using the biometric data, internal body dimensions, and predetermined criteria.

18. The occupant support system of claim 17, wherein the occupant data includes anthropometric data.

19. The occupant support system of claim 13, further comprising a pneumatic system including a pneumatic bladder coupled to the vehicle seat and configured to support an occupant resting on the vehicle seat, a pressurized air source coupled to the pneumatic bladder to provide pressurized air to the bladder and coupled to the seat-movement system to receive commands from the seat-movement system, and a pressure sensor coupled to the pneumatic bladder and configured to sense air pressure in the bladder and coupled to the computer to communicate the sensed pressure to the computer.

20. The occupant support system of claim 19, wherein the computer is configured to command the seat-movement system to cause the pressurized air source to maintain the air pressure in the pneumatic bladder in a predetermined pressure range.

21. The occupant support system of claim 19, wherein the body arrangement includes a location and orientation of the seat bottom relative to the vehicle floor, a location and orientation of the seat back relative the seat bottom, and at least one of operation of a pneumatic system, heating, or cooling of the vehicle seat.

* * * * *